United States Patent
Darling, III

(10) Patent No.: US 7,150,465 B2
(45) Date of Patent: Dec. 19, 2006

(54) MISSION ADAPTABLE PORTABLE CART/UTILITY TABLE ARRANGEMENT

(76) Inventor: Charles W. Darling, III, 6 Wells La., Hampton Bays, NY (US) 11946

( * ) Notice: Subject to any disclaimer, the term of this patent is extended or adjusted under 35 U.S.C. 154(b) by 97 days.

(21) Appl. No.: 10/686,948

(22) Filed: Oct. 15, 2003

(65) Prior Publication Data

US 2004/0222617 A1   Nov. 11, 2004

(51) Int. Cl.
 *B62B 1/12* (2006.01)
(52) U.S. Cl. .................. 280/640; 280/652; 280/47.18; 5/626; 5/627
(58) Field of Classification Search ................ 280/640, 280/652, 655.1, 47.18, 63; 5/625, 626, 627
See application file for complete search history.

(56) References Cited

U.S. PATENT DOCUMENTS

| | | | | |
|---|---|---|---|---|
| 2,918,296 A * | 12/1959 | Goodale | ...................... | 280/645 |
| 3,073,614 A * | 1/1963 | Zinneman | ...................... | 280/30 |
| 4,215,877 A * | 8/1980 | Pritchett | ....................... | 280/652 |
| 4,789,180 A * | 12/1988 | Bell | ............................ | 280/652 |
| 5,090,368 A * | 2/1992 | Berghoefer | ................. | 119/846 |
| 5,375,277 A * | 12/1994 | Carr et al. | ...................... | 5/625 |
| 5,687,978 A * | 11/1997 | Rhodes et al. | ................. | 280/30 |
| 5,887,879 A * | 3/1999 | Chumley | ...................... | 280/40 |
| 6,283,496 B1 * | 9/2001 | Dickmann | ................... | 280/652 |
| 6,375,200 B1 * | 4/2002 | Harter | .......................... | 280/30 |
| 2004/0108688 A1 * | 6/2004 | Holmes | ....................... | 280/640 |

* cited by examiner

Primary Examiner—Jeff Restifo
(74) Attorney, Agent, or Firm—Alfred M. Walker

(57) ABSTRACT

A mission adaptable multi-purpose, collapsible portable cart/utility table, for use in emergency response and disaster situations, camping, hunting and other outdoors activities, which carries medical rescue carts, canoes, small boats, game, or hauled cargo by hand. The portable cart/utility table can be converted to a various uses and the portable cart/utility table can be folded down and transported within a wheeled bin, backpack, hand carried bag, canoe or boat. It transports injured persons or cargo over long, rough terrain and it can broken down into a carrying position, by hand or by back. The cart has optional removable clamps for clamping a conventional transportable carrier, such as a stretcher or stokes-type rescue carrier bed, thereto. The objects being carried can be held by clamps, by fasteners, or through the use of insertions with longitudinally extending channels. An optional pivotable kickstand and/or tie rods can stabilize the cart in a position of rest. It is collapsible, so that it can be disassembled and carried, and then reassembled at another destination along a wilderness journey.

10 Claims, 76 Drawing Sheets

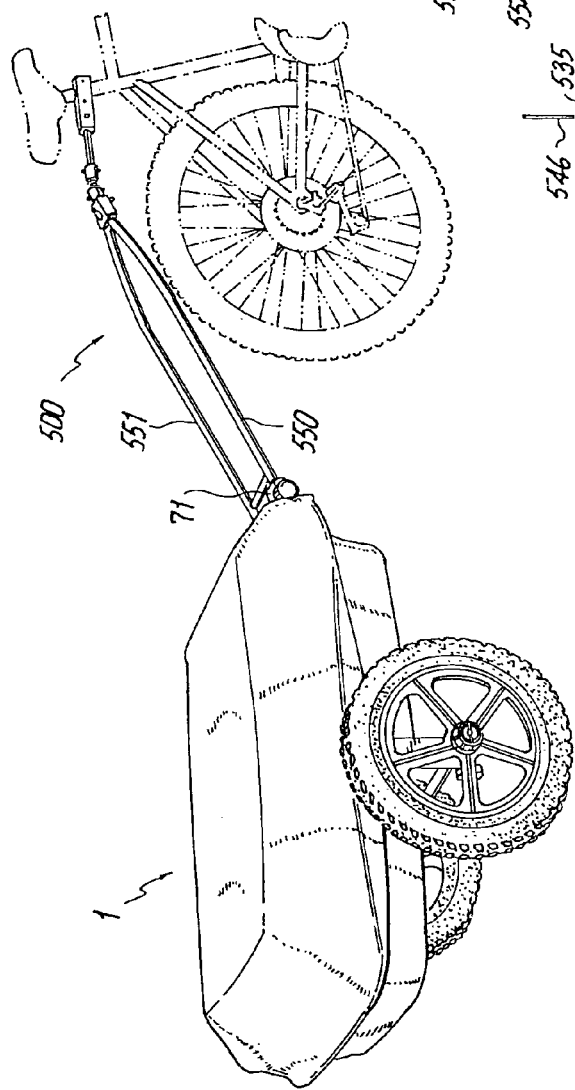
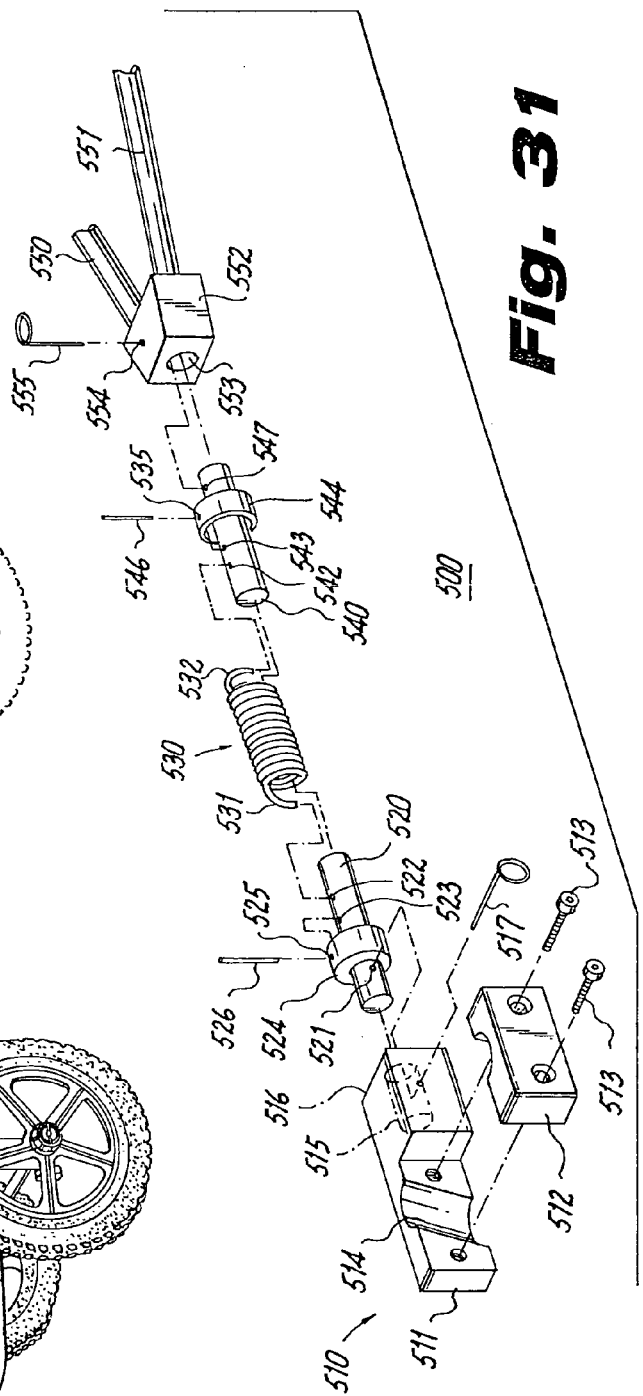
Fig. 30
Fig. 31

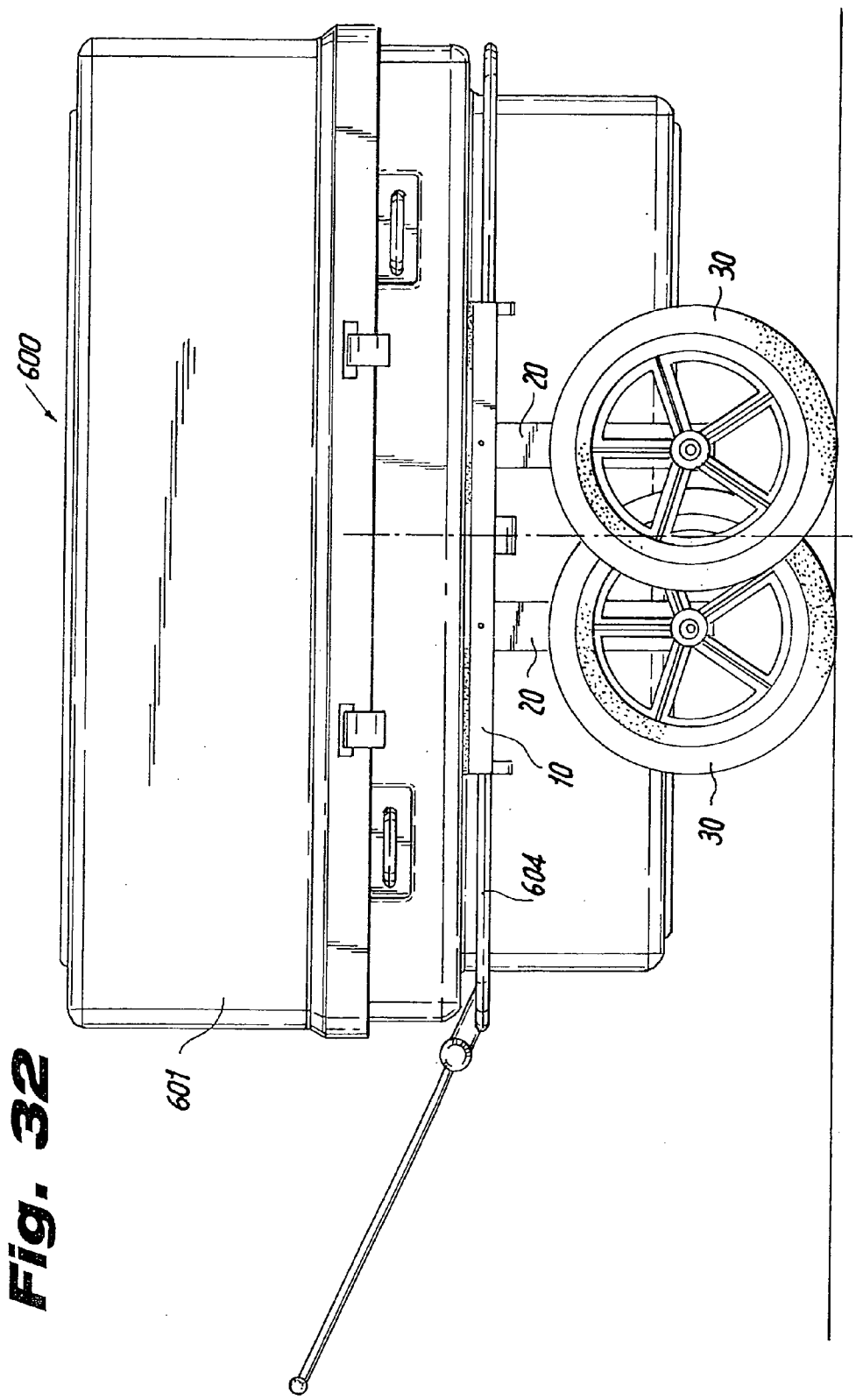

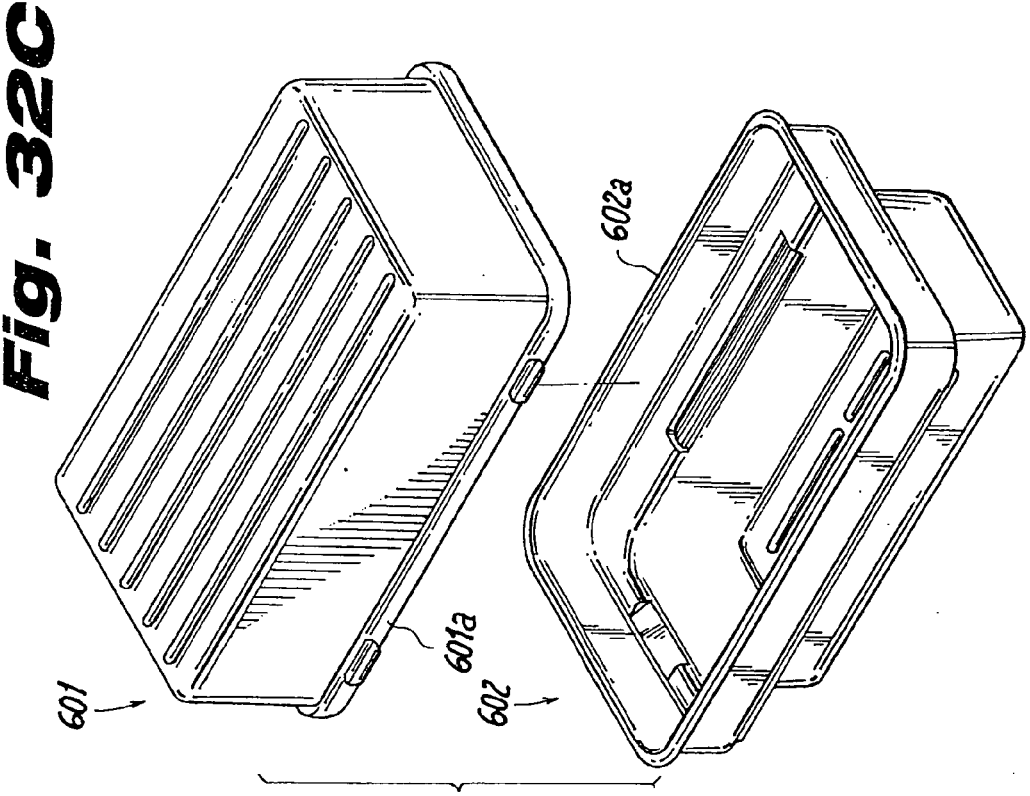
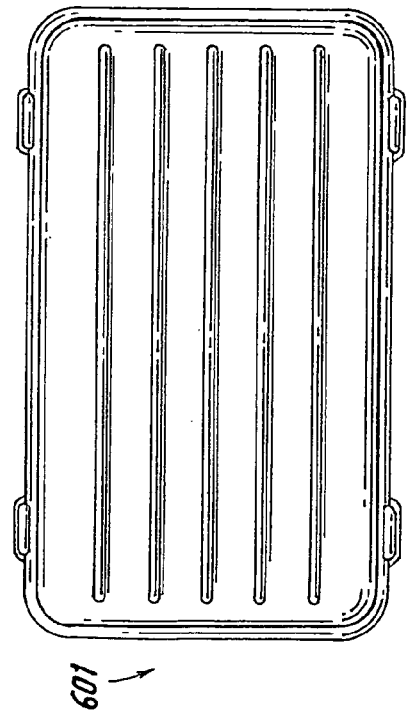
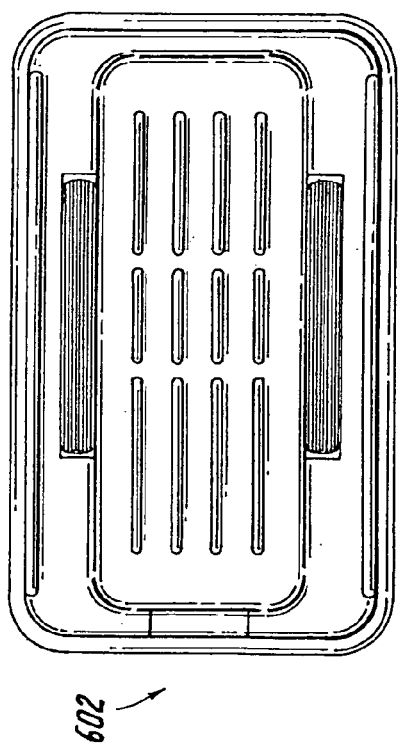

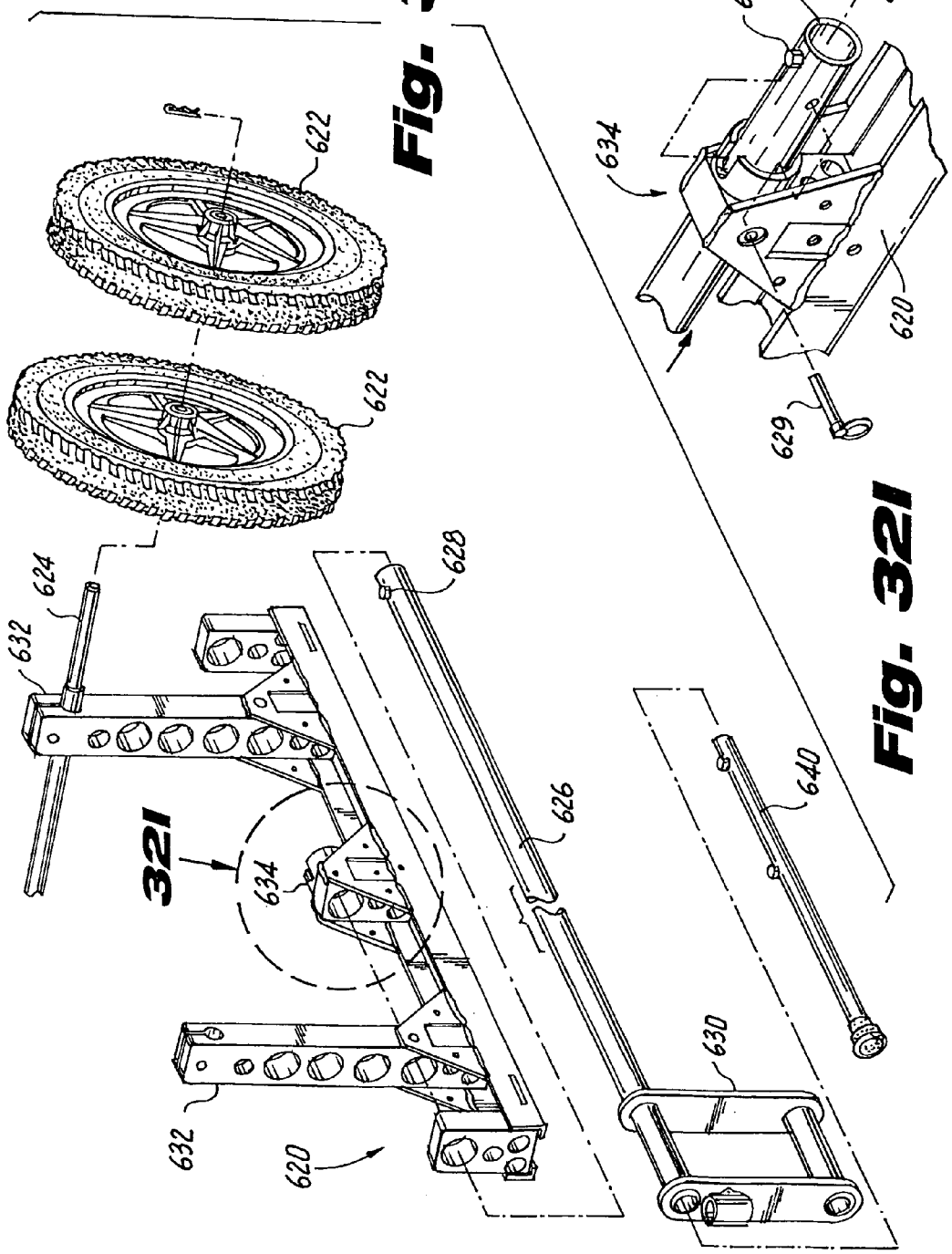

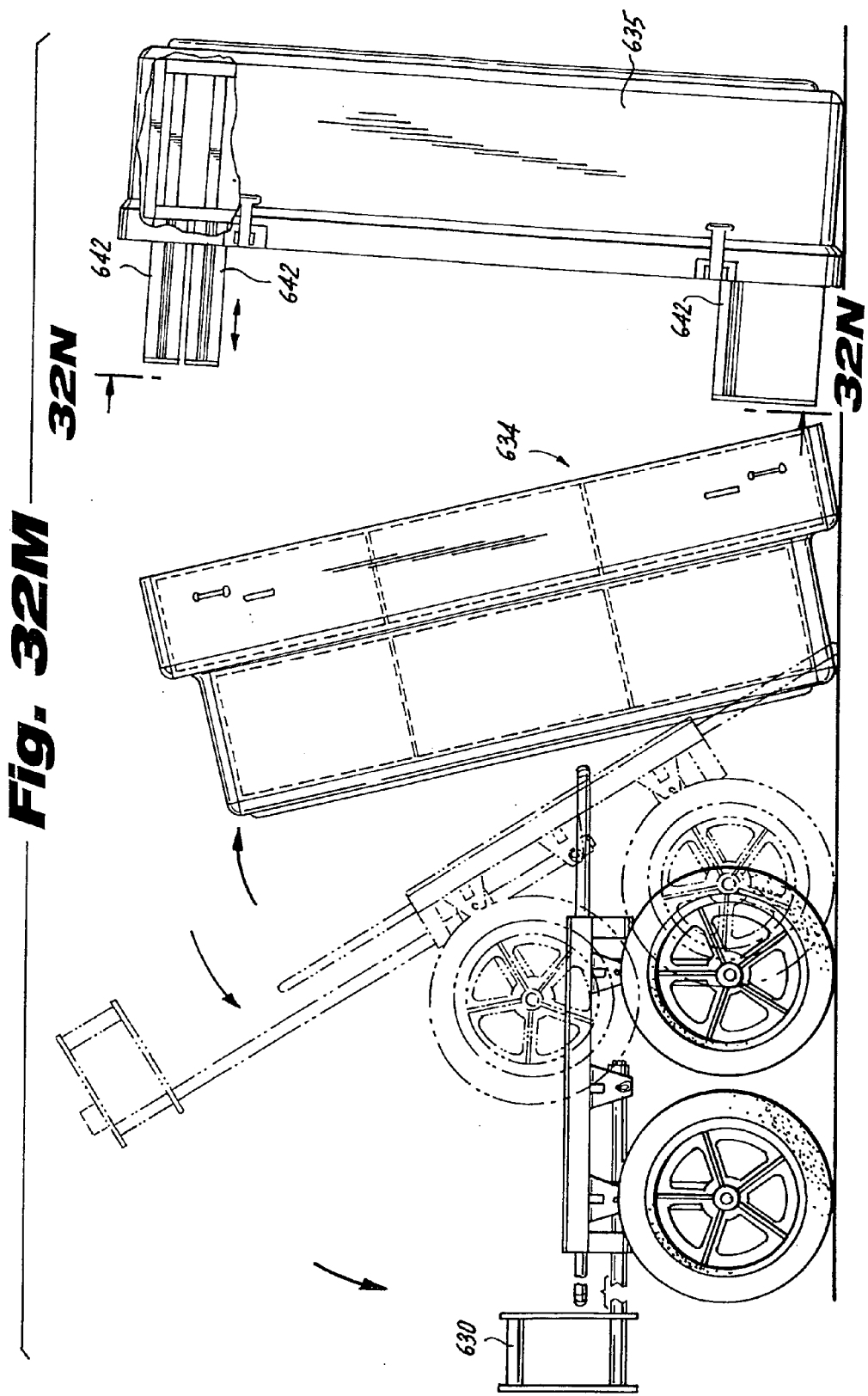

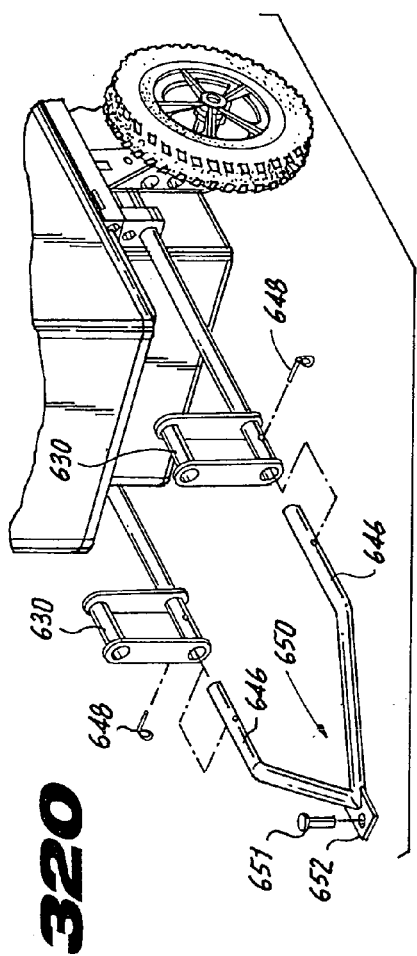
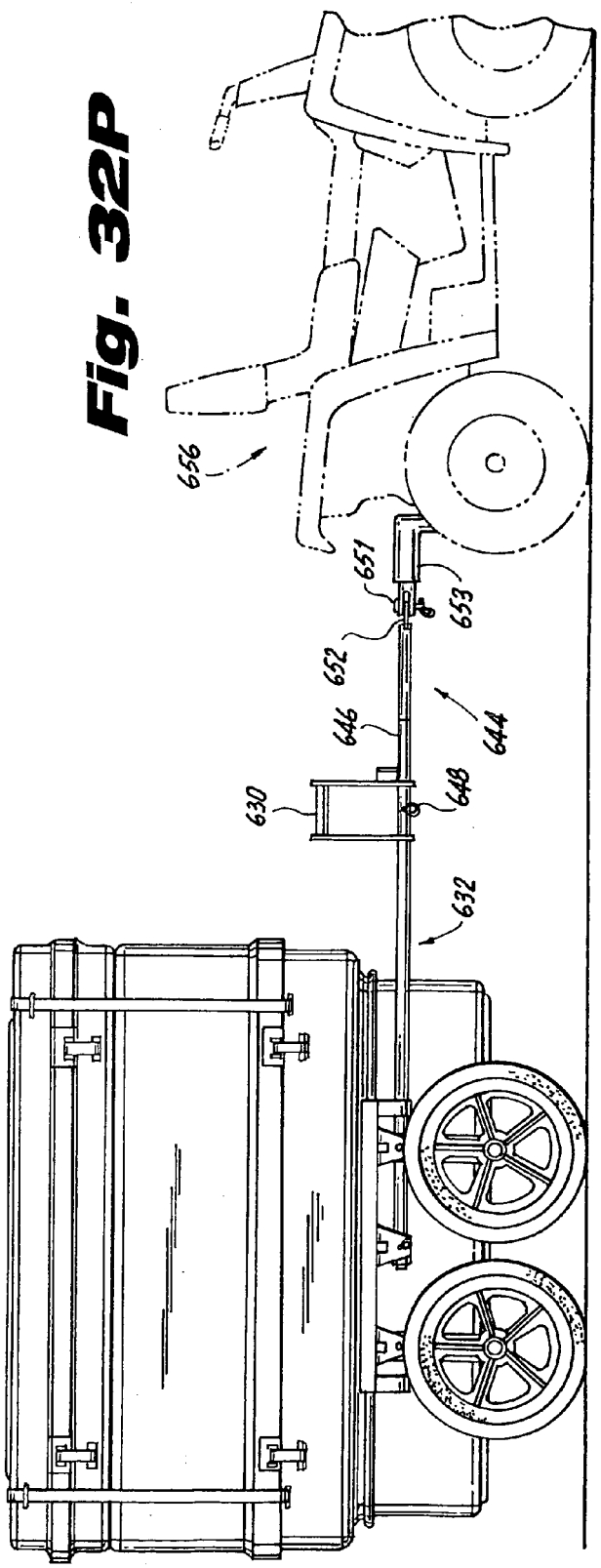

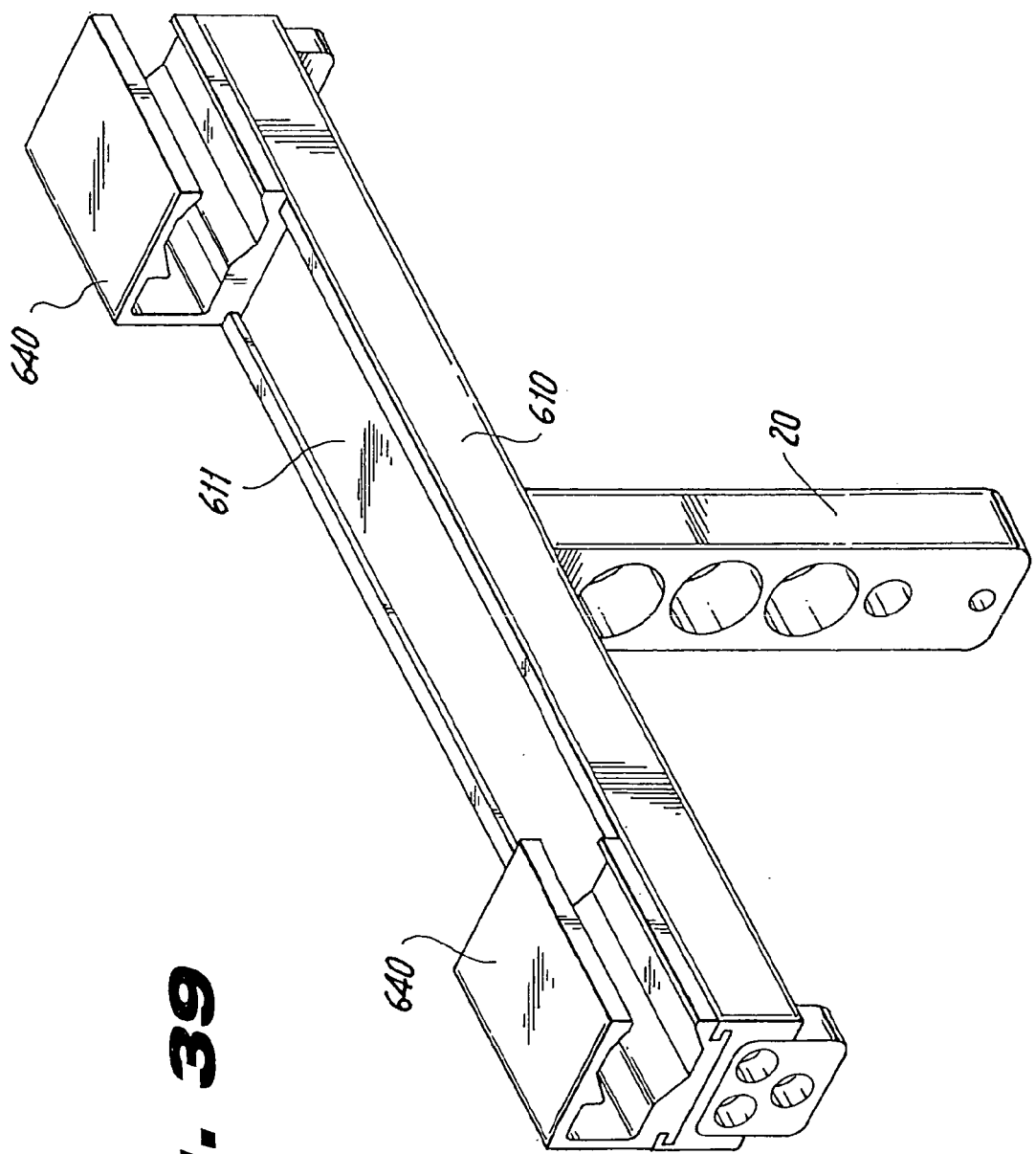

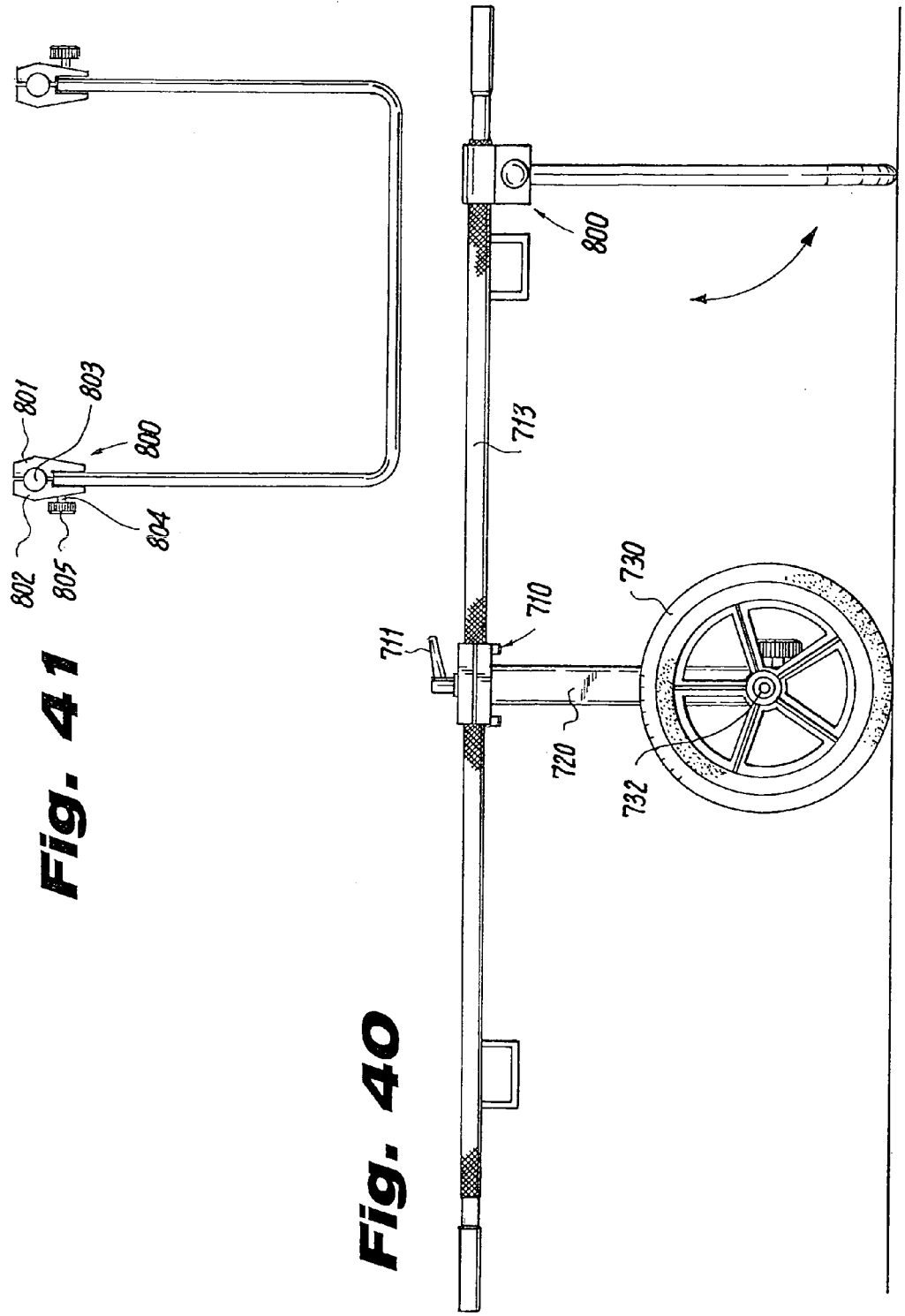

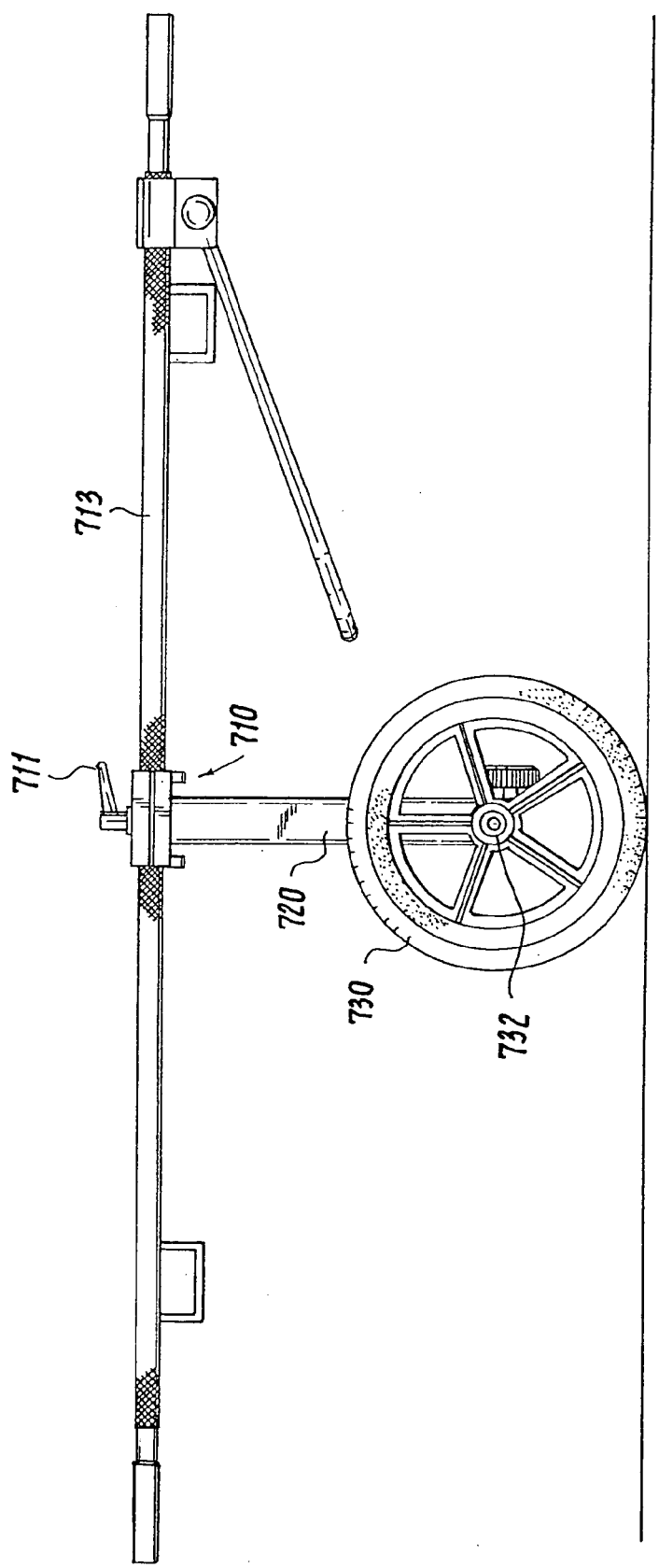

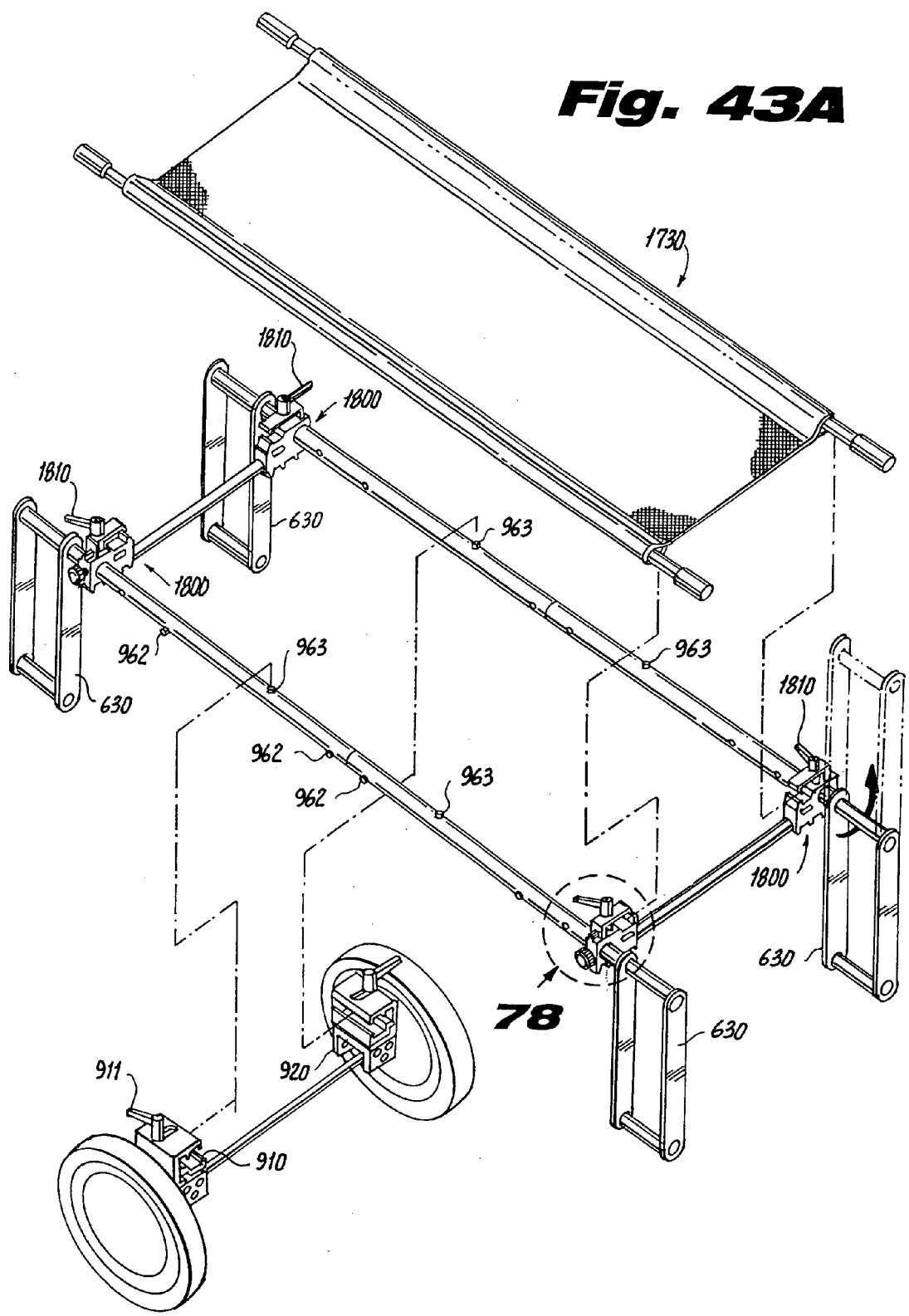

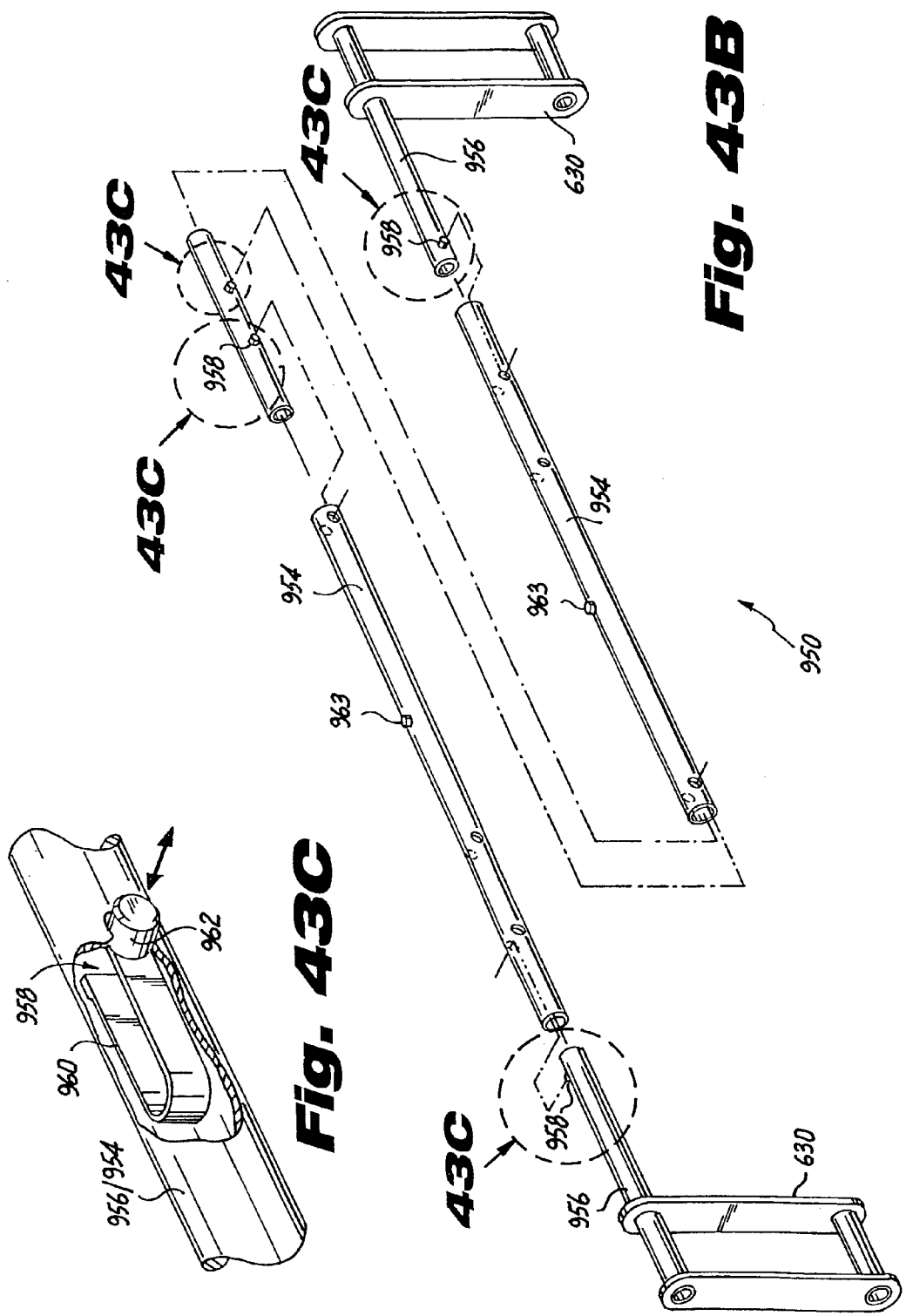

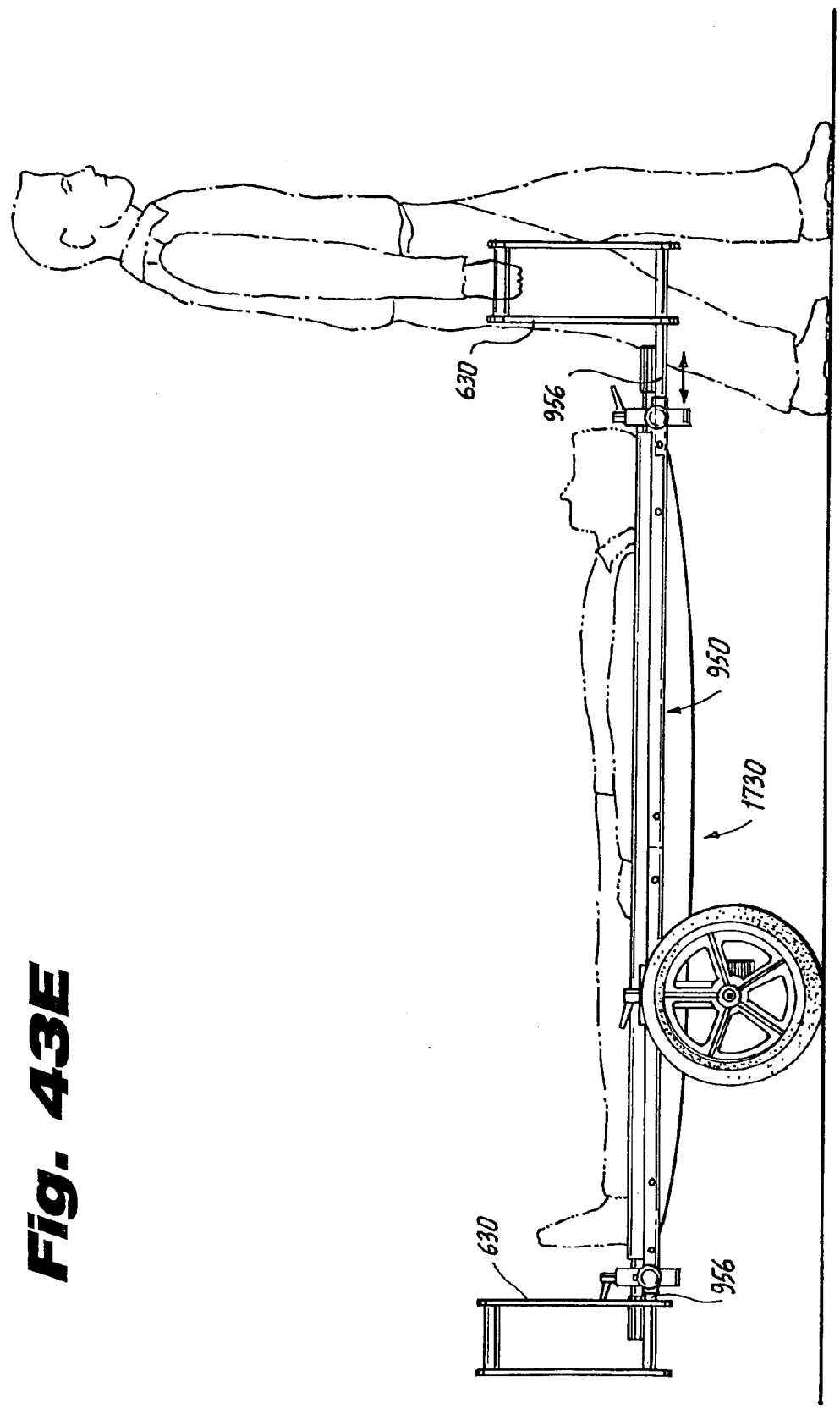

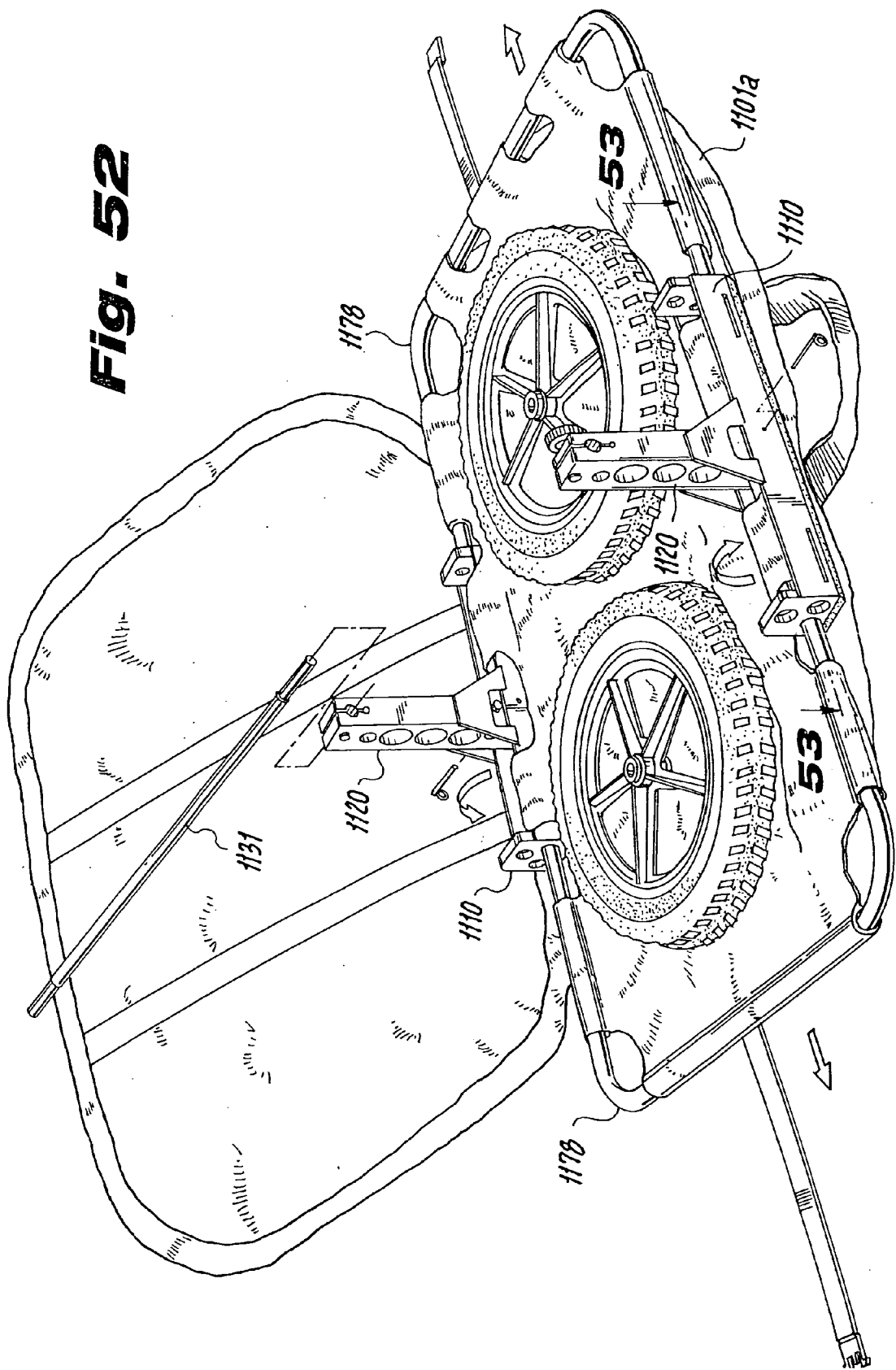

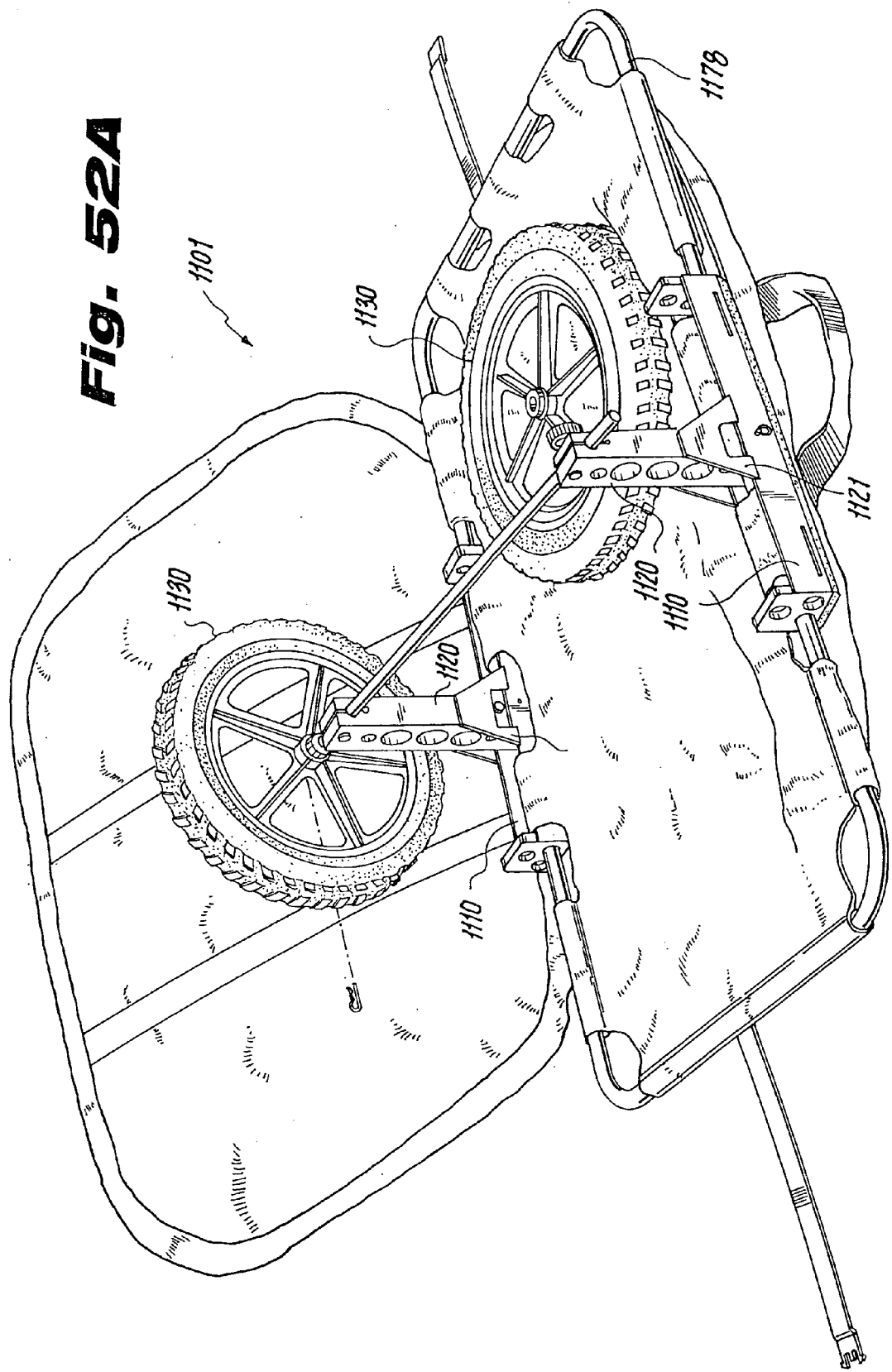

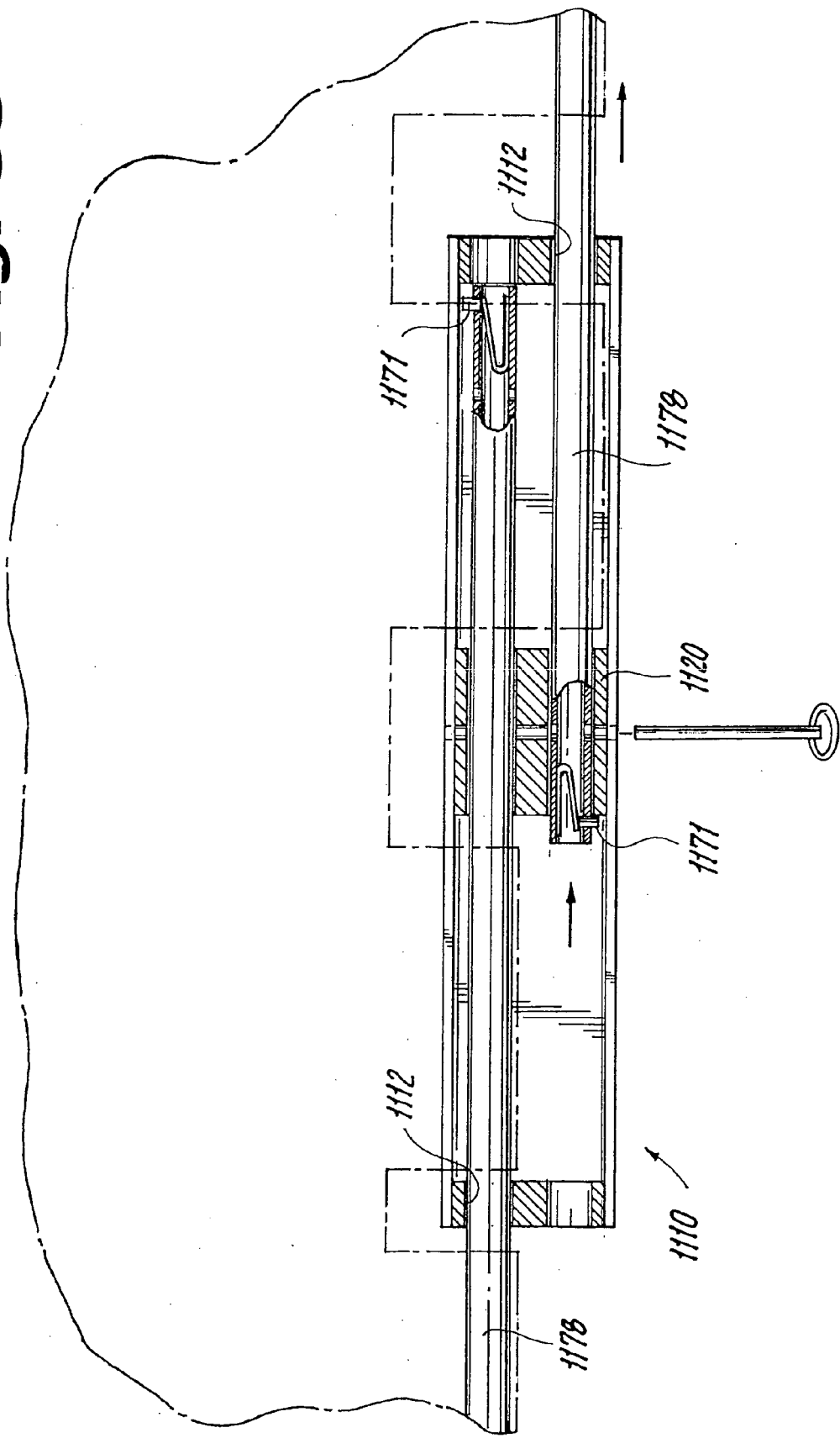

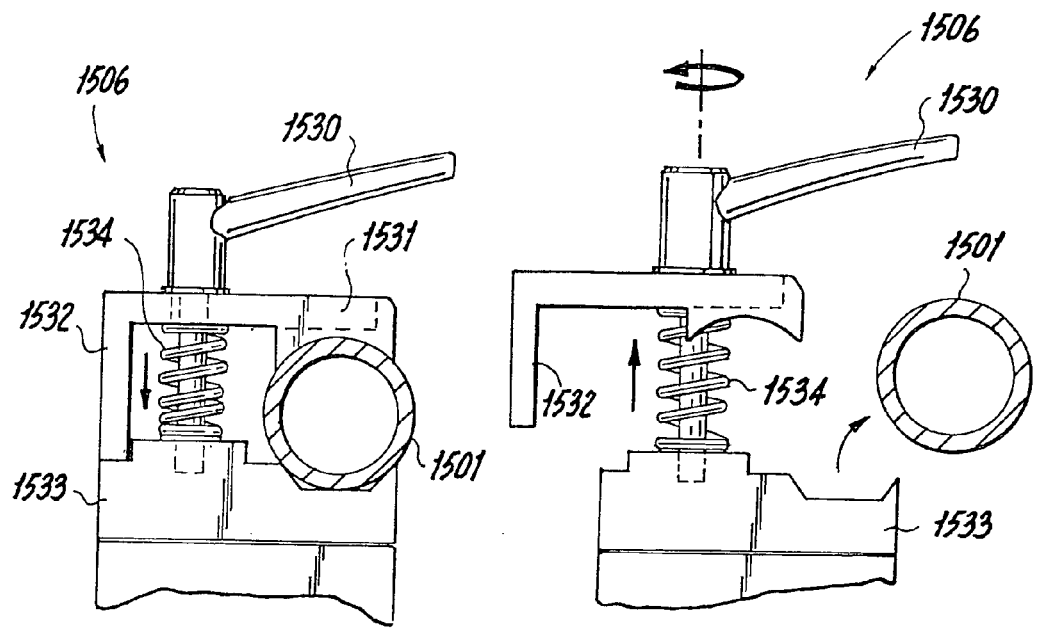
Fig. 62    Fig. 63
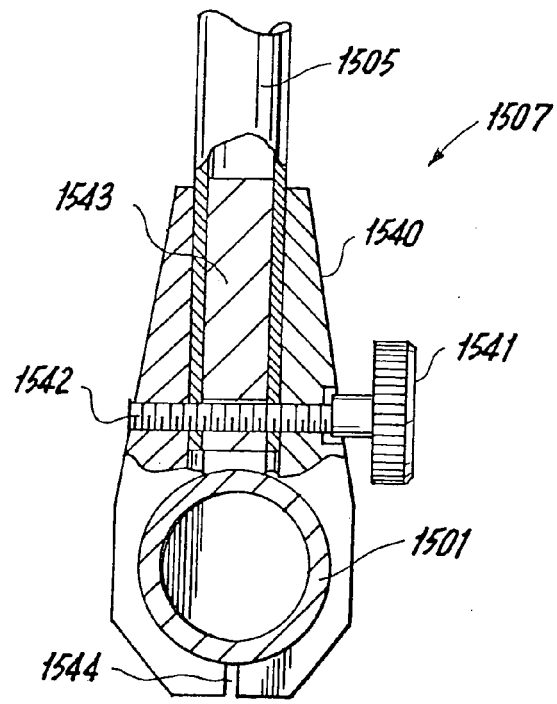
Fig. 64

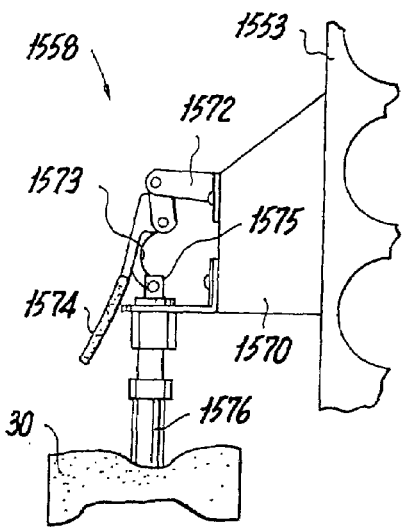
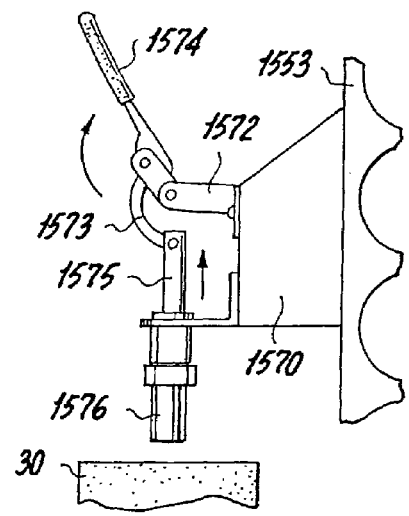
Fig. 67    Fig. 68
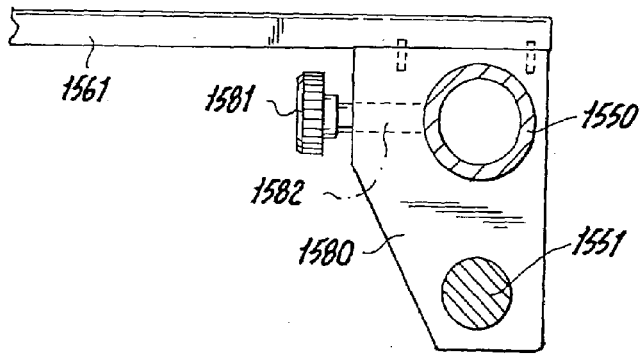
Fig. 69
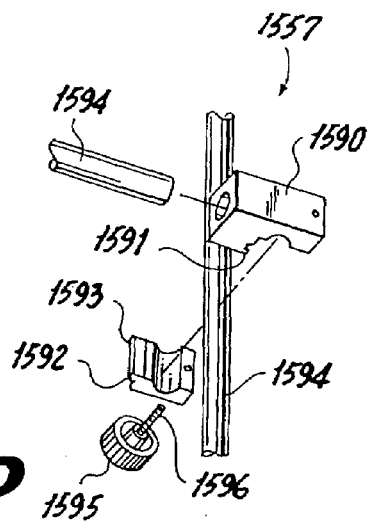
Fig. 70

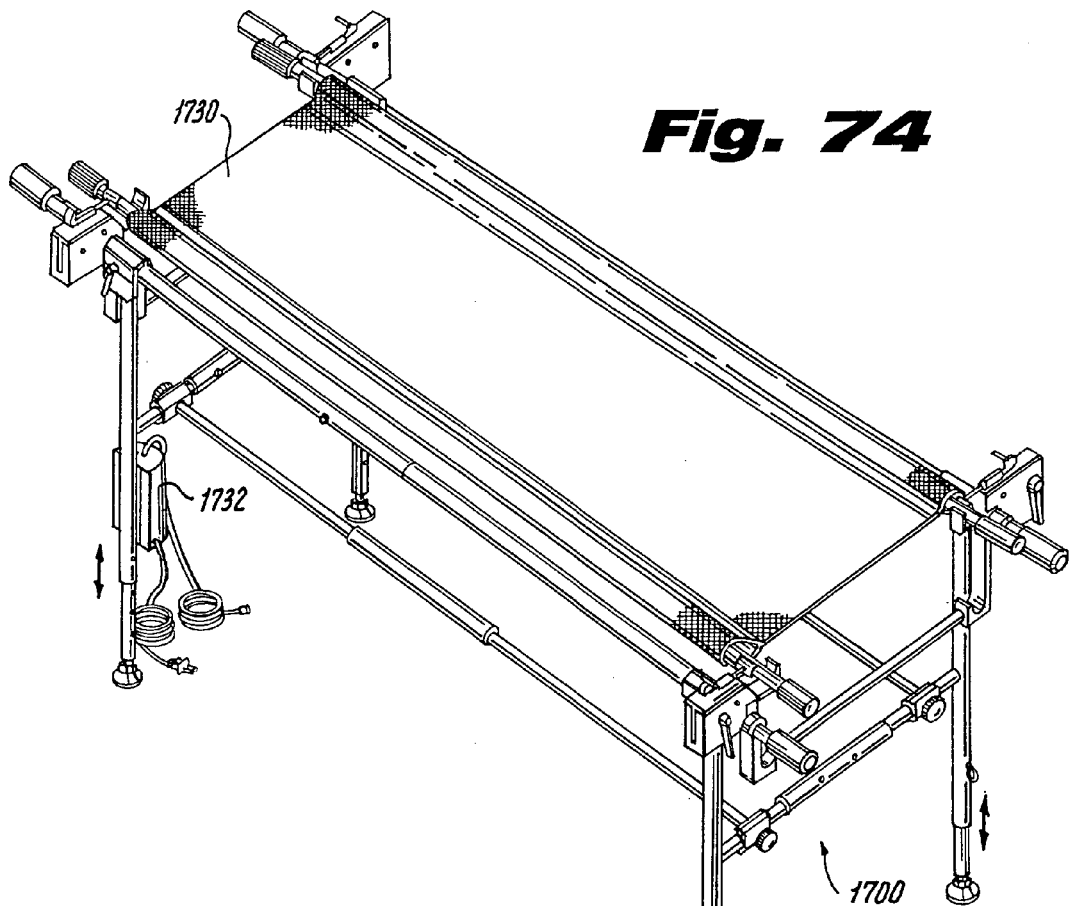
Fig. 74
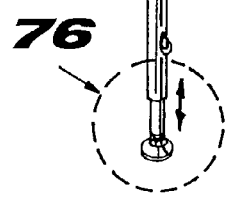
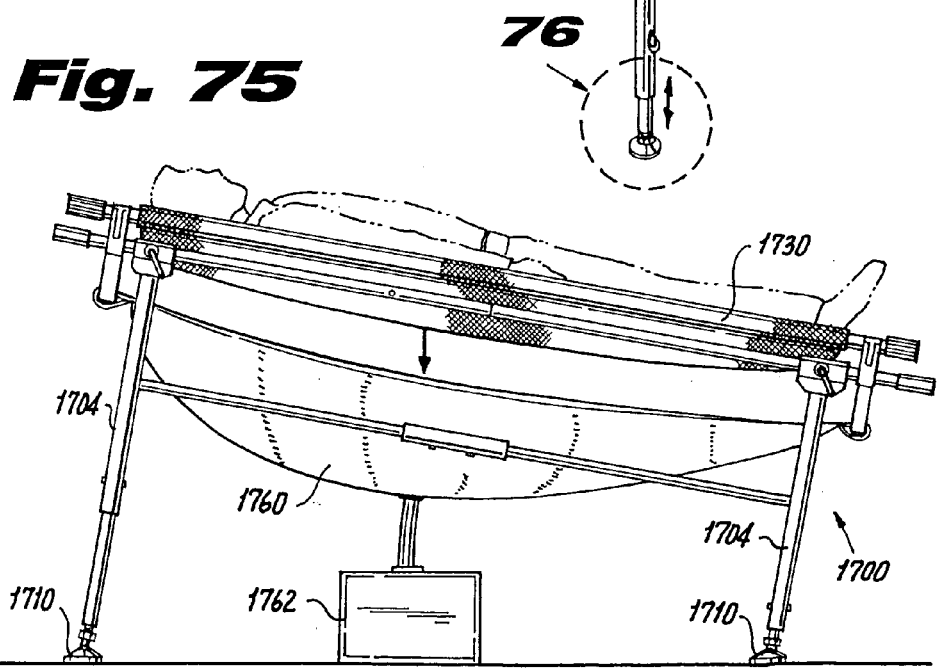
Fig. 75

MISSION ADAPTABLE PORTABLE CART/UTILITY TABLE ARRANGEMENT

RELATED APPLICATIONS

This application in part disclosed and claims subject matter disclosed in my earlier filed patent application Ser. No. 10/431,839 filed May 7, 2003, which is a continuation of application Ser. No. 09/989,376, filed Aug. 24, 2001, now U.S. Pat. No. 6,561,529, which is a continuation in part of my provisional patent applications, Ser. No. 60/233,138, filed Sep. 18, 2000, and 60/246,014 filed Nov. 6, 2000 which both disclose in part subject matter disclosed in my earlier filed patent applications filed under Ser. No. 09/226,838 filed Jan. 7, 1999, now U.S. Pat. No. 6,142,491, Ser. No. 09/479,344 filed Jan. 7, 2000, now U.S. Pat. No. 6,164,671, and Ser. No. 09/745,116 filed Dec. 21, 2000, now U.S. Pat. No. 6,270,972.

FIELD OF THE INVENTION

The present invention relates to a mission adaptable set of components for a multiple-purpose collapsible portable cart, which may convert to a utility table, for use in camping, hunting, search and rescue, and other outdoors activities. The cart can be easily assembled in a number of uses, and disassembled for easy transporting of the cart in a movable storage bin, a backpack or a hand-carried bag.

BACKGROUND OF THE INVENTION

Various single use carts exist for carrying canoes and small boats by hand. Other outdoors-oriented carts exist for carrying game. In addition, wheelbarrows and small carts are used for transporting gear at outdoors locations. However, none of the existing carts can be converted to a versatile portable cart which can interchangeably function as a rescue cart with a carrier for injured persons and be converted to a stationary utility table, as a portable canoe or boat cart which can be folded down and transported within the canoe or boat, as a game cart for transporting game over long, rough terrain, or as a gear cart, all of which can broken down into a carrying position, by hand or by back.

OBJECTS OF THE INVENTION

It is therefore an object of the present invention to provide a mission-adaptable set of interchangeable components forming movable and stationary load supports and work surfaces.

It is an object of the present invention to provide a versatile multi-purpose cart, which is quickly assembled or disassembled.

It is also an object to provide a multi-purpose cart, which quickly converts from one use to another.

It is further an object to provide a cart which as a stable, flat platform for supporting cooking devices, machinery, camera tripods and the like.

It is yet another object to provide a caravan of components for a load support system, which is stable during transport over rough terrain.

It is yet another object to provide a portable collapsible cart/utility table with minimal fasteners.

It is yet another object to provide a portable collapsible cart/utility table, which can be stabilized in a position of rest.

It is also an object of the present invention to provide a universally adaptable carrier cart/utility table.

It is yet another object of the present invention to provide a cart for carrying medical rescue stretchers, canoes and small boats by hand, which converts to a utility table for triage and emergency medical response.

It is yet another object to provide a portable search and rescue cart/utility table adapted to carry a stretcher or other carrier for an injured person.

It is also an object of the present invention to provide an outdoors-oriented cart for carrying game or injured parties.

It is yet another object of the present invention to provide a small cart with a well for transporting gear at outdoor locations, which can be converted to a stable utility table with a work surface.

It is also an object of the present invention to provide a versatile portable cart which can interchangeably function as a stationary work surface table, as a portable canoe or boat cart which can be folded down and transported within the canoe or boat, as a rescue cart for injured persons, as a game cart for transporting game over long, rough terrain, or as a gear cart, all of which can be broken down into a carrying position, by hand or by back.

It is yet another object to provide a portable cart/utility table which is either backpackable or which can be carried by hand.

It is yet another object to provide a carrier for transporting military equipment and ordnance.

It is yet another object to provide a cart-hauling clamp for pulling the portable cart/utility table behind a bicycle or motorized all terrain vehicle while resisting tipping over of the cart during directional change of the cart-hauling bicycle or all terrain vehicle.

It is yet another object to provide a portable cart/utility table, which can be used as a wheeled cart on terrain or as a ski cart on snow.

It is also an object of the present invention to improve over the disadvantages of the prior art.

SUMMARY OF THE INVENTION

In keeping with these objects and others, which may be apparent, the present invention relates to a universal mission-adaptable set of structural components forming a myriad of useful movable support carts or stationary utility tables, which can be rapidly and accurately deployed in the field with minimal or no tool assembly. The cart may be a convertible, multi-purpose portable cart, for use in camping, hunting, emergency response, search and rescue operations and other outdoors activities, such as for carrying canoes and small boats by hand. It may also carry game, injured parties or be used for transporting gear at outdoors locations. It is a versatile portable cart which can interchangeably function as a movable or stationary medical rescue carrier, cargo carrier, portable canoe or boat cart, which can be assembled with interfitting parts and with minimal fasteners. It can be folded down and transported within the canoe or boat, as a carry cart for transporting game or injured parties over long, rough terrain or snow, or as a gear cart, all of which can be broken down into a carrying position, by hand or by back.

The cart/utility table is moved by manual pushing or pulling force applied to activate vehicle movement actuators, such as wheels upon terrain or skis upon snow or ice, wherein upon the exertion of force the wheels or skis cause forward or rearward movement of the portable cart.

The cart/utility table is easily assembled or disassembled by connecting its parts together, or optionally assembled from a pre-set storage configuration in a carry pack to an assembled structure.

The cart/utility table easily changes from one use to the other. For example, in one embodiment, a hollow cargo well may contain a second loose layer, which turns into a rescue stretcher when the second layer becomes taut when zipped up from a loose, relaxed state within the cargo well to a taut rescue stretcher for carrying injured persons thereon.

In an alternate rescue embodiment, clamps can be provided on shortened horizontal support members to hold rails to hold medical rescue stretcher rails, and optional handles or pivotable kickstands can be further attached by clamps to the stretcher rails.

In military applications, the height of the vertical struts can be lowered to keep the injured person on a low profile stretcher close to the ground, to avoid visible detection. In such a case, the handles can optionally easily rotate from a handle carry position to a stationary kickstand mode.

The portable cart is preferably under thirty (30) pounds, preferably twenty two (22) to twenty eight (28) pounds, so that it can be carried by hand or within a backpack over rough terrain. It is collapsible, so that it can be disassembled and carried in a canoe or small boat, and then reassembled with minimal assembly steps and parts, at another destination along the canoe or boat's journey.

To prevent flat tires, its wheels are preferably solid core tires, which cannot get flat, or made of cellular materials, such as medium density, micro-cellular urethane, with stainless steel bearings, over which the wheels rotate. A typical wheel has two press fit bearings adjacent to an integrally molded hub. While the typical wheel is about 2–3 inches wide, for transporting cargo or game on sand or granular terrain, the wheels may be wider, such as 4–6 inches in width.

For maneuverability in snow-filled winter scenes, optional ski members, including skis, are attached to vertical braces having a length corresponding to the radius of the cart's wheels. The vertical ski braces are attached to the vertical struts where the wheel axles attach.

For hardiness, the material of the structural frame components is preferably a lightweight but resilient and strong material, such as, for example, 60–61 T6 fully anodized aluminum, or stainless steel. In a substantially pre-assembled optional embodiment, in a storage position within a carry bag, the vertical struts are connected to horizontal supports, which are further engaged with rails to hold a cargo well or rescue stretcher. Pivoting of the horizontal supports about each respective longitudinal axis to a position of rest biases the resiliently engaged rails to return to their natural position of use when released from the storage position.

These pivotable support and strut assemblies can be further strengthened by optional V-shaped braces, which are positioned where each vertical strut meets each corresponding horizontal support member.

The portable cart/utility table can hold up to 500 pounds, and for manual pulling easily pulls 300 pounds. The portable cart/utility table is durable to carry heavy weight over rough terrain, such as rock-strewn dirt trails or sloping riverbank surfaces.

To carry a canoe or boat, two horizontal load supports optionally include support cushions upon which the canoe or boat rests. The position of the horizontal load supports can be varied to accommodate various widths of the canoe or boat.

To function as a game or rescue cart, the frame, such as a pair of U-shaped rails which are joined end to end, is provided upon the horizontal load supports to form a rounded rectangular frame, over which a taunt, but slightly stretchable, bed of fabric is placed, such as canvas or other flexible material, i.e., plastic or netting. The bed includes sewn loops through which portions of the U-shaped rails of the frame are inserted. Other fabric fasteners such as clips, zippers or eyelets can be also used.

In an alternate embodiment, the boat support cushions are removable from the horizontal load supports and are replaced by a two-piece clamp, which attaches by at least one fastener, such as a pair of screws, to the horizontal load supports of the cart. Conventional stretchers or personal rescue carriers, such as Stokes-type baskets, are clamped to the cart within the clamps on each respective horizontal load support. In this embodiment, the boat support cushions are attached to a thin plate, such as of ⅛ inch aluminum or otherwise, which has at least one fastener such as a pair of threaded studs, insertable with the respective hole or holes in the horizontal load supports, so that the boat support cushions can be removed and replaced by the stretcher-bearing clamps.

To function as a wagon cart with a well for carrying gear, a hollow fabric well, such as of canvas, is draped between the horizontal load members and over and around the front and rear U-shaped brackets. A cover may be provided to cover the gear therein. The well and cover can also be made of other suitable flexible materials, such as plastic, netting or canvas. An optional removable hard bottom substrate floor layer may be provided within the cargo well. While this floor layer may be of any hard material, materials such as lightweight aluminum, wood or marine polymer plastics are preferred.

Furthermore, the cargo cart may have an optional handle from which may be draped a further optional accessory cargo bag. In the stretcher embodiment, where the upper layer is fastened taut, the handle may have a removable headrest pillow.

Kickstands may be optionally provided to stabilize the portable cart/utility table during rest or during loading of contents thereon.

In yet another embodiment, an anti-tipping bicycle attachment is provided to attach the cart to a bicycle while preventing the cart from turning over during transportation.

In one embodiment, the cart/utility table has two wheels for cargoes weighing from 300–500 pounds. However, for heavier loads, such as for 600–1,000 pounds, an optional double axle version includes two pairs of overlapping wheels for heavier cargo. In this embodiment, the portable cart/utility table uses four wheels in the overlapped configuration, with an optional hard molded canister. In this overlapping, wheeled version, a long axle attaches a pair of front wheels and a short axle attaches a pair of rear wheels through the respective vertical supports, although the length of the axles can be reversed. Using four wheels doubles the carrying capacity of the cart/utility table, and the overlapped positioning of the pairs of wheels maintains a short wheelbase for compactness, for maneuverability and for climbing slopes or ledges.

In the four-wheeled embodiment, double parallel rails may be provided for additional structural strength. The overlapping, dual axle, four-wheel version gives the user extra pivot points on rough terrain. For example, pushing down upon the optional handle enables the user to lift the further away distal wheels off the ground. Furthermore, pulling upon the handle enables the user to lift the nearer, proximal wheels off the ground.

The accessory which is placed upon the vertical supports of either the two wheeled or four wheeled cart/utility table, such as the rescue stretcher, the boat cushion, the cargo cart, etc., can be attached permanently or by fasteners to each horizontal load support member of the portable cart/utility table. However, in an alternate embodiment, the horizontal supports have longitudinally extending channels to slide the accessories in on top of the horizontal supports. Furthermore, the accessory, such as a railed rescue stretcher, can be carried by a clamp which itself is attached to the horizontal support by insertion in such a channel, or the stretcher can be dropped in and clamped to a pair of rails forming the horizontal support.

This clamp upon each horizontal support member may be a one-piece clamp with a full width top section and short end pieces, which mate with and slip into a T-shaped slot channel of the horizontal support member. Alternatively, the clamp may have a full width bottom member which mates with and slides into a T-slot of the horizontal support. In yet another embodiment, two short identical clamp members are inserted into the T-slots of the horizontal member at the two ends. Moreover, the clamping sections can have spring-like gripping action to be retained upon tubular members, such as medical rescue stretcher rails, or the clamps can use fasteners such as fasteners, such as thumbscrews or ball plungers for retention.

In yet another embodiment, a covered canister can be held in place over the rails of the frame of the cart, in a stable position, by virtue of its weight being held in place upon the rails of the cart, wherein a concave, downward facing channel engages the linear, upper convex support surface of each rail.

Furthermore, the cart of the present invention can be disassembled and broken down for hand held or backpack transport and it can easily be assembled for its varied uses. Moreover, when a boat or canoe is carried, the cart has a precision balance feature that rotates the wheels to maintain the cart in a horizontal stable position.

The convertible cart/utility table of the present invention is just one of many modular embodiments which may be made of the present invention. Because of the interchangeability of the parts, the components of the convertible cart/utility table can also be used for assembling a boat hauling cart, a game hauling cart, a wheelbarrow-type hauling cart, a low profile stretcher, a high profile stretcher and a component of a mobile emergency response system.

Furthermore, in the rescue mode, the convertible cart/utility table allows for one person to transport an injured person instead of two on a stretcher. Because of the convertibility of the cart, when the person is brought to a triage situation for treatment and assessment, the wheels of the cart can be easily removed without tools and replaced by one or more kickstands to stabilize the cart.

Therefore, in its broadest sense, the present invention is a movable support, such as a convertible cart/utility table, which is collapsible for storage and transport and is able to be assembled and dis-assembled for use in carrying a load, and alternatively functioning as a stationary utility table having stationary legs instead of wheels.

In one embodiment, the convertible cart/utility table includes a pair of modular load support members which each includes at least one carrying strut extending downward therefrom and a carrier.

The convertible cart/utility table is preferably carried by handles, which may be extensions of parallel rails constituting the load support member, or the handles may be separate handles having handle extension members nesting in a receiving member of the load support for receiving an adjustably removable handle extension member, such as a tube. The handles may be single grips extending coaxial to the first or the second horizontal frame rails of the movable support.

In an alternate embodiment, the handles in a pivotable rectangular brace configuration, including a first set of manual grips extending between parallel connectors, which are further connected by a rotatable transverse bar, to enable the handles to be rotated up to a carrying position, or down to a storage position.

These optional pivotable handles lock in an upper position for hauling the cart, and reverse to a lower position for storage, or in a low profile use, contact the ground surface for operating as a kickstand.

In addition, the handles may optionally also pivot about their longitudinal axis downward to reach ground level to function as a kickstand for a low profile table cart, or may swing out of the way in a high profile cart when stored during travel or during the stationary utility table mode.

By "low profile use" it is meant that the movable load support is positioned low to the ground to avoid detection, such as in military rescues. By "high profile use" it is meant that the movable load support is positioned higher up from the ground, such as for example, between 30 and 36 inches, more or less, to allow for access to the load. For example, if the load is an injured person in a rescue operation, the height is high enough to allow medical treatment personnel to conveniently treat the injured person. If the load is cargo, then the height of the high profile movable support, such as a cart, is convenient for stowing and removing the cargo being transported.

These axially pivotable handles may slide within a hollow support rail, and be locked in place by fasteners, such as spring pins extending through respective holes in an outer wall of the hollow support rail.

Preferably, the handle includes a first hand grip located coaxially to the handle shaft or tube and an outer second handle grip, which is located parallel to the handle shaft or tube, which is in rigid connection with the coaxial handle grip. Both parallel hand grips are connected by parallel brace members laid perpendicular to the hand grips. The handle member is lockable in at least two positions, such as an upward position for hauling the convertible cart/utility table and a downward position for using the handle as a kickstand in a low profile embodiment, or for storage in a high profile embodiment.

These handles may be locked in place with a spring pin.

The longitudinally extending structural frame rails of the movable support can each accommodate a handle extending therefrom, each frame rail having a connecting end and a handle attachment end, and a plurality of spring pin apertures for attachment of additional members.

In a preferred embodiment, there are at least two spring pins, wherein a spring pin of the plurality of spring pins reversibly protrudes a spring pin aperture of the plurality of spring pin apertures located on each respective frame rail, such as a first horizontal tube.

Preferably, for knockdown transport, each frame rail may be made of several components, such as a longitudinally extending mid section joined at each opposite end to longitudinally extending first and second connecting end portions. A first spring pin aperture is located on each lateral side of the connecting ends of the first horizontal tube and the second horizontal tube; and a second spring pin aperture is located on each top side of the connecting ends of the first horizontal tube and the second horizontal tube, a distance farther from the connecting end than of the first spring pin aperture. Other pin locations are applicable.

These assembled frame rails together accommodate optionally one or more clamps, with at least one clamp in communication with a first horizontal tube and at least one other clamp in communication with the second horizontal tube, with both tubes forming the frame rails of the movable load support.

In a further alternate embodiment, one or more transverse support bars, preferable at least two transverse support bars, are substantially perpendicular to the pair of longitudinally extending frame rail tubes, and may optionally be in communication with a clamp holding a carrier in removable communication with the clamp or clamps. The carrier may be a rescue stretcher, Stokes carrier, cargo bin, open cargo hauling well, rack or other load support means.

The clamp may be attached to a strut through which accommodates axles therethrough for movement actuators, such as wheels.

Optionally the clamp may be at least one clamp, reversible for accommodating a range of sizes of carriers, including a bottom surface, an opposing top surface, and a inside surface, a clamp front surface and an opposing clamp rear surface. The bottom surface includes a plurality of grooves for optionally receiving one of the horizontal support tubes of the frame rails, with the reverse top surface including at least one groove for optionally receiving a horizontal support tube. This reversible clamp has a first bore extending from its top surface to its bottom surface, for allowing a bolt to pass therethrough. The reversible clamp also includes a rail-accommodating aperture extending from the clamp's front surface to the clamp's rear surface for receiving a horizontal support tube of a frame rail, and the reversible clamp has a tightening knob for securely attaching the clamp to each respective horizontal support tube;

The clamp also includes a latch to tighten a load support, such as a stretcher or other rail in place. So that the latch does not become loose, the threaded securing bolt of the latch, which is threaded into a threaded bore of the body of the reversible clamp, includes a bottom flange wider than the threaded bore, which includes a reciprocal flange recess to accommodate the flange of the threaded securing bolt. An optional fixed nut or flange is located at the end of the bolt, for preventing the separation of the joinable latch and main body parts of the reversible clamp and the bolt from the clamp.

In a preferable embodiment, the clamp may be a heavy-duty clamp having a lower portion having a first concavity for insertion above the horizontal support tubes and a second concavity for slidable and removable insertion of a carrier or a second carrier, a top surface and a guide boss for removable attachment of an upper portion. The upper portion has a third concavity for slidable and removable insertion of a carrier and a guide recess for removable attachment to the lower portion. The heavy duty clamp includes a first latch rigidly connected to the clamp's lower portion, in communication with the first concavity for gripping the horizontal support tube of a frame rail of the load support carrier securely.

The heavy duty clamp also preferably has a second latch, preferably at an upper end, which second latch is rigidly connected to an upper portion of the heavy duty clamp in communication with the third concavity for gripping the load support carrier securely.

The heavy duty clamp may optionally support one or more rails holding a fluid catch under the load support carrier, to catch blood and other body fluids if the load support carrier holds an injured person being medically treated thereon.

This second latch includes a lever latch for manual securing of the load support carrier and a clamping jaw for forming a frictional contact force between the latch and the frame rail of the carrier.

When the carrier is a stretcher secured to the convertible cart/utility table, the pitch of the stretcher can be adjusted, such as for example, to raise or lower the head of the person being treated. In this case, the stretcher carrier has a front end and a rear end, wherein the front end of each rail is secured to a respective upper hook receptacle portion of the clamp and the rear end of each frame rail of the carrier is secured to a respective lower hook portions of the clamp, resulting in an elevation differential between the front end and the rear end of the second carrier. The clamps come in pairs so that the front and rear clamps on each side are equidistant from each other in length, with each secured to opposing horizontal support tubes of each frame rail.

In such a case of the head portion of a medical stretcher or other carrier being raised higher than an opposite foot end, the height of the respective head and foot portions can be varied by placing the foot end in the lower hook portions of the foot clamps and the head end in the higher hook portion of the heavy duty clamp. Optionally, the height can be further varied by varying the height of each kickstand, wherein the rear kickstand is in a position of the clearance being a minimum, and the front kickstand is in a position of the clearance being a maximum, resulting in maximum height differential between the front end of the carrier and the rear end of the carrier.

Additionally, the diameter of the upper latch jaw is effectively less then the inside diameter of the rail support concavity of the clamp for allowing the jaw to accommodate a change in pitch of the carrier, in case the carrier has to be tilted, such as for raising the head of an injured person being treated upon the load support carrier. This latch jaw includes cylindrical portions and a contact portion including a concave surface for evenly contacting the convex surface of the carrier's frame rail.

Optionally, the kickstand may be a pair of kickstands, namely a front kickstand and a rear kickstand, adjustable in width and insertable through the clamping means and clamped onto each end of each horizontal support frame rail and extending substantially vertically therefrom.

For further strength of the movable support in a stationary position of use as a utility table, the kickstand may include a substantially vertical left leg, substantially vertical right leg, and a kickstand connecting bar detachably extending horizontally between the left and right legs. Each of the left and right legs of the kickstand may include a lower end and a height adjustable member insertable to the legs by means of a swivel joint for allowing the legs to rotate freely.

The height adjustable members adjust the height of each leg, preferably by insertion of a first pin, such as a locking pin or a spring pin, insertable within a selected aperture of a plurality of pin apertures in substantially vertical orientation, wherein the height adjustment member is removably insertable into each leg for a predetermined incremental height interval, such as about one inch.

Besides this macroadjustment of the kickstand leg by selective insertion of the pin into a selected aperture, the height can be adjusted by a microadjustment means, including the kickstand having a screw end and the lower end of the leg includes a receptacle, for the screw end, for fine adjustment of the height of the movable support, where the distance between the edge of the leg of the kickstand and the lower edge of the height adjustment member is a clearance distance.

The heavy duty clamp also includes an optional outside surface having a hinge for removably attaching at least one rotatable swivelable accessory therefrom, wherein the accessory is an examination or surgical lamp having a flexible or hinged neck, an instrument tray, an arm or leg limb platform support or a gravity or pump fed intravenous (IV) pouch support having an insertable vertical rod and a component for insertion into the vertical rod into the hinge.

The hinge accessory may include a splitting attachment having an insertion pin for removable and rotatable communication with the hinge, and at least two hinges extending substantially vertically for additional components in a stacking arrangement, such as, for example, one instrument tray being elevated above another instrument tray.

If there is a person with blood loss during surgery in the field, this convertible cart/utility table can also have an auxiliary fluid catch draining fluids into a closed shallow bucket.

In addition, medical accessories and a power pack for lighting and for instrument power can be attached to the cart.

In the basic cart mode a transverse member connecting the load support members is not necessary, as the downwardly extending struts accommodate the axles for one or more pairs of wheels, which act as transverse support members for the cart in its basic transportable cart embodiment.

The load support member itself may be a) a resting member supporting a load thereon or, b) it may be a clamp. The clamp may be adjustable by a handle, which may have a stop to prevent complete unscrewing of the stud of the handle so that the clamp cannot come apart. The clamp can be a pair of jaws, or it can be a longitudinally extending slider clamp where the load support slides into a recess between two overhanging cantilevered members extending upward from the base.

The convertible cart/utility table is also useful in military and emergency situations. For example, in addition to rescue of injured military or civilian personnel, the cart may be used in areas contaminated by toxic substances or weather related disasters. Besides moving an injured party in a triage situation to a treatment area in a detoxification environment caused by a weapon of mass destruction such as gas, smoke or other noxious particles, there may be a necessity for a wash of the persons so the contaminated persons can be brought by the convertible cart/utility table to a wash area where they are first immediately washed of surface contaminants. In this weapons of mass destruction treatment facility there can be any one of these pieces of equipment to wheel the injured persons to decontaminate them. If they are not ambulatory, for any further treatment they can be brought to the medical facility.

The medical facility can set up as a fully operational ten (10) or more bed field hospital treatment facility with ten (10) or more sets of bins carried on ten or more carts, wherein each upper most bin shell container of each set of containers for each bin can be tilted and moved can be moved from a horizontal carrying position to a vertical stand upright position with drawers extending outward therefrom. A mobile hospital is modular in its design. If there is a need for more than ten (10) beds, then increment units of ten can be provided and deployed to a site. For rapid deployment, the convertible cart/utility table with cargo hauling bins can be hauled by all terrain vehicles in a rapid manner.

In addition, the convertible cart/utility table easily converts without tools from either a wheeled embodiment to a fixed table embodiment wherein the wheels are replaced by one or more kickstands. When in the utility table mode, the cart can have extending therefrom, by clamps, one or more swivelable platforms supporting injured limbs of a person or medical supplies such as an instrument tray, a light, an I.V. tube pole, etc. In this case, the platform is pivotable, but not removable. It pivots like a hinge to any desired position.

Auxiliary transverse bars can be added when in the fixed table embodiment. Additionally, there are micro and macro adjustments of the height of the cart depending on the need for access to the injured person on the cart. For example, there are macro adjustments in one-inch (1") increments to raise the cart up and there is also a micro adjustment by a threaded member for up to a one-inch (1") of micro adjustment.

To hold rescue stretchers or other carrier rails, a heavy-duty utility clamp has a concave hook portion for dropping in a stretcher rail and a lower concave portion for dropping in a rail holding an auxiliary fluid catch basin or sling. However, one end of the stretcher can be put in a lower concave hook of the heavy-duty utility clamp to slant the position of the stretcher. Furthermore, by adjusting the transverse bars and/or the axles, the width of the utility table can be widened, so it is totally adjustable to fit any size carrier or stretcher.

In addition, in order to raise the head of an injured party, raising one end and lowering the other end can slant the table portion. A preferable ten-degree (10°) adjustment can be done with the adjustable foot height and then there is an additional five degrees (5°) by adjusting the heavy-duty clamp and raising or lowering one end of the stretcher on the utility table.

Hinged platform arm or leg board platforms may extend from a clamp attached to the frame rail of the utility table. The platforms swing out radially in a horizontal plane, to provide maximum adjustability for the position of the limbs of a victim or for the positioning of medical/surgical accessories, such as intravenous stands, instrument trays or examination lamps. It is further noted that attached to the auxiliary arm board platforms may be poles for supporting an intravenous fluid pack or a tent to repel insects from the treatment environment. While other suitable measurements may be used, these arm board platforms are preferably six inches (6") wide and the leg boards approximately eight inches (8") wide.

The convertible cart/utility table also optionally includes a clamping means, which may be a latch, a pair of clamping jaws, a longitudinally extending slotted extrusion or a receptacle.

The axle-carrying struts each have a lower end with an axle mounting means at the lower end and at least one axle extending through each axle-carrying vertical strut. Each axle has at least one vehicle movement actuator, such as a wheel or a ski, of a pair of vehicle movement actuators attached at opposite sides of the convertible cart/utility table, which also has a carrier attachable to the load support member, wherein when the carrier supports a load thereupon. Such a carrier may be a hollow well, a bin, a pair of rails, a rescue stretcher or Stokes carrier or other support surface or container optionally the carrier may be rotatable from a horizontal position of travel to an upright position as a shelved cabinet.

The parts are easily assembled and disassembled without the necessity of tools. For example, the parts can be held together by clamps or receiving receptacles including a spring pin aperture for receiving a push pin for secure interconnecting of a component of the convertible cart/utility table, such as the handle tube within the receiving member of the load support member. The components can also be held in place by pins or other fasteners positioned within diametrically opposed transverse holes for allowing a through pin to extend therethrough. PINS While in simple embodiments the convertible cart/utility table includes a single pair of wheels attached by struts extending down from the load support members, in other embodiments the convertible cart/utility table includes two pairs of axle load supports and four vehicle movement actuators, such as wheels.

To convert from a movable support, such as a convertible cart to a stationary utility table, the downwardly extending axle-supporting struts are detached by their clamping means from the load support members, and replaced by stationary kickstands, which contact the ground to maintain the utility table in a stationary position.

One kickstand may be used with the wheeled struts still in place, although for maximum stability all wheeled struts are replaced by kickstands.

The kickstand may be a single rod extending from the load support member to the ground, or it may be an H-shaped or U-shaped pair of downwardly extending rods connected by a widenable transverse member, to vary the width of the convertible cart/utility table.

The convertible cart/utility table may also include at least one cargo bin removably connected to the load support member.

Each of the cargo bins preferably includes a top shell container of a plurality of shells, each having a top outer surface and an opposing top inner surface; a bottom shell having a bottom outer surface and an opposing bottom inner surface. The top outer surface includes a boss arrangement and the bottom outer surface includes a recess arrangement corresponding with the boss arrangement, for aligning a plurality of the cargo bins to be vertically stacked one on top of each other in a caravan of bin-hauling carts. There may also be one or more intermediate shell containers.

The bin of the convertible cart/utility table has one or more latches for removably connecting the top shell to the bottom or intermediate shell, wherein the latch is optionally lockable. Preferably, each bin is made of a sturdy, lightweight material, such as fiberglass.

A top shell can be removed from the stack of bins and stood upright as a medical or other supply cabinet, which includes slidable drawers, anchored to and within the top shell of the cargo bin. Preferably, the top inside surface and the bottom inside surface of the shells of the bin each includes a foam lining for limiting the movement of contents within the cargo bins. Additionally, the shells further include one or more optional removable interior containers.

The mission-adaptable components may therefore deploy a portable cargo bin having a cabinet system and at least one locking latch, and be secured to the collapsible cart/utility table, in a method including:

i) in the case of the collapsible cart/utility table having vehicle movement actuators, such as wheels, securing the wheels in place to prevent movement, ii) applying force to tilt the collapsible cart/utility table about a first axis until a first rest position is reached, wherein the force is optionally applied to a pair of handles in connection with the collapsible cart/utility table, and the first axis of tilt being the vertex formed of the intersection between the bottom outer surface and a bottom front surface;

iii) unlatching the straps holding the shells of the bin;

iv) applying force to tilt the collapsible cart/utility table about a second axis until a second rest position is reached, wherein the second axis of tilt is the vertex formed of the intersection between the top outer surface and the top front surface;

v) disengaging the latch or latches; and vi) separating the top shell from the bottom shell and the portable cart/utility table, allowing it to return to the first rest position or optionally to return fully to the initial standing position.

The convertible cart/utility table may also include a modular load support member which includes at least one axle-carrying strut extending downward therefrom, a receiving member for receiving an adjustably removable handle tube and optionally a clamping means.

The clamping means may be an extrusion slider clamp rigidly attached to the modular load support member, having a top clamp surface, an inside edge and an outside edge. The top clamp surface further includes a groove formation aligned with the inside edge and the outside edge for horizontally receiving a carrier therein.

In this case, the axle carrying struts have a lower end with an axle mounting means at the lower end, at least one axle extending through each axle-carrying strut. Each axle has at least one vehicle movement actuator of a pair of vehicle movement actuators attached at opposite sides of the cart and a carrier attachable to the clamp, wherein when the carrier supports a load thereupon.

The axle carrying struts may each includes a lower end with an axle mounting means at the lower end, at least one axle extending through each vertical strut and a plurality of transverse holes for resisting impact. A carrier is attachable to the load support member, wherein when the carrier supports a load thereupon. Additionally, each axle carrying strut may have a pair of support trusses for increased load support, the trusses being rigidly connecting the axle carrying support and the extrusion clamp.

As a result, the convertible cart/utility table is mission adaptable for a variety of missions, and is not mission specific, such as for one particular task. The components break down into interchangeable parts, and are easily transported or stored for adaptability to a myriad of tasks in both friendly and hostile environments.

DESCRIPTION OF THE DRAWINGS

The present invention can best be described in connection with the accompanying drawings, in which:

FIG. 30 is a perspective view of an anti-tipping attachment for connecting a bicycle to the portable cart of the present invention;

FIG. 31 is an exploded perspective view of the components of FIG. 30;

FIG. 32 is a side elevational view of an alternate embodiment of the portable cart of this invention with four wheels, shown with a covered cargo-hauling bin;

FIG. 32A is a top plan view of the cover for a bin used with the cart as in FIG. 32;

FIG. 32B is a top plan view of the bin used with the cart as in FIG. 32;

FIG. 32C is an exploded view of the cover and bin as in FIG. 32;

FIG. 32H is an exploded perspective view of an alternate embodiment of a load support has a plurality of spaced apart, downwardly extending axle carrying struts and a receiving member for a handle tube, has an upper pushpin aperture and a pair of opposite holes for a through pin to extend therethrough, showing two axles accommodating a pair of dual wheels in coaxial orientation;

FIG. 32I is a close-up perspective view of the receiving member and handle spring pin engaged in the receiving member as in FIG. 32H;

FIGS. 32K, 32L and 32M are side elevational views of the sequence of the disassembly of one of the cargo hauling bins to a deployed standing position with operable sliding draws;

FIG. 32O is a local perspective view of an optional trailer hitch assembly;

FIG. 32P is a side elevational view of an all-terrain vehicle pulling the four-wheel cargo bin-hauling cart with the trailer hitch as in FIG. 32O.

FIG. 39 is a perspective view of a horizontal support member with two short identical clamping members installed in the T-slots at the extreme ends;

FIG. 40 is a side elevational view of an alternate embodiment for a rescue carrier cart with shortened horizontal supports and with a pivotable kickstand;

FIG. 41 is a front elevational view of the kickstand portion of the rescue carrier cart as in FIG. 40;

FIG. 42 is a side elevational view of the rescue carrier cart as in FIG. 40, shown with the kickstand pivoted in a transportable position of rest;

FIG. 43A is a perspective view of a low profile rescue carrier cart shown with an alternate embodiment for a stretcher bearing assembly having a reversible handle/cart support;

FIG. 43B is an exploded perspective view of the stretcher-bearing tube components of the stretcher-bearing assembly of FIG. 43A, showing interlocking spring-loaded pin and receptacle fasteners;

FIG. 43C is a detail view of the spring-loaded pin as in FIG. 43B;

FIG. 43E shows the low profile rescue carrier cart, in a side elevational view;

FIG. 52 is an exploded perspective view of the cart as in FIG. 51, shown during assembly, wherein arrows indicate directional movement of rotation about the axis of the rails shown therein;

FIG. 52A is a perspective view thereof showing one wheel in place upon an axle;

FIG. 53 is a close-up cutaway view of the spring stop member regulating outward movement of the optional rails of the cart of the present invention from a storage position to a position of use;

FIG. 62 is an end view of wheel subassembly attachment mechanism in engaged position;

FIG. 63 is an end view of wheel subassembly attachment mechanism in disengaged position;

FIG. 64 is an end view of attachment clamp for tubular overhead bar;

FIG. 67 is an end view of wheel brake mechanism in applied position;

FIG. 68 is an end view of wheel brake in an off position;

FIG. 69 is an end view of side rail adjustable clamp; and,

FIG. 70 is a perspective view of adjustable clamp assembly.

FIG. 74 is an exploded perspective view of an assembled convertible cart/utility table in the utility table mode, showing an auxiliary power pack attached thereto and a medical stretcher above;

FIG. 75 is a side elevational view of the convertible cart/utility table in the utility table mode as in FIG. 74, shown in a tilting feature with one portion of the utility table being raised higher than a higher opposite lower end proportion, and showing an optional body fluid captive collector;

DETAILED DESCRIPTION OF THE PREFERRED EMBODIMENTS

Figure 1:
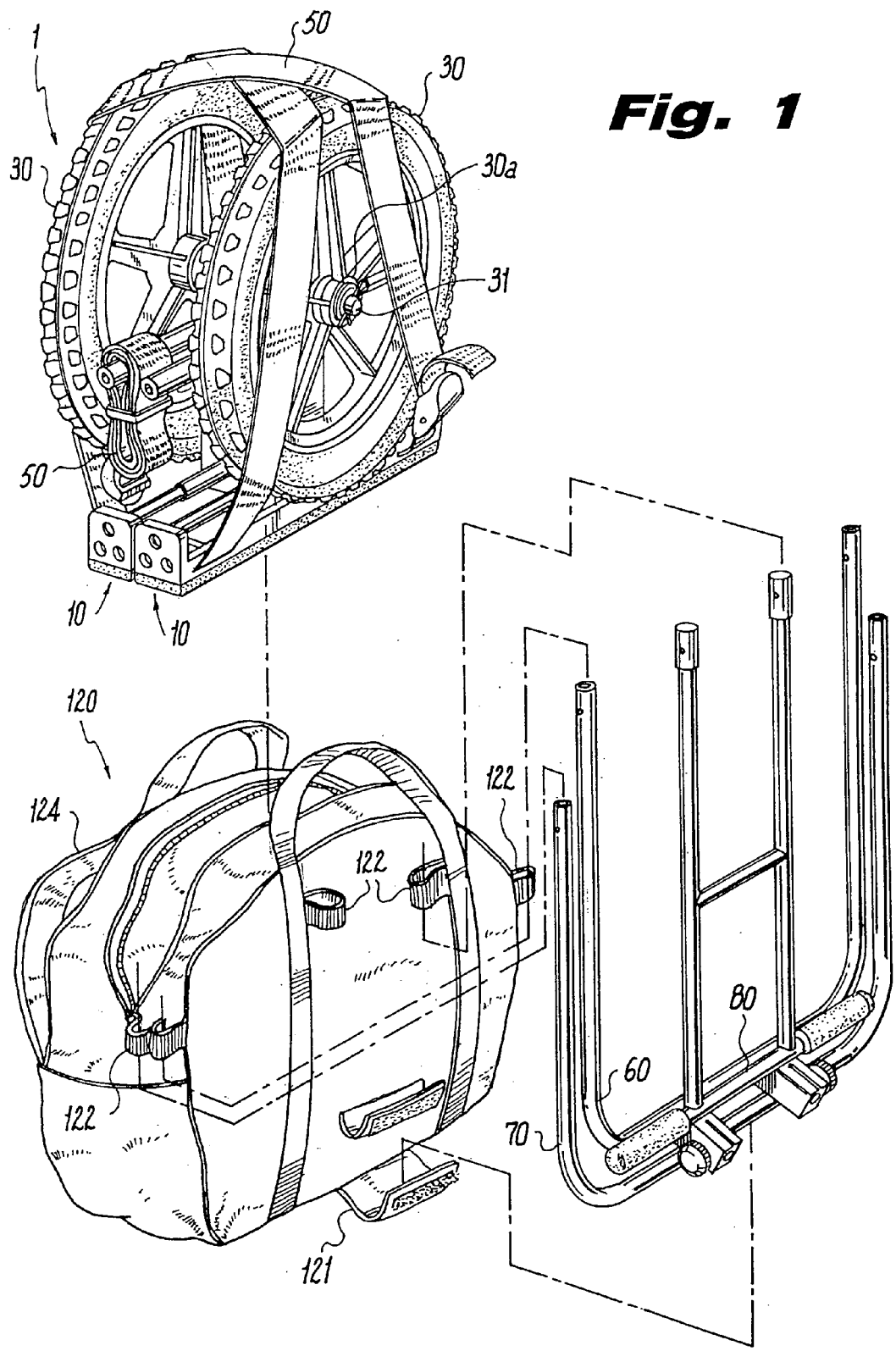
FIG. 1 is an exploded perspective view of the components of the basic cart embodiment broken down for transport within and on the storage backpack.

As shown in the drawing FIGS. 1–70, the present invention is directed to a mission-adaptable set of components forming a convertible cart/utility table. For example, the present invention may include foldable cart 1, having a load support for carrying a load, such as a boat, such as a canoe, which can also function as a game cart or a wagon for carrying gear in outdoor field applications.

FIG. 1 shows cart 1 in a disassembled storage position with a pair of horizontal load support members 10 laid parallel adjacent to each other, supporting wheels 30 thereon. Wheels 30 are secured in place by a transverse connecting rod 31 through wheel hubs 30a and by one or more load securing straps 50. Disassembled storage cart 1 is inserted within carry bag 120, which includes ledge 121 and fabric loops 122 for holding bracket members 60, 70 and handle 80 outside of carry bag 120.

Figure 2:
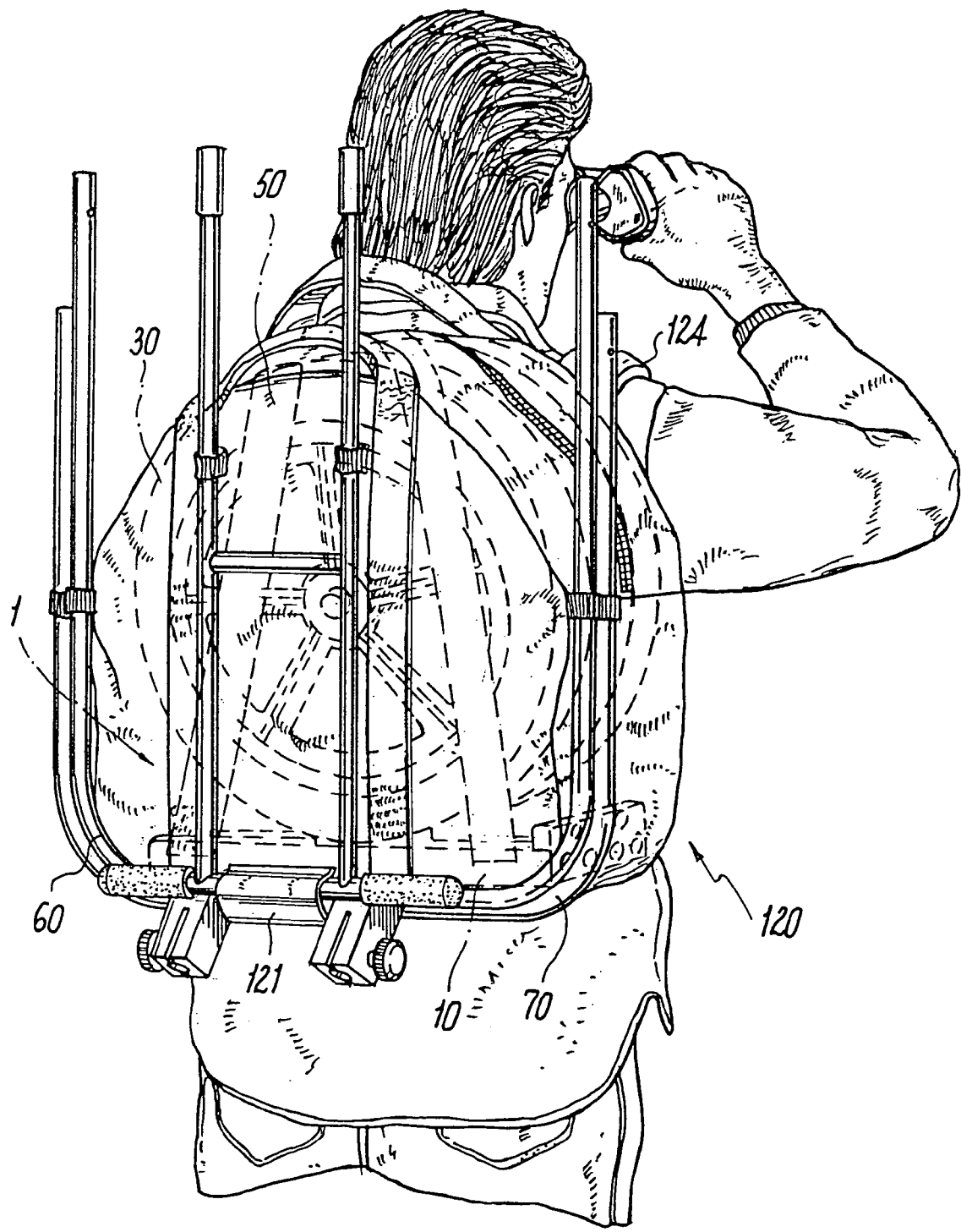
FIG. 2 is a perspective view of the backpack on a user, with the cart contained therein.

To transport portable cart 1 by hand carry straps 124 are attached to carry bag 120. Conversely as shown in FIG. 2, to transport portable cart 1 upon the back of a user, carry straps 124 are attached to carry bag 120, which supports portable cart 1 in a weight bearing manner, or else horizontal support members 10 are inverted to support portable cart 1 in a weight bearing manner, and carry bag 120 covers portable cart 1 in a non-weight bearing manner.

To be disassembled in a carry position, U-shaped bracket rails 60,70, wheels 30 and axle members 32 are inversely attached to horizontal load supports 10 to comprise a folded manually transportable cart.

Figure 3:
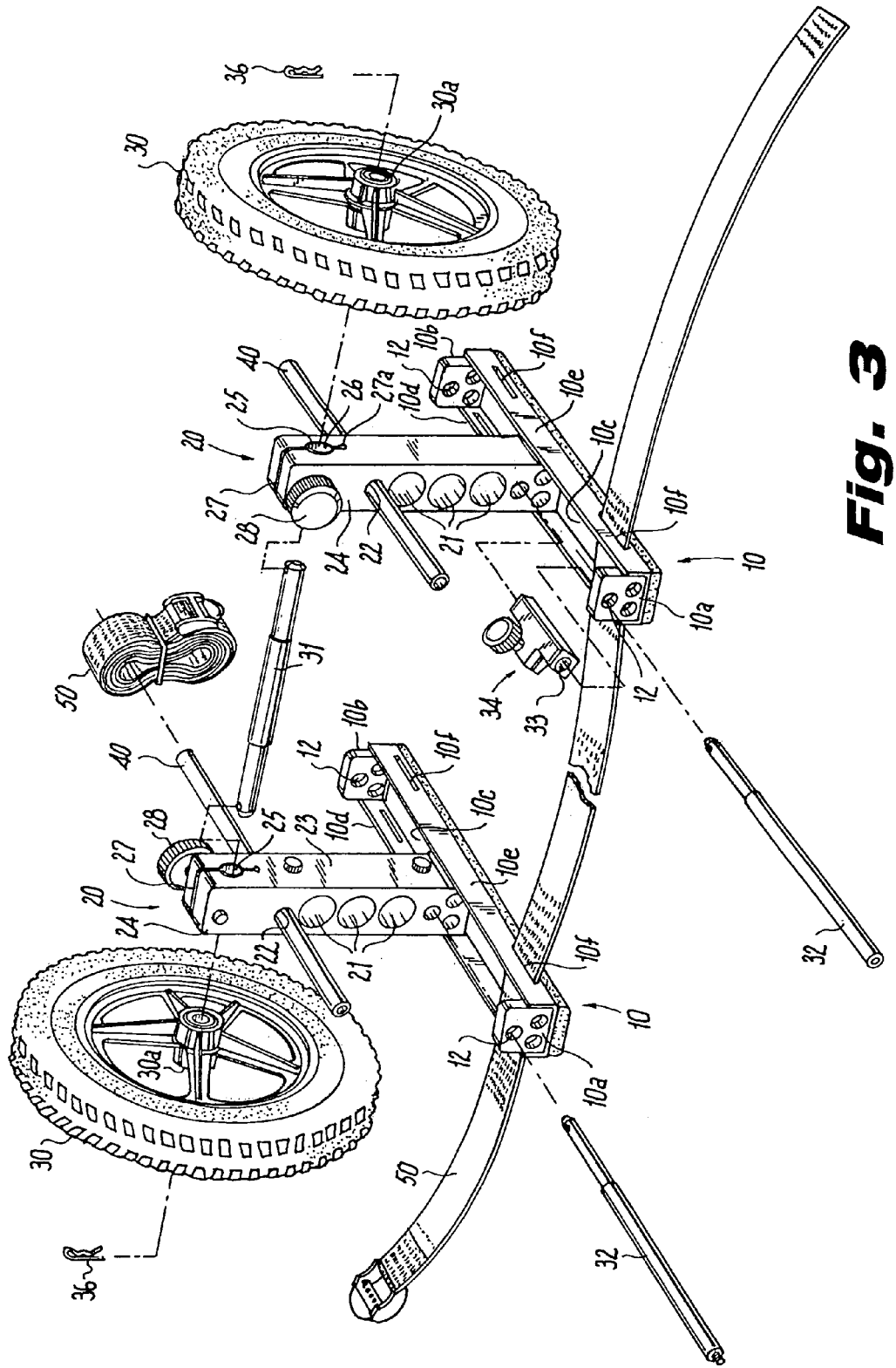
FIG. 3 is an exploded inverted perspective view of the basic cart embodiment components, disassembled from their original transport configuration.

As shown in the exploded view of FIG. 3, in the storage position, in a preferred embodiment, cart 1 includes a pair of parallel, spaced apart inverted horizontal load support members 10. Support members 10 each have a front-end 10a and a rear end 10b. The front and rear ends 10a, 10b each have at least one axially placed receptacle aperture 12 extending longitudinally within each load support member 10, for holding structural components therethrough in a storage position, such as axle members 32 for wheels 30. In this storage position, axle members 32 are also inserted within aperture of 33 of axle connector 34.

FIG. 3 also shows horizontal load support members 10 having preferably a generally upside down U-shaped configuration when viewed in cross-section, wherein a generally flat member 10c has downwardly extending flanges 10d, 10e including one or more linearly extending slots 10f for insertion of holding straps 50 therein.

Although apertures 12 are shown in the drawings, it is contemplated that other configurations may be applicable to horizontal load support members 10, so long as other members, such as rails 60, 70 and so forth, may be attached thereto by fasteners, preferably in an axis parallel to the axis of horizontal support members 10.

While size may vary, support member 10 is preferably sixteen (16) inches long and two and a quarter (2.25) inches wide. Each flange 10d, 10e extends down about one (1) inch from flat member 10c. Slots 10f are preferably 2.125 inches wide and 0.1875 inches high, to accommodate straps 50, such as, for example, standard 2-inch wide fabric straps.

FIG. 3 also shows vertical struts 20 optionally having at least one small hole 22, such as kickstand receptacle aperture 22, for insertion of optional kickstand 40 therein.

FIG. 3 also shows horizontal load support members 10 being respectively demountably attached to a pair of vertical struts 20, having apertures 21 and 22. In one embodiment, horizontal load support members 10 can be demountably attached to vertical struts 20, but in an alternate embodiment they can be permanently affixed to each other, such as in the alternate embodiments shown in FIGS. 3A and 3B.

Moreover, while preferably horizontal struts are U-shaped, as in FIG. 3, in alternate embodiments other configurations can be used, as long as vertical strut 20 can be attached to horizontal support member 10.

Figure 3A:
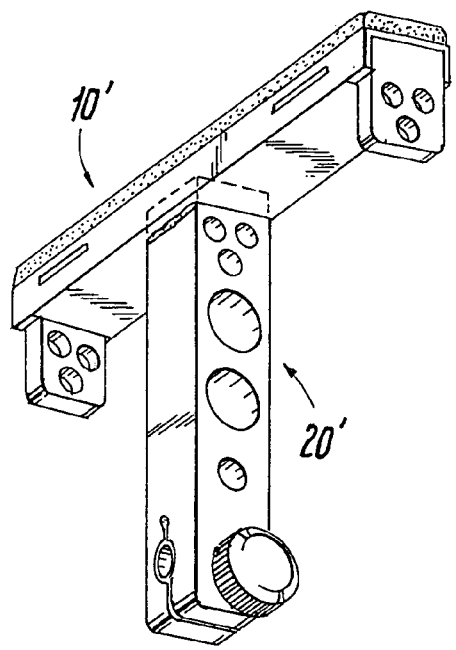
FIG. 3A is a perspective view of an alternate simplified embodiment where the vertical strut is permanently attached to a horizontal member in a "T" configuration.
Figure 3B:
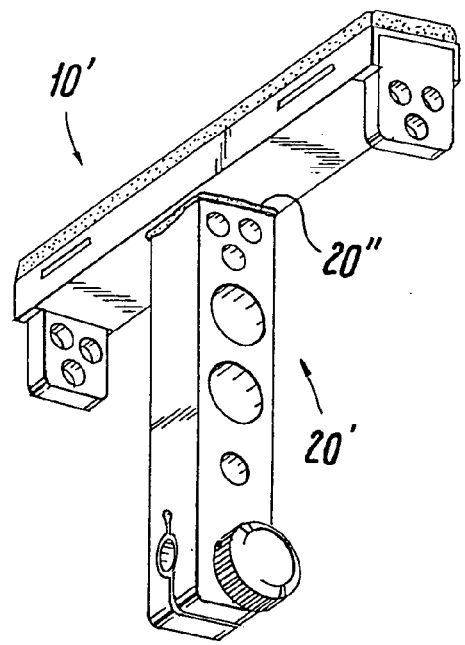
FIG. 3B is a perspective view of an embodiment where the horizontal support is permanently affixed to the vertical strut by welding or other means.
Figure 3C:
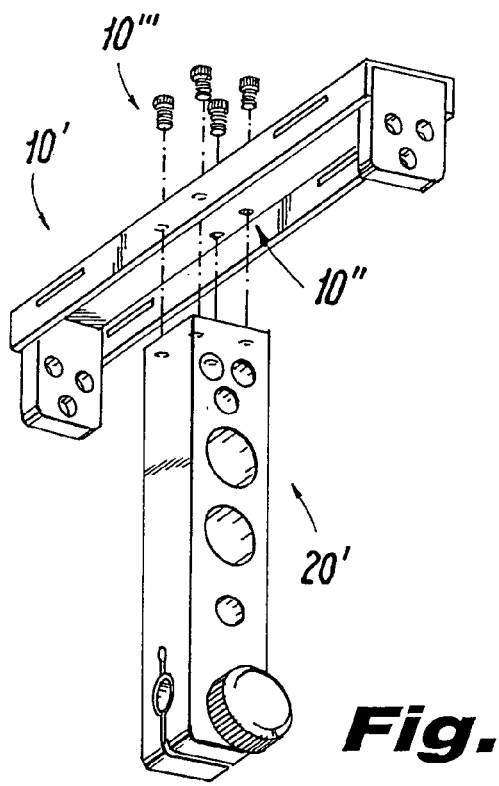
FIG. 3C is an alternate embodiment where the vertical strut fits within a hole in the horizontal support and is fastened by a fastener.

For example, in FIG. 3A vertical strut 20' is in a unified T-shaped member with horizontal support member 10'. In FIG. 3B, vertical struts 20, and horizontal support members 10' are attached by weldment 20". In FIG. 3C, vertical strut 20' is inserted in hole 10" of horizontal support member 10', and attached by fastener 10''', such as a screw or other fastener. In these alternate embodiments shown in FIGS. 3A, 3B or 3C, horizontal load support members 10' may be solid in cross sectional configuration. One such configuration shown in FIGS. 3A, 3B and 3C is that of a parallelepiped, namely a solid form, all of whose sides are parallelograms, such as rectangles, and whose opposite sides are parallel to one another.

In another embodiment vertical strut 20 may be adjustable in length with a sleeve containing a telescopic shaft (not shown) and with a spring urging the shaft in and out of the sleeve, with a lock provided. Kickstand 40 is shown deployed in FIG. 4. Kickstand 40 is secured in place by a fastener, such as nylon set screw 37. Setscrews 37 also hold axle members 32 in the storage position through vertical struts 20.

Vertical struts 20 are preferably made from 1½×2-inch solid bar stock anodized aluminum, or stainless steel. Vertical struts 20 are preferably about 10.25 inches long, 2 inches wide and 1½ inches in depth.

Also shown in FIG. 3, the plurality of optional larger holes 21, such as holes, which are 0.765 or 1.625 inches in diameter, are located on a front side of vertical strut 20. Smaller hole 22 on the bottom accommodates kickstand 40, which is preferably a hollow aluminum tube of 0.75-inch diameter and 16 inches in length.

Optional larger holes 21 within vertical strut 20 are provided for weight reduction of portable cart 1.

On a side 23 transverse to the front 24 of each vertical strut 20, at a lower portion 20a thereof, is provided a further hole 25 of about 1-inch in diameter for insertion of each axle member 32 therethrough. Hole 25 has a permanently affixed, bushing 26 therein, such as a PVC (polyvinyl chloride) bushing, to prevent wear and tear of each aluminum axle member 32 by the aluminum surface of hole 25.

Figure 4:
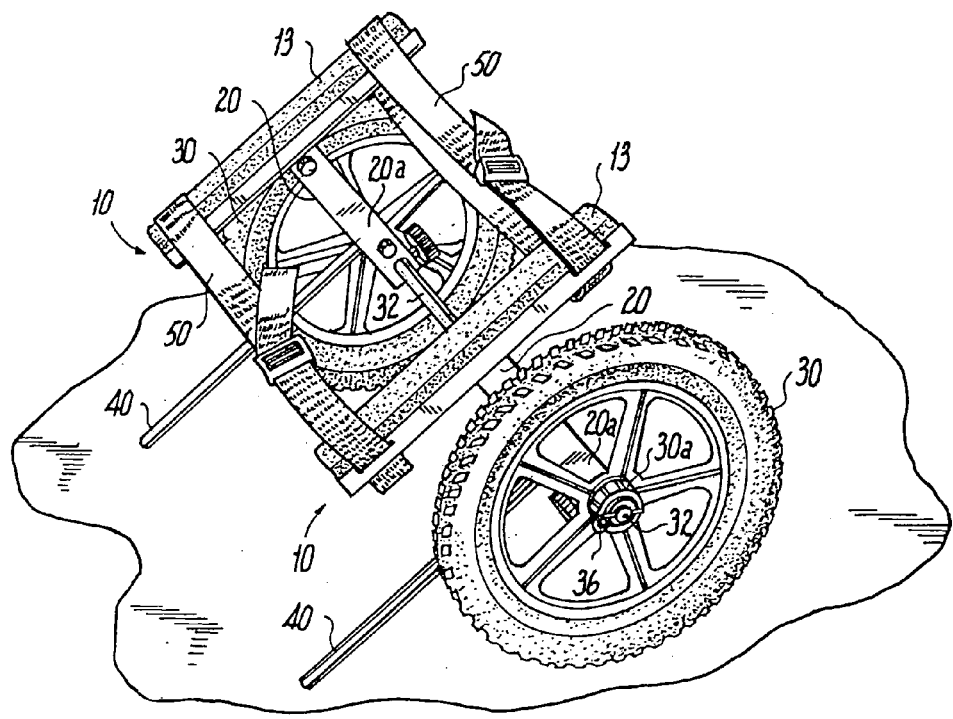
FIG. 4 is a perspective view of the assembled boat cart.
Figure 6:
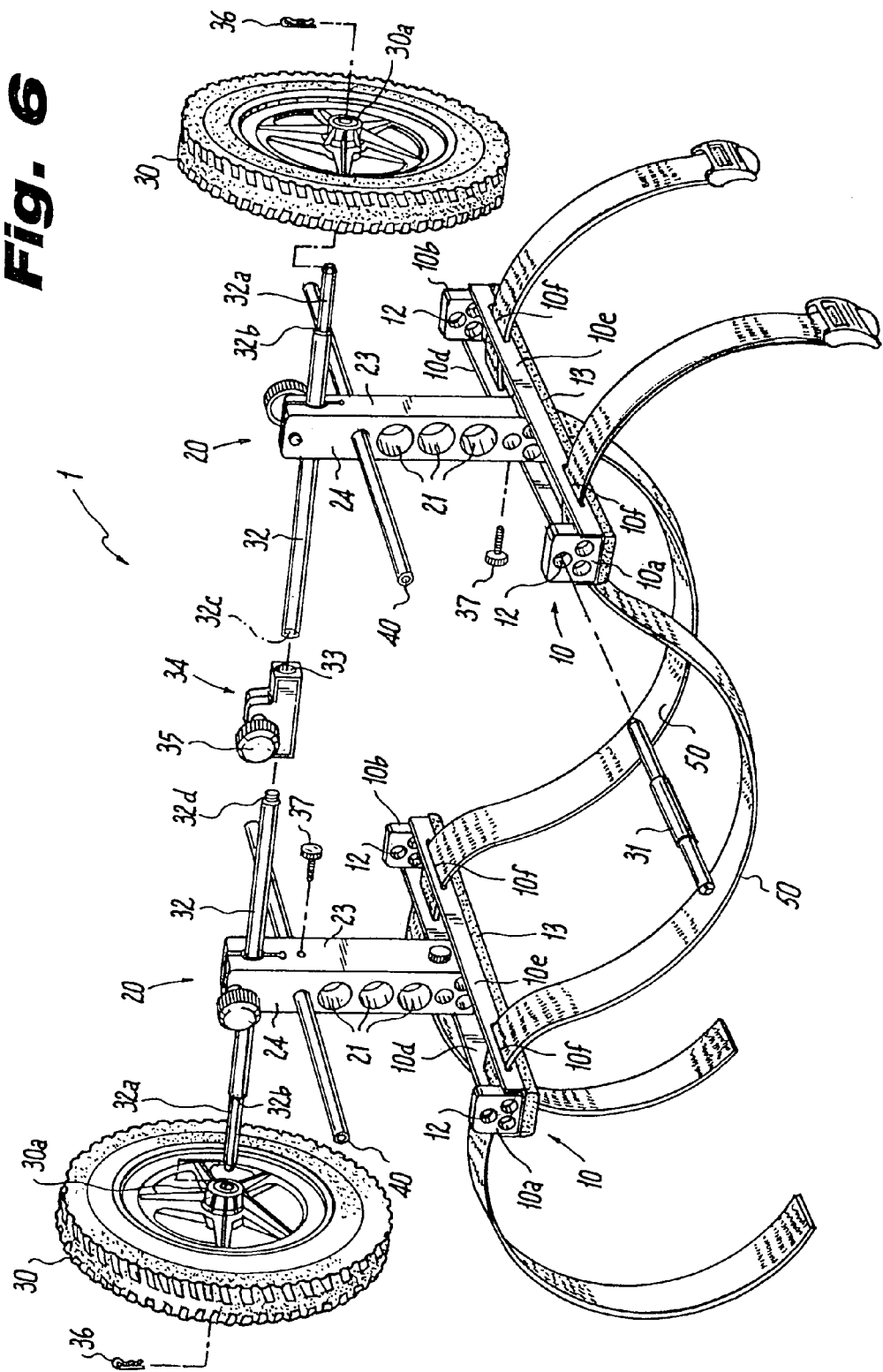
FIG. 6 is an exploded perspective view, inverted, of the components required to assemble the boat cart.

As also shown in FIGS. 3, 4 and 6, each wheel 30 is demountably attached at an end, respectively, to a pair of axle members 32, with axle members 32 extending inwardly from and demountably attached to lower portion 20a of the respective vertical struts 20, wherein axle members 32 are in a transverse relationship to horizontal load support members 10. Fasteners, 36, such as cotter pins, hold each wheel 30 upon each axle 32.

Each axle member 32 is received within each hole 25, of each lower portion 20a of each vertical strut 20. A compression groove 27 exists from the underside of vertical strut 20 to hole 25 and continues to further through hole 27a, providing for compression of lower portion 20a of vertical strut 20.

To accommodate narrow or wider cargo, such as watercraft of varying widths, the distance between vertical struts 20 can be varied along the axle length by loosening and tightening the tightening member 28 and moving vertical struts 20 laterally apart or towards each other along axle members 32.

Although optionally a one-piece axle may be used (not shown), preferably the pair of axle members 32 are held in opposite axial orientation by straight rigid axle connector 34. Axle connector 34 has tightening member 35, and a pair of receptacles 33 at the respective two ends of axle connector 34, so that axle members 32 respectively extend outwardly from, and are demountably attached within, the axle connector receptacle bore 33.

Figure 33:
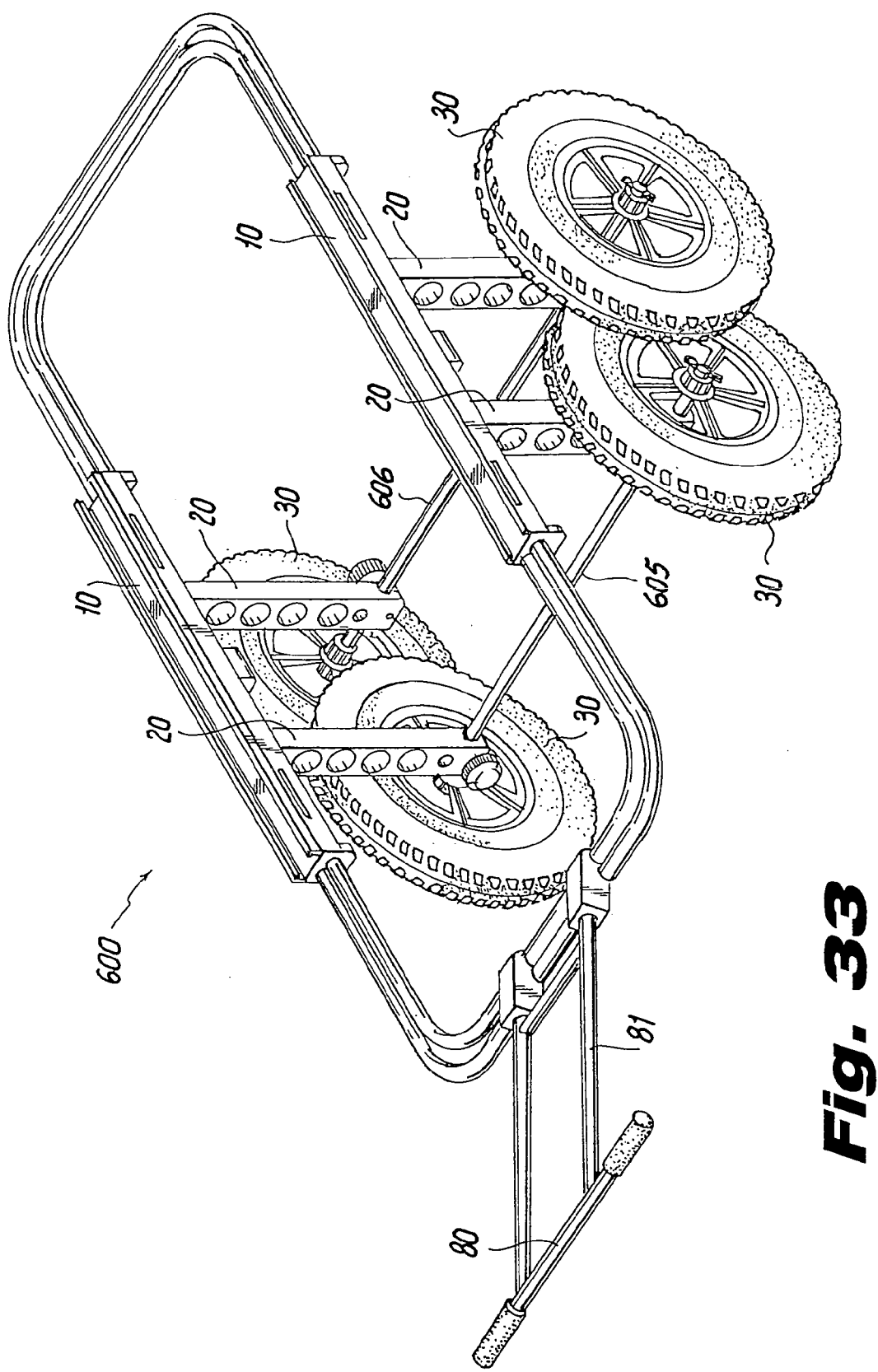
FIG. 33 is a perspective view of one embodiment for an assembled frame of a portable cart with four wheels.
Figure 33A:
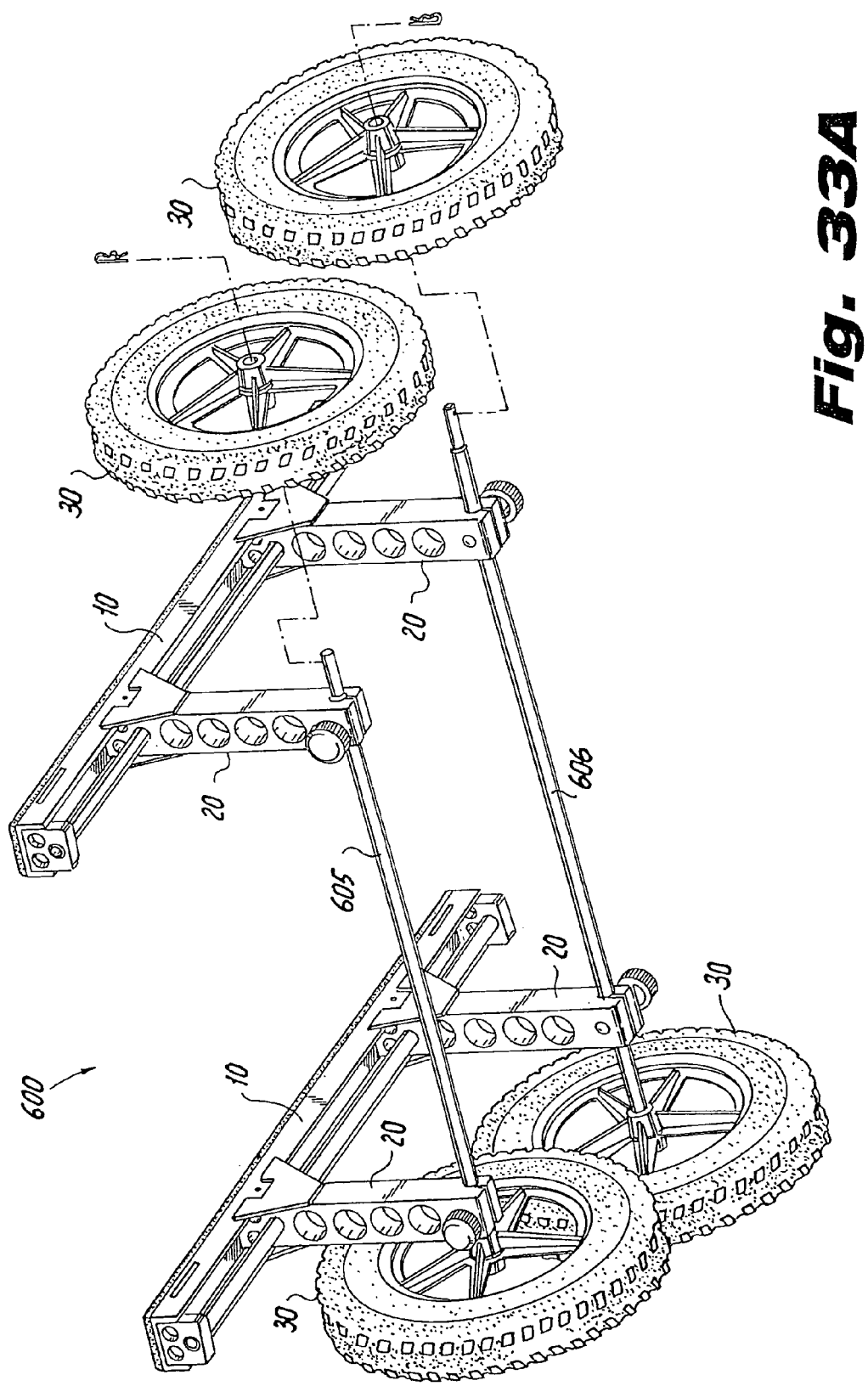
FIG. 33A is a bottom perspective view of the chassis and wheel portions thereof.
Figure 34:
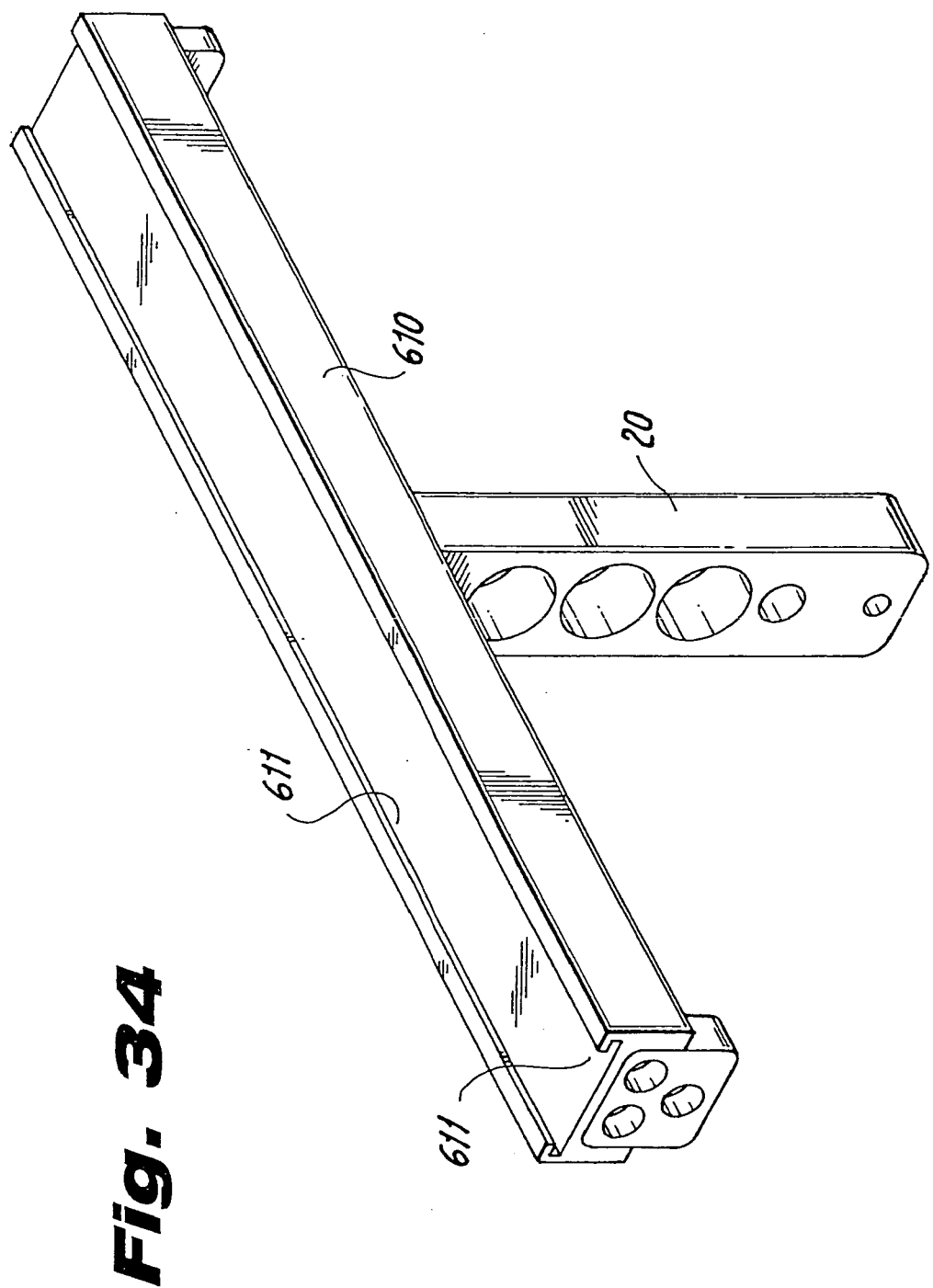
FIG. 34 is a perspective view of an alternate embodiment of a channeled horizontal load support member with an integral T-slot.

While the axle may be optionally a one-piece axle, such as shown as reference numeral 606 in FIG. 33 herein, preferably the pair of connected oppositely extending axle members 32 form together an axle for wheels 30.

Each axle member 32 is made of solid round stock of anodized aluminum or stainless steel, approximately 0.75 inches in diameter. At the wheel-supporting end 32a, the diameter is about 0.59 inches in diameter with shoulders 32b of about 0.08 inches in height, transverse to the axis of axle member 32. These shoulders 32b provide a resting surface to prevent axial movement of wheel 30 upon axle member 32.

Figure 7:
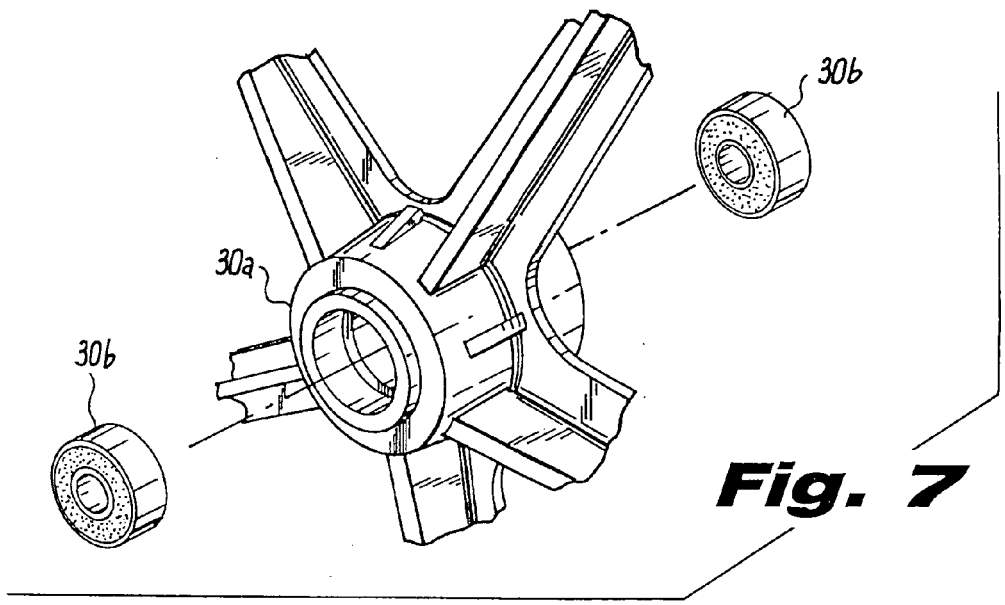
FIG. 7 is an exploded perspective of a typical wheel, showing two press fit bearings adjacent an integrally molded hub.
Figure 8:
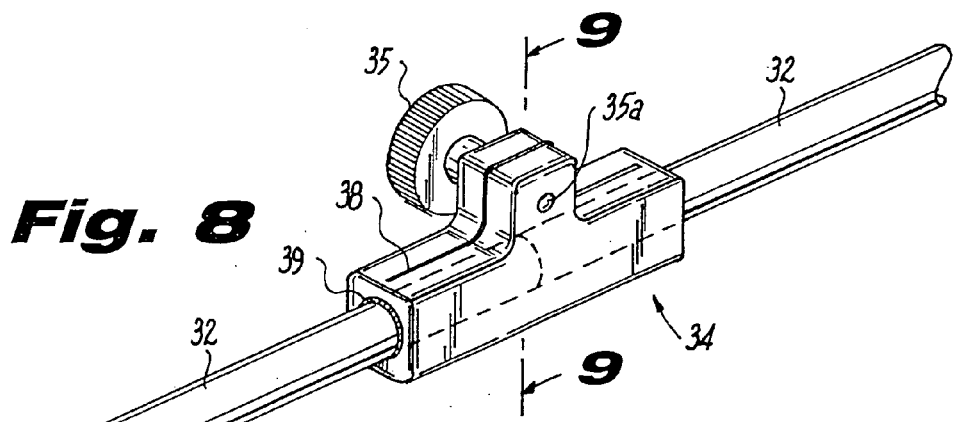
FIG. 8 is a perspective view of an axle-locking member, installed on the assembled axle.

As shown in FIG. 7, each wheel 30 rotates about press fit bearings 32b, while each wheel 30 is positioned upon each respective axle member 32 of FIG. 8. As shown in FIG. 6, at the opposite end of one axle member 32, there is provided a hollow, threaded recess 32c of about 0.75 inches deep, to accommodate a connecting threaded member 32d of other axle member 32, to axially connect both axle members 32 together within axle connector 34, with a wheel 30 at each end.

Figure 9:
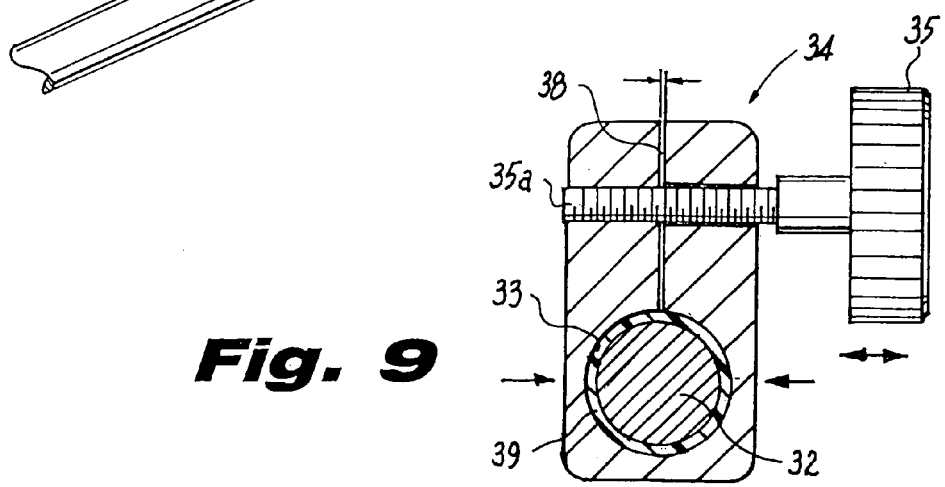
FIG. 9 is a sectional elevation view, taken through lines 9—9 of FIG. 8, showing the locking member compressing and locking the axle joint.

FIGS. 8 and 9 show how axle connector 34 is compensated along groove 38, thereby locking axle members 32 within bushing 39, which is within receptacle bore 33 of axle connector 34, by tightening of tightening bolt 35a of tightening member 35. Preferably bushing 39 is a PVC (polyvinyl chloride) bushing. Groove 38 is preferably 1/16 to 1/8 inch, in width, which allows for the compression of axle connector 34 around axle members 32. Tightening bolt 35a is inserted within a conventional receptacle which is a through hole at the proximal end and which is tapped with threaded grooves at the distal end, to allow for compression of axle connector 34.

FIGS. 4 and 6 also show at least one kickstand 40, preferably a pair, respectively extending horizontally rearward from each lower portion of vertical struts 20. Each kickstand member 40 extends rearwardly from the at least one kickstand receptacle aperture 22 of respective vertical struts 20 and each kickstand 40 is demountably attached within each respective kickstand receptacle aperture 22. Each kickstand member 40 is preferably contoured so as to contact the ground to stabilize portable cart 1 is a parked position of rest.

Figure 5:
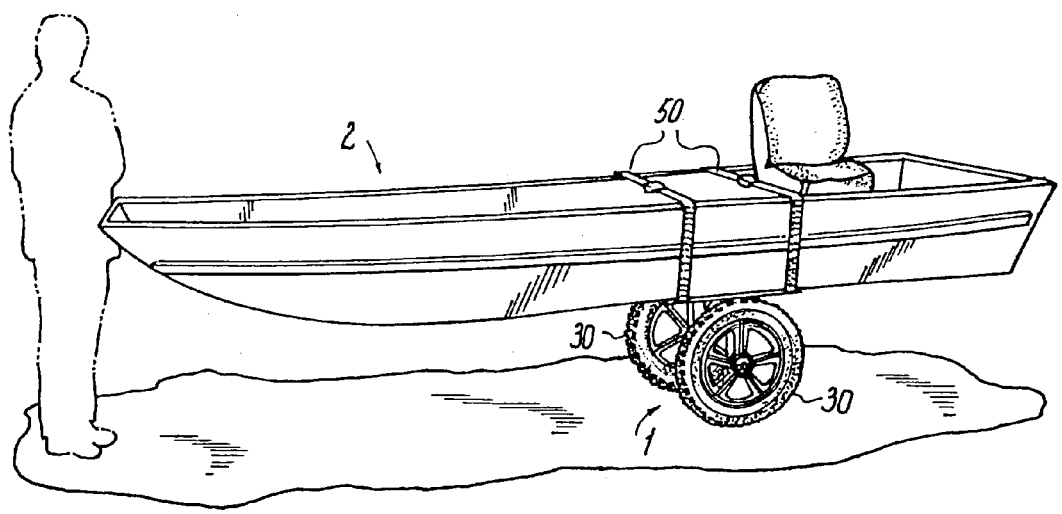
FIG. 5 is a perspective view of the assembled cart with a boat fastened for transport.

As shown in FIG. 5, to hold a canoe, game or cargo in place upon cart 1, one or more adjustable load-securing straps 50 are slidably attached to both respective horizontal load supports 10 in a transverse relationship to load supports 10. Straps 50 are preferably reinforced flexible canvas straps of about 2 inches in width.

To complete portable cart 1 as a canoe or boat cart, FIG. 4 shows support cushions 13 mounted upon respective horizontal load supports 10. Support cushions 13 are flexible, such as of rubber or foam, to support the weight of boat 2 thereon.

Figure 10:
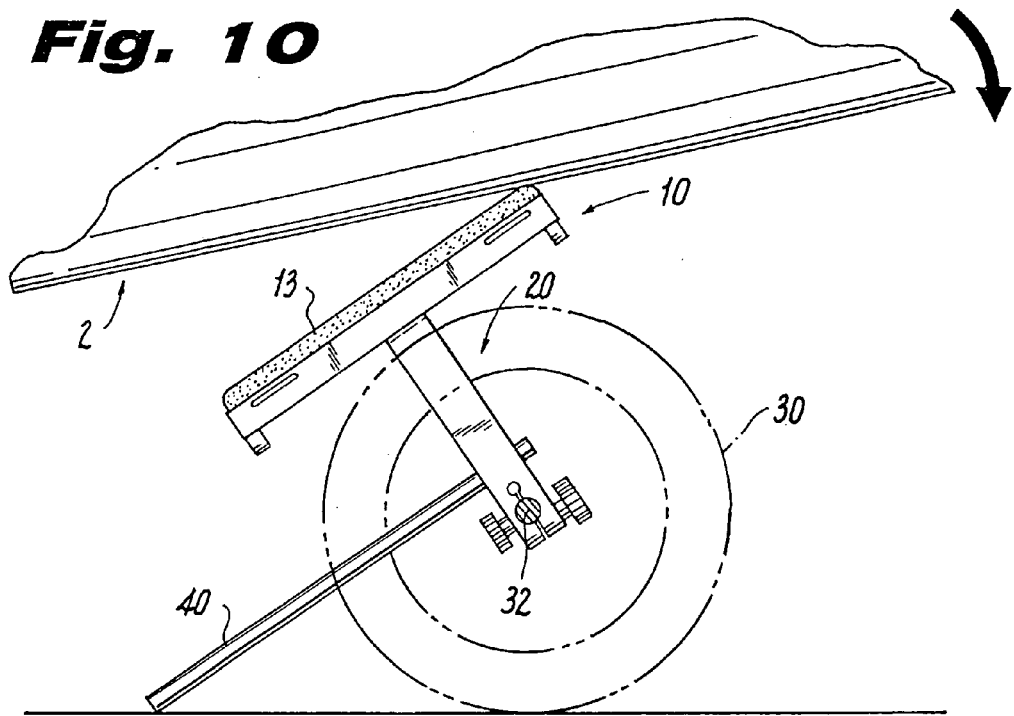
FIG. 10 is a diagrammatic side elevation view of the boat cart in its resting position, with a boat hull contacting the raised edge.
Figure 11:
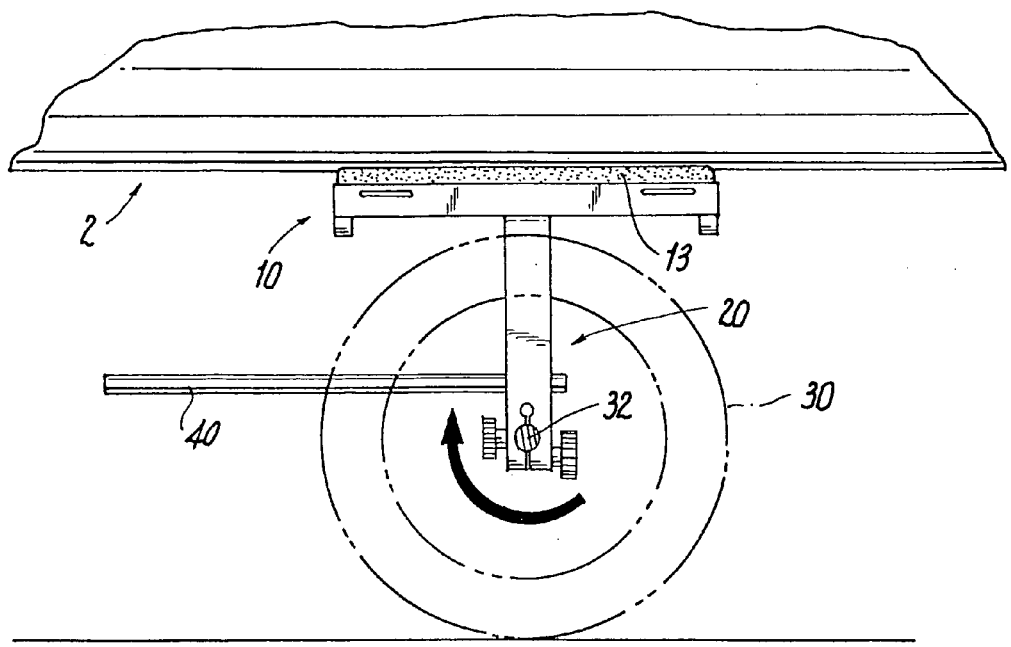
FIG. 11 is a diagrammatic side elevation view of the boat cart with the boat hull positioned and fully installed, illustrating the precision balancing feature of the cart.

FIGS. 10 and 11 show the precision balancing of boat 2 upon cart 1, wherein the placement of boat 2 upon cart 1 causes cart 1 to rotate from a position of rest in FIG. 10 to a horizontal load position of FIG. 11, in the direction of the arrow.

Figure 18:
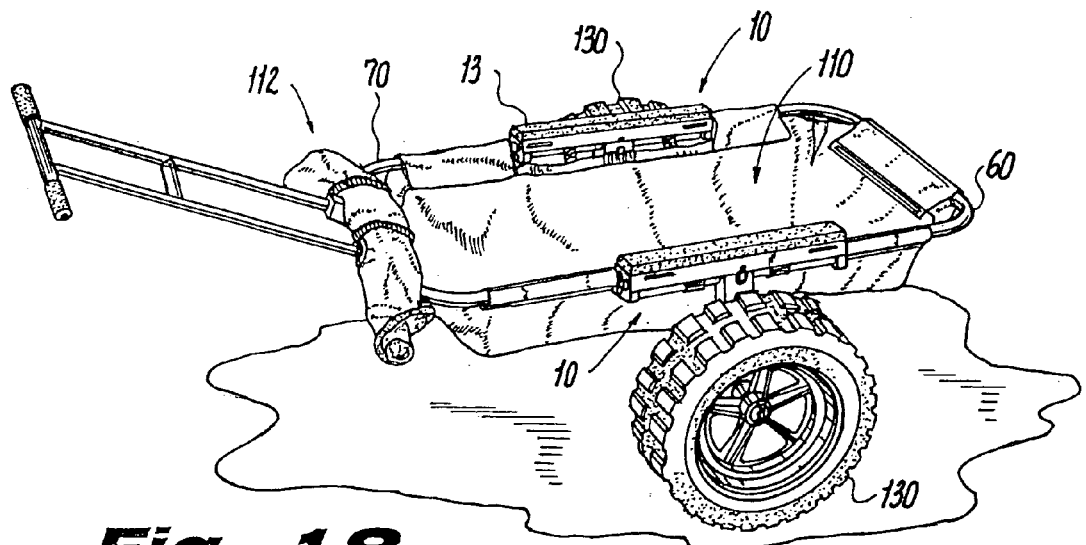
FIG. 18 is a perspective view of a further embodiment, a cart for transporting cargo, equipped with optional wide tires and axle for use on sand or granular terrain.
Figure 19:
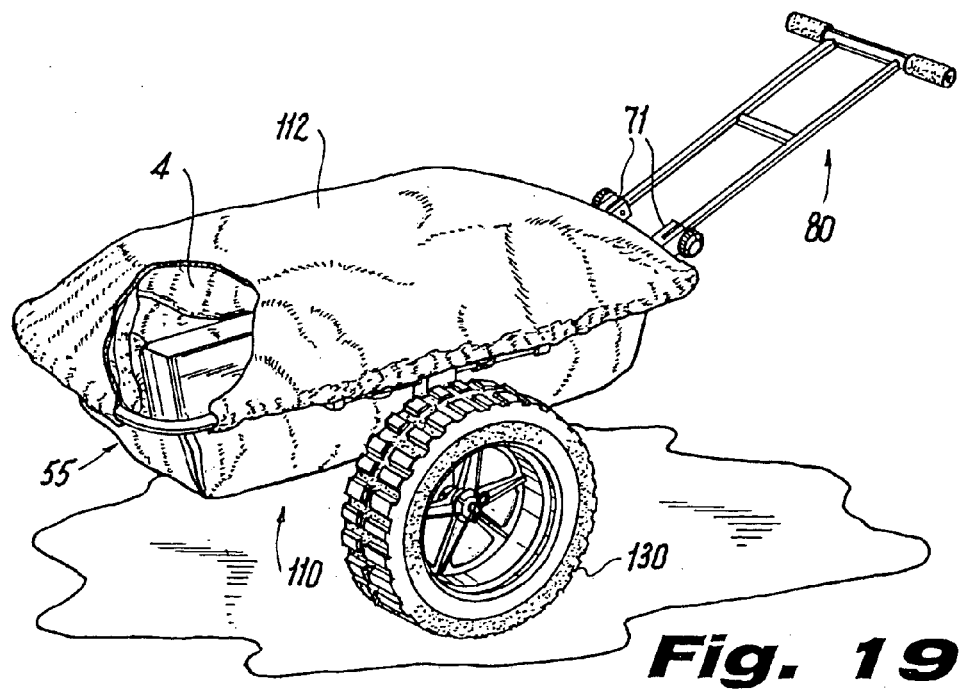
FIG. 19 is a perspective view of a fully loaded cargo cart, with the cover material partially cutaway to reveal its contents.
Figure 20:
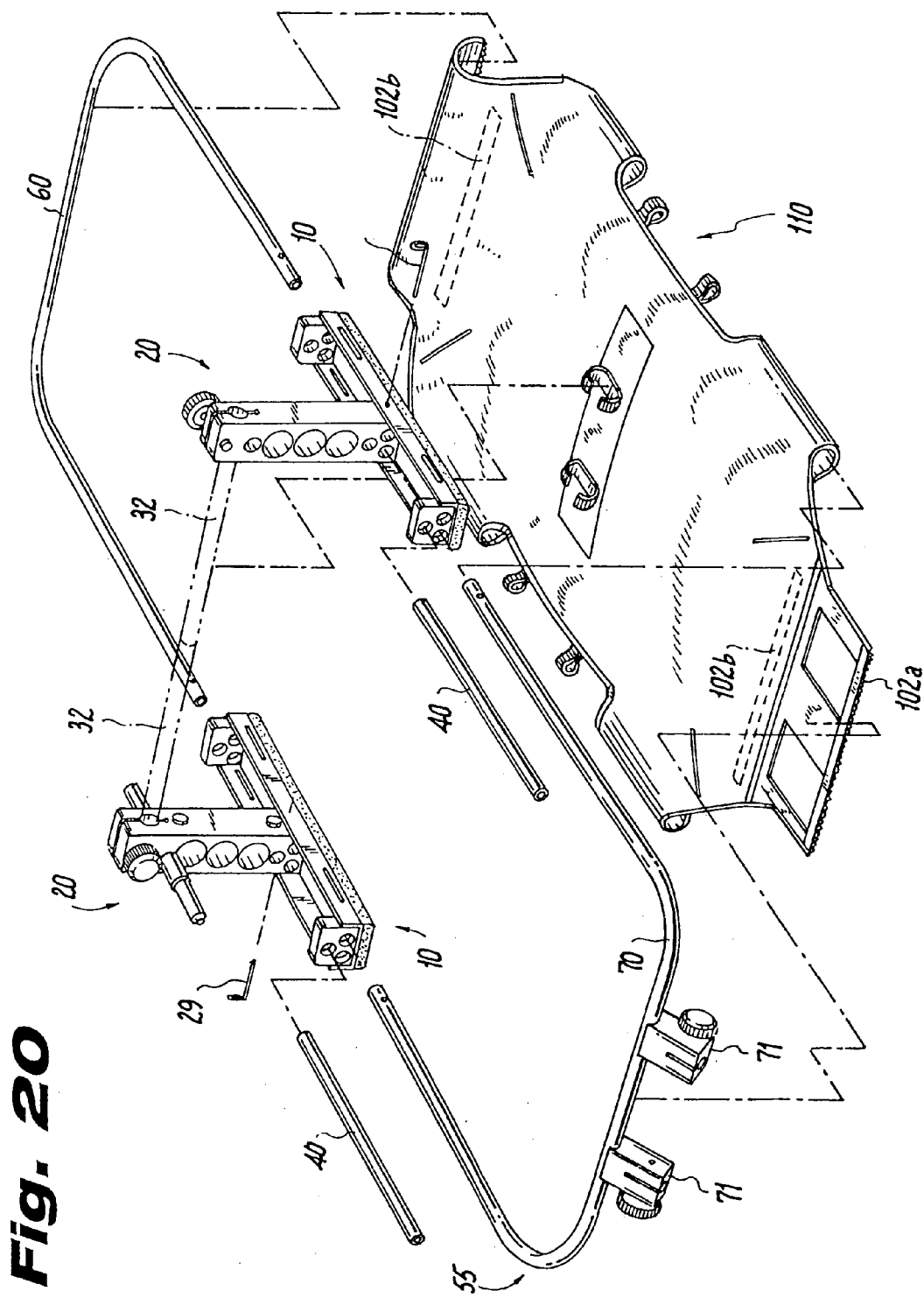
FIG. 20 is an exploded perspective view, inverted, of the cargo cart, illustrating the attachment of the canvas material to the framework components.
Figure 21:
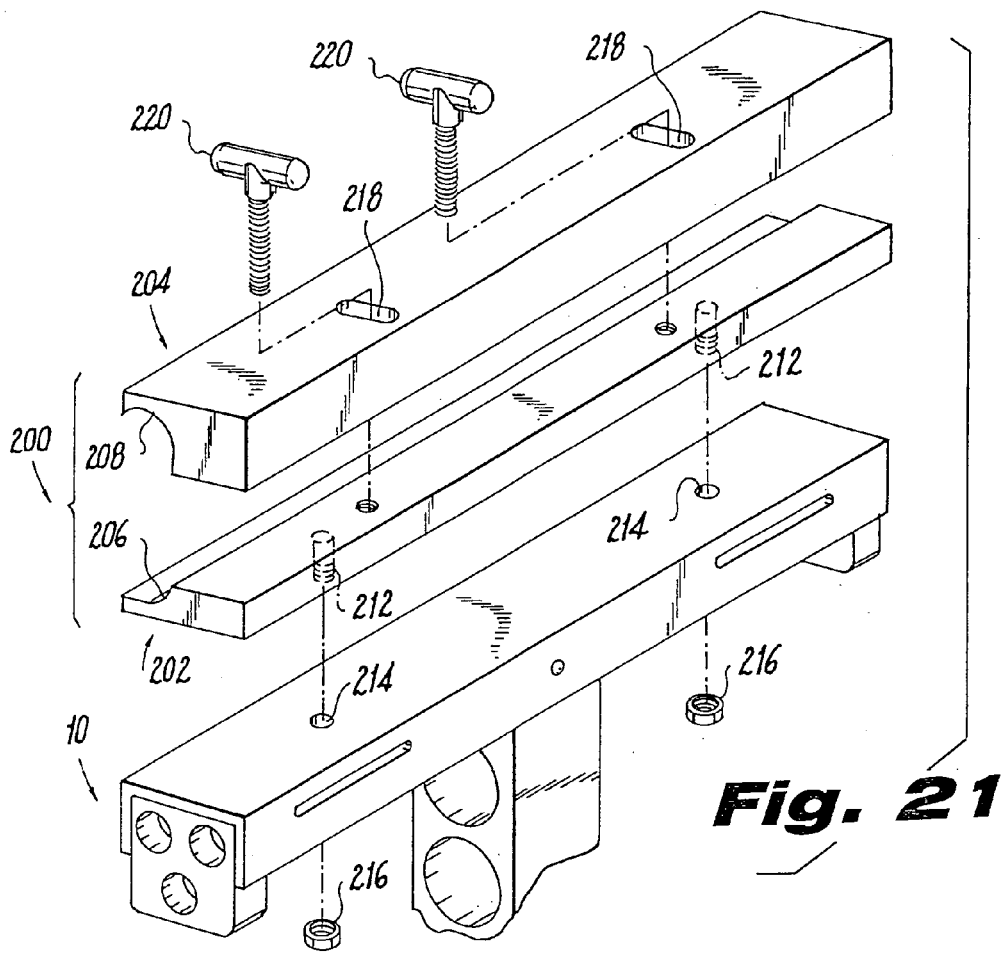
FIG. 21 is another exploded perspective detail view of the components for a stretcher-hauling clamp of an alternate embodiment for a search and rescue cart.
Figure 22:
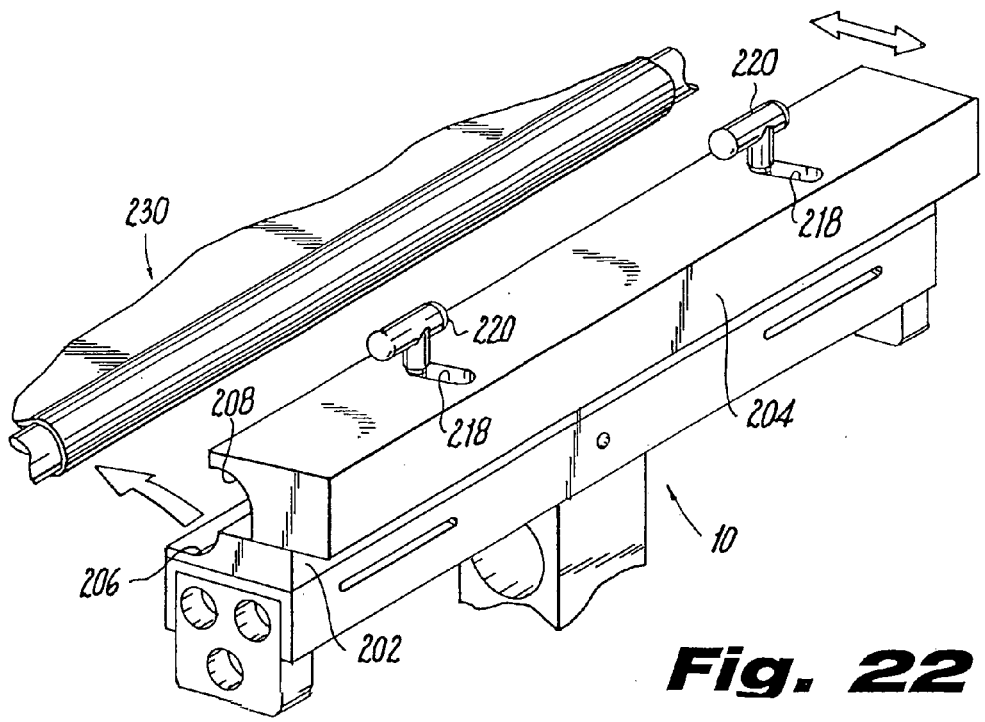
FIG. 22 is a perspective view of the clamp embodiment shown in FIG. 21, showing the sliding action of the clamp therein, for quick removal of the stretcher therefrom.

FIGS. 12–17 show another embodiment that converts portable cart 1 into a game cart. Alternatively, FIGS. 18–20 show how to convert cart 1 into a cargo wagon with a hollow well. First, in either situation, carry frame 55 is secured to horizontal load supports 10. Although a one piece, generally rectangular frame (not shown) may be used, preferably frame 55 includes a pair of U-shaped brackets 60, 70 joinable together to form frame 55.

Various fasteners may be provided to horizontal load supports 10 to carry objects, such as carriers, thereon.

Alternatively, for example, a clamp maybe provided to horizontal load supports 10 to carry a frame of a discrete transportable carrier directly thereon, as disclosed hereinafter with respect to FIGS. 21–24. In that case, instead of the frame being integrally part of the portable chart, as in FIGS. 12–17, in FIGS. 21–24, the frame is clamped to the horizontal load supports 10 of portable cart 1. Other fasteners may include longitudinally extending channel slots, such as in FIGS. 33–39 described further below.

Meanwhile, further with respect to FIGS. 12–17, U-shaped front bracket 60 extends horizontally forward from front-end receptacle apertures 12 of horizontal load supports 10, wherein front bracket 60 is demountably attached within front-end receptacle apertures 12 at one end of horizontal load supports 10.

U-shaped rear bracket 70 extends horizontally rearward from oppositely positioned rear end receptacle apertures 12 of horizontal load supports 10 and rear bracket 70 is demountably attached within each oppositely positioned rear end receptacle aperture 12 of horizontal load supports 10.

Figure 13:
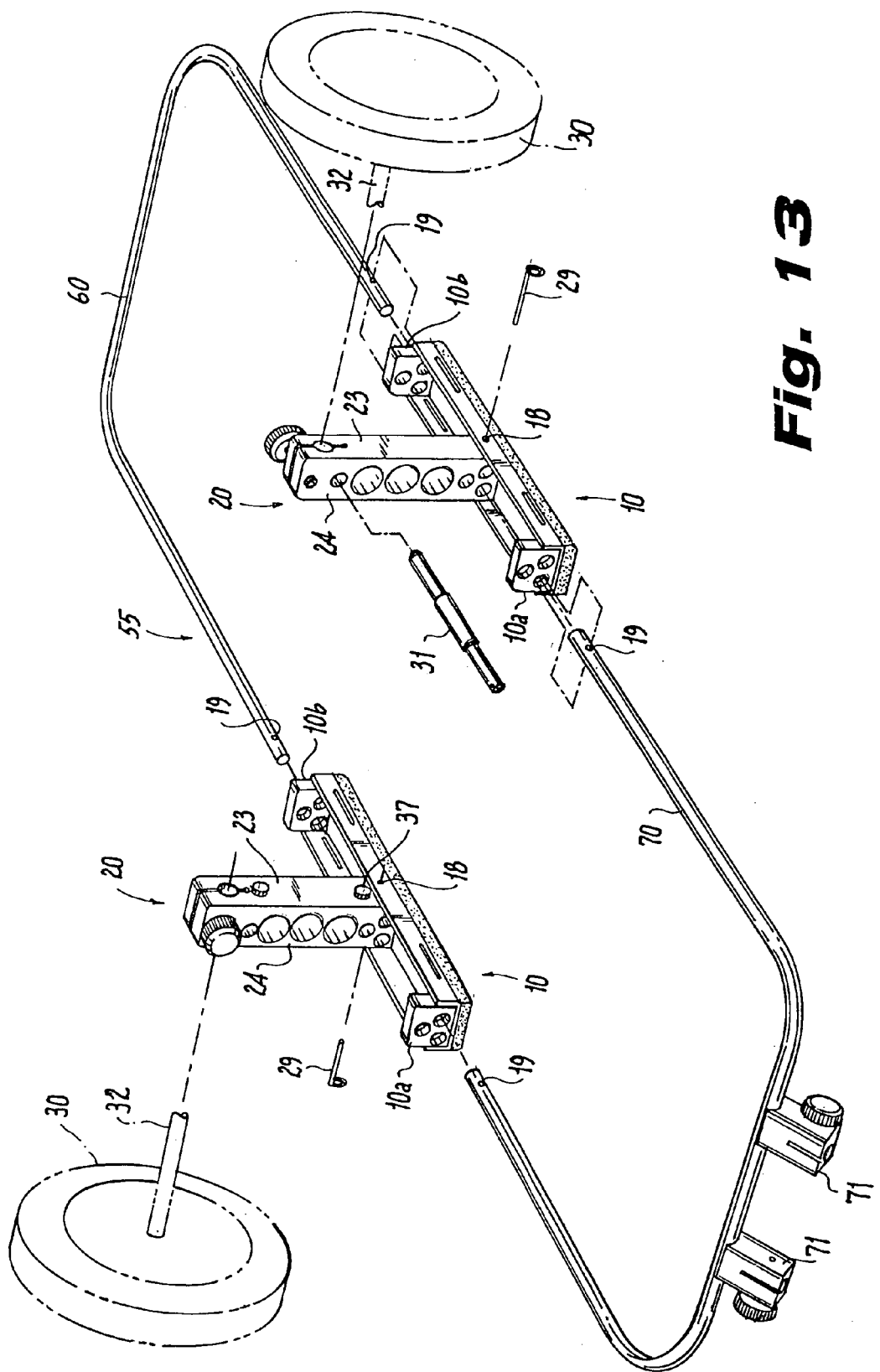
FIG. 13 is an exploded perspective view of the inverted gaming cart, illustrating the framework fastening method.

FIG. 13 shows how frame 55 is secured to cart 1. Each distal end of U-shaped front bracket 60 is inserted through apertures in respective ends 10b of horizontal supports 10 until each distal end engages a corresponding hole in each vertical support 20, where they are held in place by pins 29. Pins 29 engage lateral holes 18 in horizontal supports 10 and corresponding through holes 19 in distal ends of U shaped brackets 60. Likewise, each distal end of U-shaped rear bracket 70 is inserted through apertures in respective ends 10a of horizontal supports 10 until each distal end engages a corresponding hole in each vertical support 20, where it is also held in place by a pin 29. Pins 29 engage lateral holes 18 in horizontal supports 10 and corresponding through holes 19 in distal ends of U shaped brackets 60, 70 of frame 55.

U-shaped brackets 60, 70 are preferably of hollow, anodized aluminum tubing of about 0.75 inches in diameter. The length of each distally extending side member thereof is about 23.50 inches and the width of the cross bar connecting the distal side members is about 21.63 inches. About 0.75 inches from each distal end is a scoring, to accommodate a clamp thereon, to form frame 55.

Figure 12:
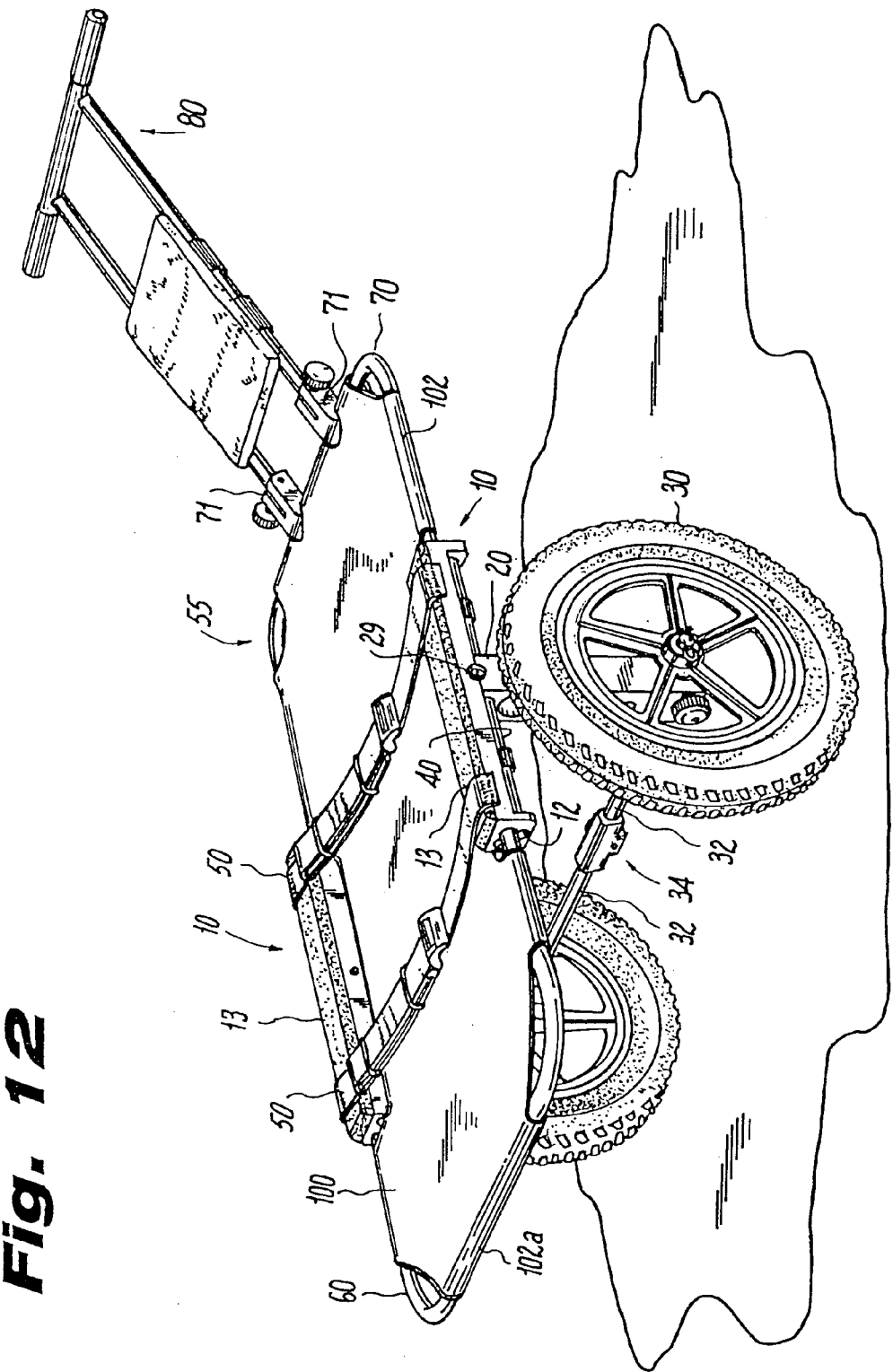
FIG. 12 is a perspective view of the assembled alternate embodiment cart, for hunting/gaming applications.
Figure 15:
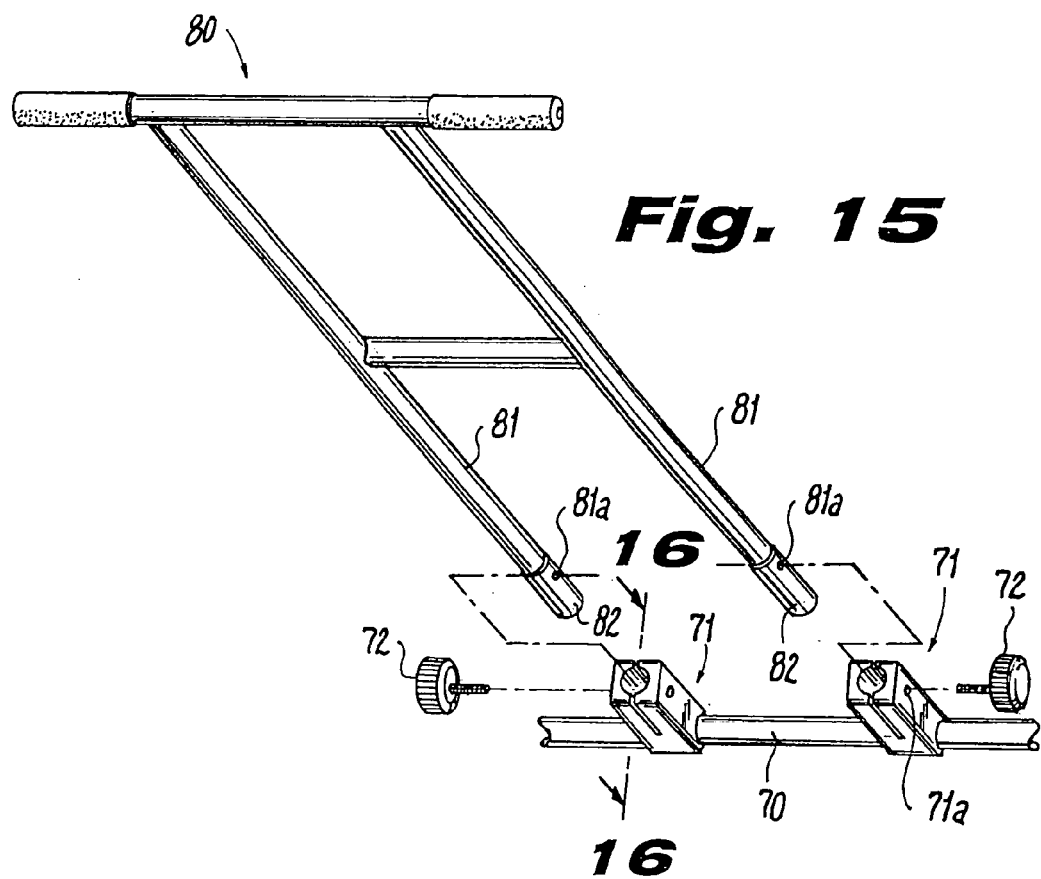
FIG. 15 is an exploded perspective view of the attachment of the handlebar component to the locking receptacles on the framework.
Figure 16:
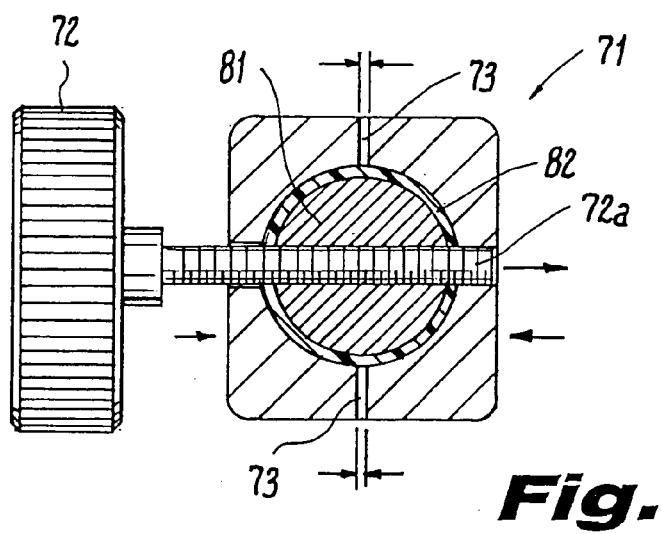
FIG. 16 is a sectional elevation view, taken through lines 16—16 of FIG. 15, showing the locking receptacles acting on the installed leg of the handlebar.

As shown in FIGS. 12 and 15 for pulling or pushing game or cargo upon portable cart 1, handle 80 extends rearwardly at an upward angle from joints 71 of either U-shaped rear bracket 70 for pushing portable cart 1, or from front U-shaped bracket 60 for pulling portable cart 1 (not shown). Furthermore, handle 80 may be permanently attached to either U-shaped bracket 60 or 70, or handle 80 may be removable and demountably attached to either front U-shaped bracket 60 or rear U-shaped bracket 70.

Handle 80 has preferably two aluminum tubing connecting members about 22.5 inches in length, connected by a hand accommodating transverse bar of solid aluminum, and is 17.5 inches in width. Handle 80 includes connectors 81, having distal sleeves, such as PVC (polyvinyl chloride) sleeves 82, permanently affixed thereto, which are insertable within joints 71 by locking member 72, having threaded member 72a which passes through bore 71a of joint 71 and bore 81a of handle 80. Compression groove 73 exists in joint 71, providing compression of joint 71.

Handle 80 may optionally have an auxiliary extension member and clamp (not shown), so that it can be attached to the rear frame of a bicycle (not shown), to pull portable cart 1.

Figure 14:
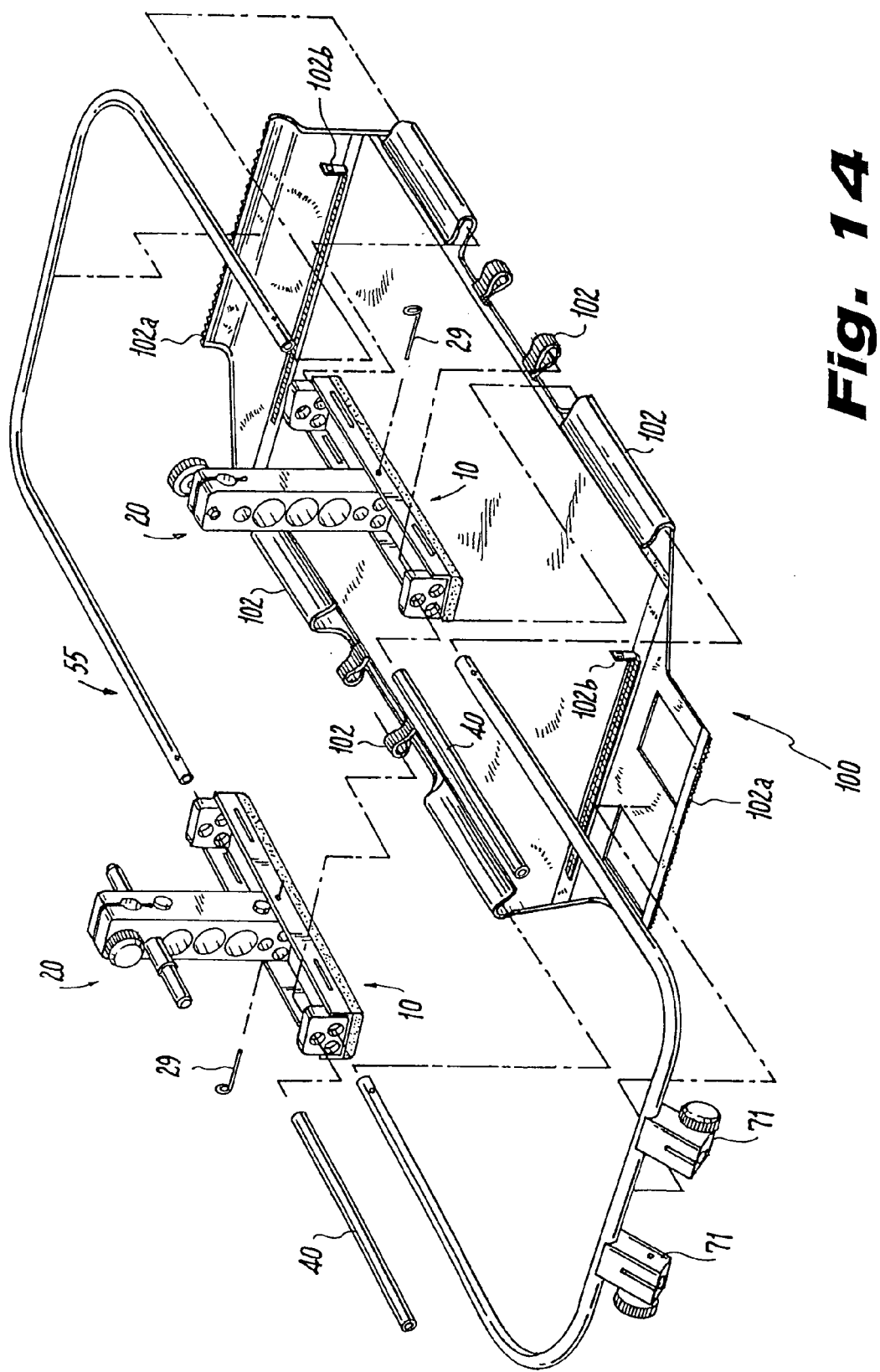
FIG. 14 is an exploded perspective view, inverted, of the gaming cart, illustrating the attachment of the stretcher canvas material to the framework components.
Figure 17:
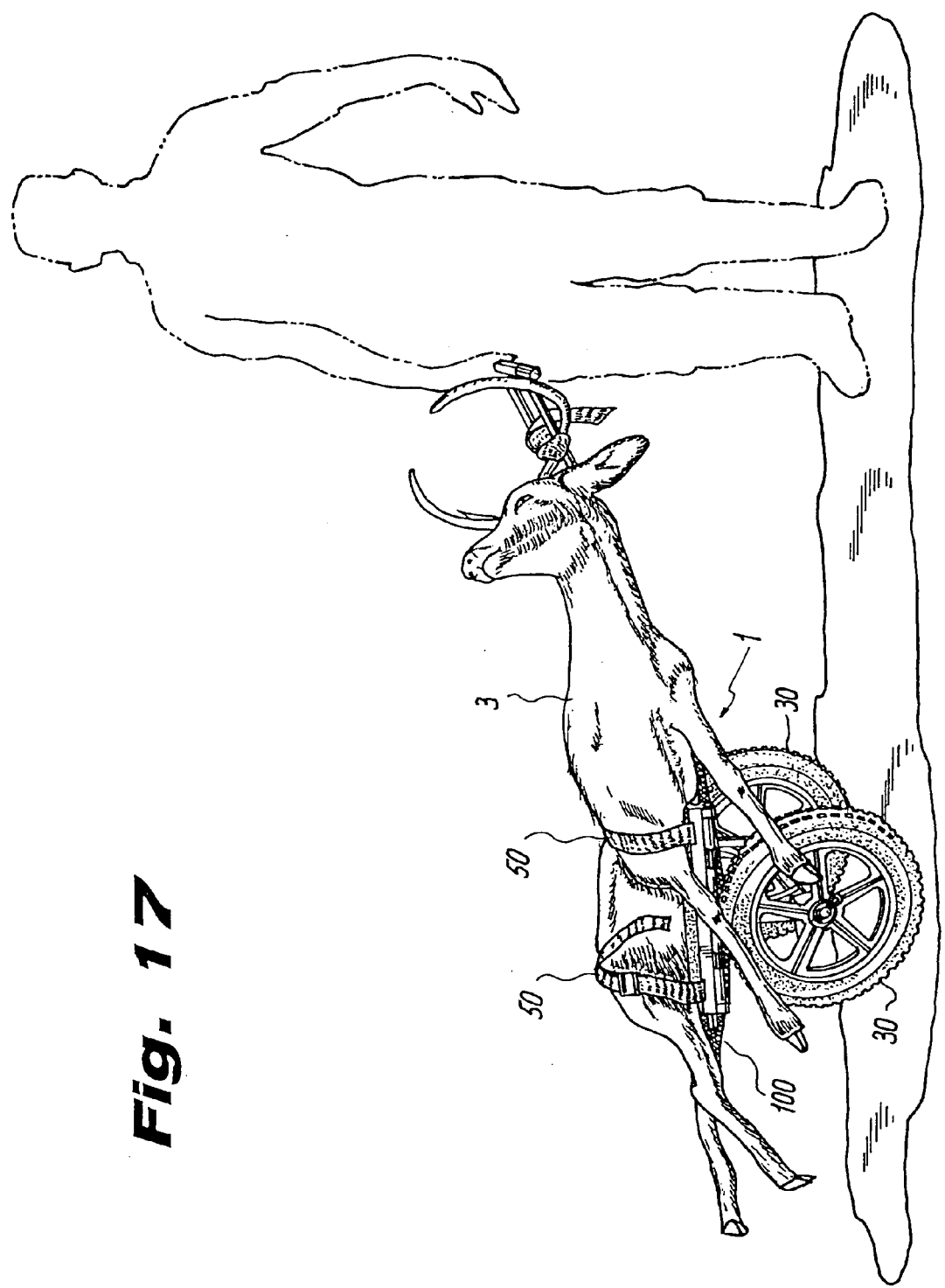
FIG. 17 is a perspective view of the gaming cart, with a deer fastened for transport.

To carry game 3, as shown in FIG. 17, or to carry an injured person in a rescue operation, FIG. 12 shows portable cart 1 having fabric stretcher 100 stretched tautly between horizontal load members 10 and preferably mounted over and around front and rear U-shaped brackets 60 and 70 of frame 55, by threading brackets 60, 70 through fasteners such as sewn-in loops 102 of fabric stretcher 100, which may alternatively be made of plastic or other taut load bearing material. Other types of fasteners can be used. For example, FIG. 14 shows that loop 102a is openable, and closed by fastener, such as zipper fastener 102b.

As also shown in FIG. 12, handle 80 may include a pair of posts extending obliquely off of a horizontal axis of portable cart 1, wherein a head rest cushion 85 extends between the posts to support the head and neck of an injured person being transported upon stretcher 100.

FIGS. 18–20 show that to carry cargo, hollow fabric cargo well 110 is attached in the same manner to frame 55. Hollow cargo well 110 may also alternatively be made of plastic or other taut load bearing material, and covered by cover 112. FIGS. 18 and 19 also show wider wheels 130 for use on sand or granular terrain.

Assembly and Disassembly

The various embodiments of the mission adaptable multiple-purpose portable cart/utility table can be quickly and easily assembled and disassembled.

For example, for making a canoe cart from the disassembled portable cart 1, wheel-retaining members, such as cotter pins 36, are taken out of axle members 32 in their stored position, and wheels 30 come out. Axle members 32 are then removed from between vertical struts 20. The axle members 32 are then clamped in a horizontal use position into receptacles 33 of rigid axle connector 34. Axle members are inserted between vertical struts 20 and locked in place. Wheels 30 are placed upon axle members 32 and secured by cotter pins 36. Kickstand 40 is loosened from its rest position and placed in place in receptacles within vertical struts 20. Canoe supporting cushions 13 are installed upon horizontal load supports 10 to support a canoe or boat thereupon. Straps 50 hold the canoe or boat installed upon cushions 13 in a secure transportable position.

To convert portable cart 1 into a game cart as in FIG. 17 or a rescue cart as in FIG. 12, kickstands 40 are removed and fabric stretcher 100 is installed on U-shaped frame members 60, 70 of frame 55 frames by fasteners such as sewn loops 102 thereof. U-shaped frame members 60, 70 are placed on horizontal load supports 10, and kickstand members 40 are installed as braces for fabric stretcher 100. Straps 50 are then installed to securely hold game or an injured party upon stretcher 100. Then handle 80 is installed upon U-shaped bracket 60 or 70 of frame 55 to pull or push portable cart 1.

To convert portable cart 1 into a wagon to haul cargo, as in FIGS. 18 and 19, fabric stretcher 100 is removed and hollow well 110 is installed over U-shaped members 60, 70 of frame 55.

To make the portable chart 1 portable again, the components are disassembled in reverse into bag 120. Strap or straps 50 are used as a carry handle or for backpack shoulder loops.

Figure 23:
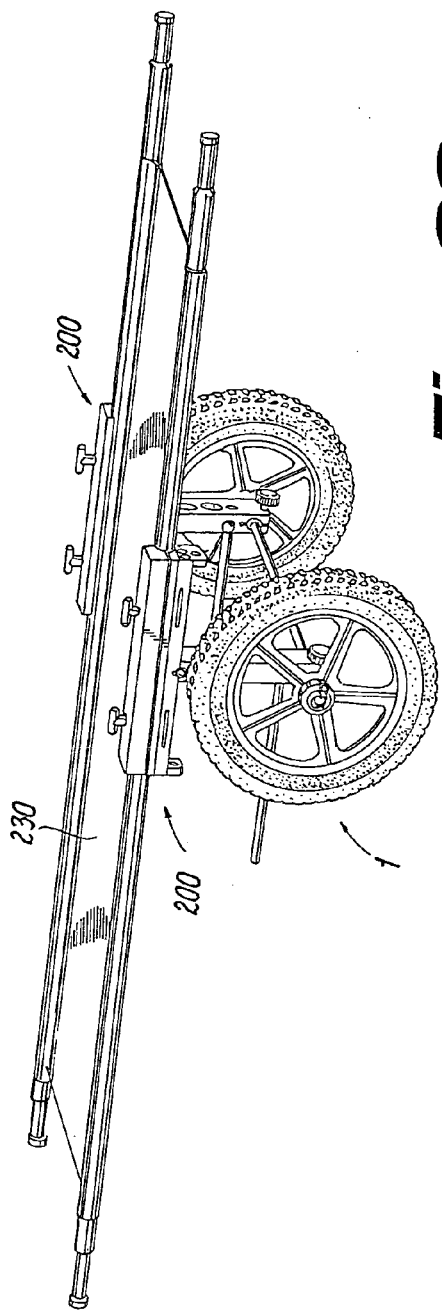
FIG. 23 is a perspective view of the portable cart of the present invention, showing the clamp as in FIGS. 21 and 22 carrying a rescue stretcher.

While the rescue stretcher shown in FIG. 12 has its own customized stretcher 100, in another embodiment shown in FIGS. 21–24, to convert portable cart 1 to a retrofit disabled person-bearing transportable carrier cart for search and rescue operations, using conventional railed stretcher 230, support cushions 13 are removable from horizontal load supports 10 and replaced by clamping assembly 200. Clamping assembly 200 includes lower jaw 202, and upper jaw 204. While different jaw configurations can be used, the embodiment shown in FIGS. 21–24 shows each having longitudinally extending recesses 206 and 208 therein to grip perimeter frame rails of a load supporting transportable carrier, such as conventional railed stretcher 230 therebetween, as shown in FIG. 23.

Lower jaw 202 of clamping assembly 200 includes an engaging surface 210 with threaded studs 212 which are inserted into through-holes 214 of load supports 10, and permanently locked with nuts 216. Upper jaw 204 is provided with a pair of oblong through-slots, 218, to allow upper jaw 204 to slide on upper surface of lower jaw 202, when threaded T-handles 220 are loosened. As shown by the arrows in FIG. 22 this sliding action allows for quick removal of any stretcher frame rail secured between jaw assembly 200.

Figure 24:
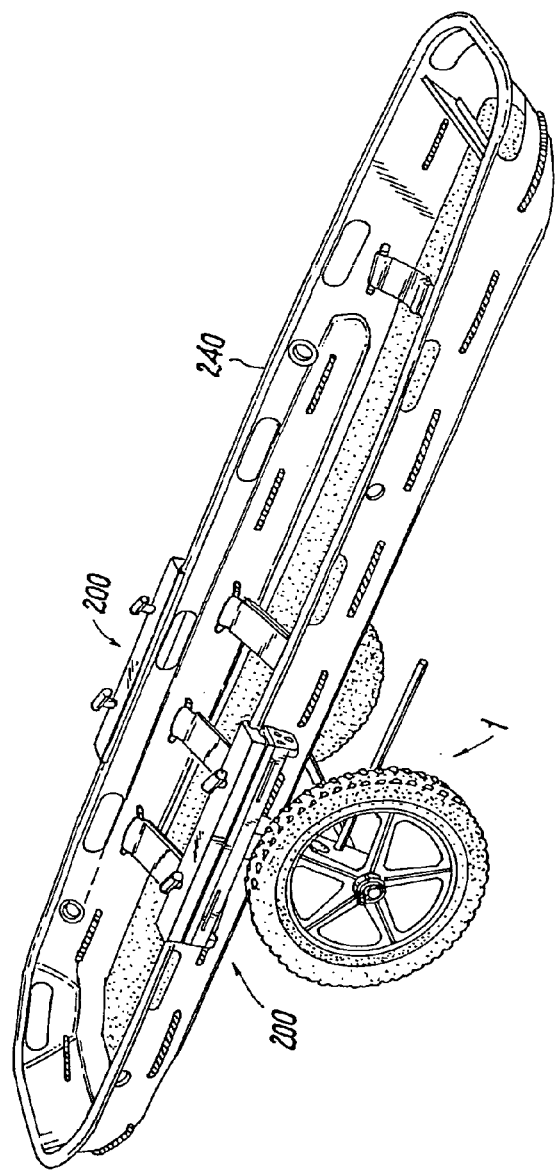
FIG. 24 is a perspective view of the portable cart carrying a Stokes-type personal rescue carrier.

FIGS. 23 and 24 are perspective views of a typical stretcher 230, and a Stokes-type rescue basket 240, securely clamped to portable cart 1 utilizing the previously described clamping assembly 200.

Figure 25:
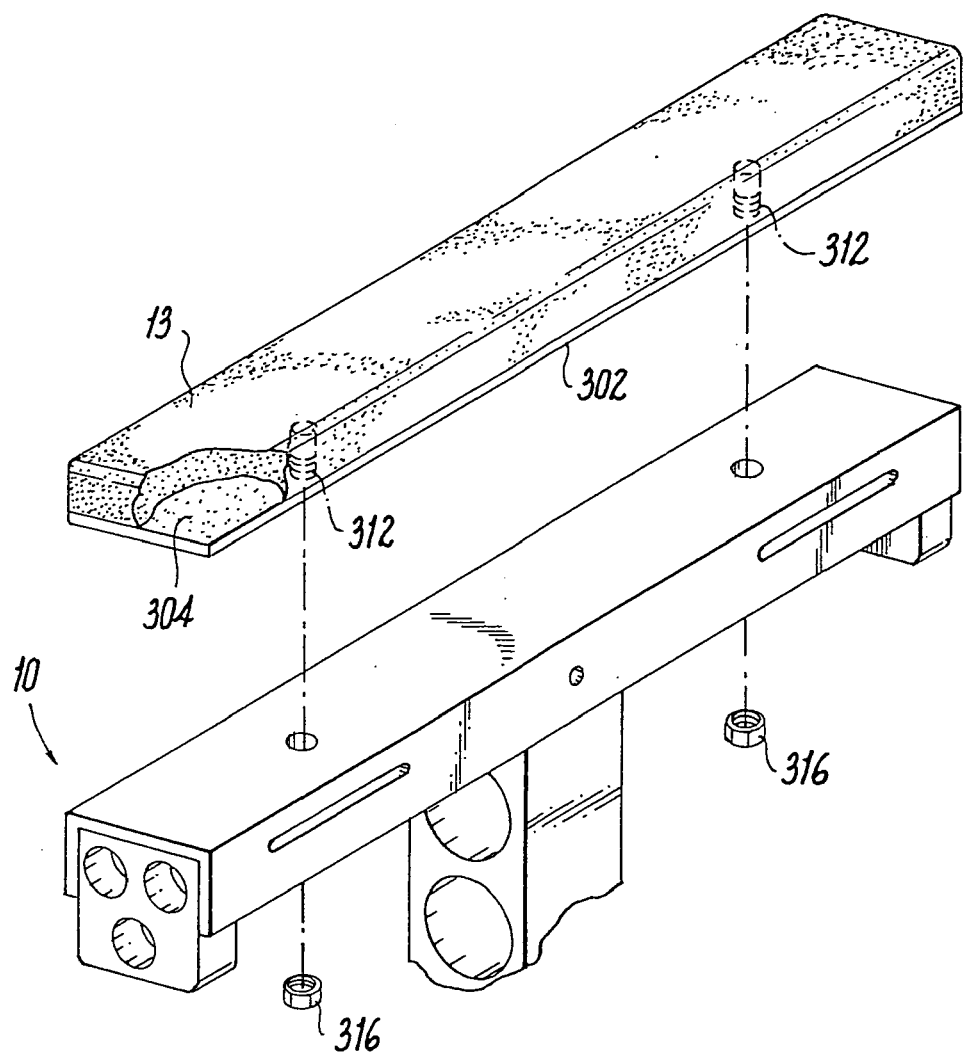
FIG. 25 is an exploded view of components of a further alternate embodiment for a support for removal of a boat support cushion therefrom.

As shown in FIG. 25 in this embodiment, instead of being permanently attached to each horizontal load support 10, removable support cushion 13 is permanently attached to removable plate 302 with an adhesive 304. This cushion assembly is removably attachable by nuts 316 and threaded studs 312, to each horizontal load support 10.

Figure 26:
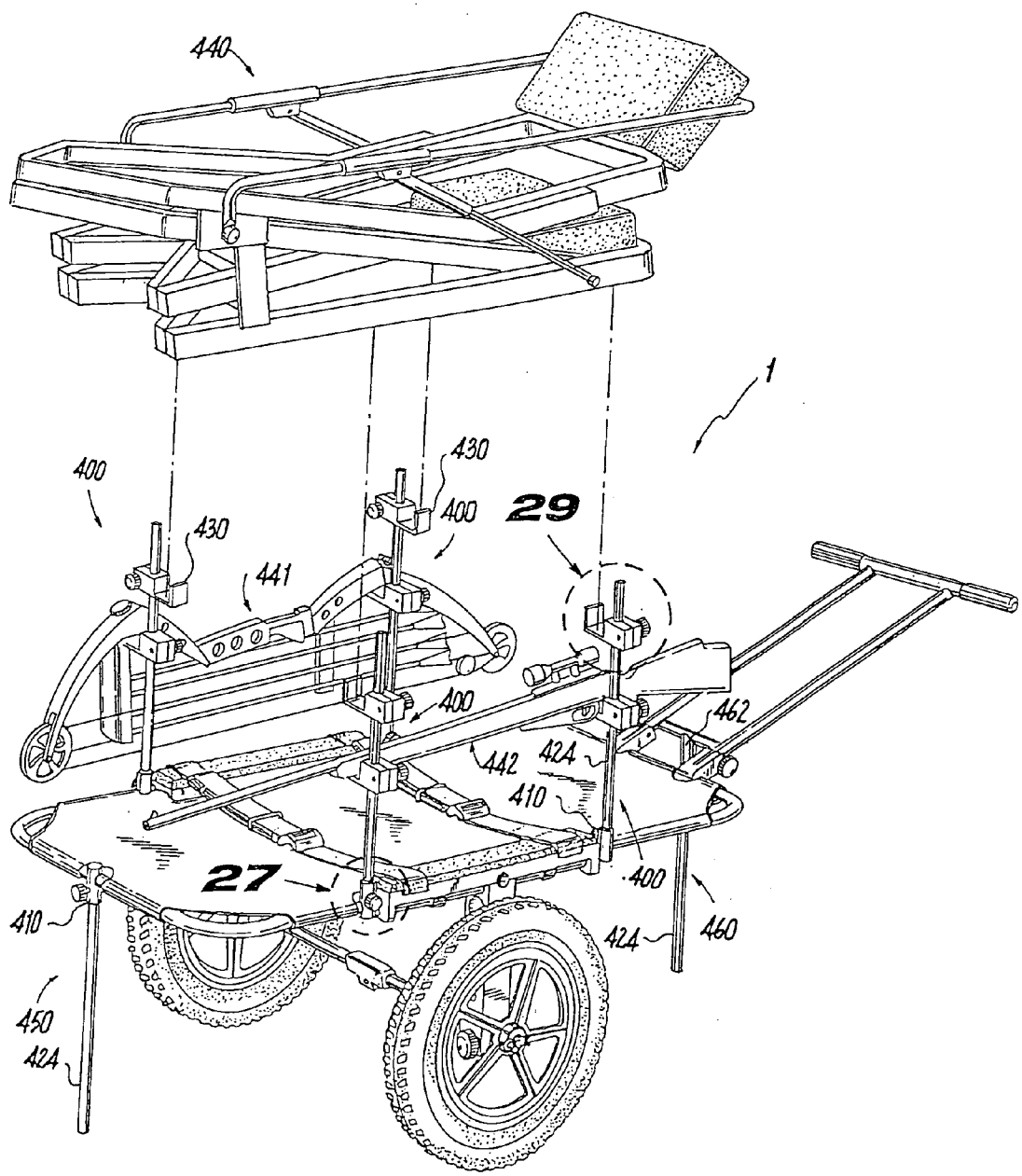
FIG. 26 is a perspective view of an alternate embodiment for a hunting cart with an accessory racking system for transport of hunting gear, such as a tree stand chair, archery implements and firearms thereon.

FIG. 26 illustrates portable cart 1, outfitted with a plurality of racking assemblies 400, each comprising a rail clamp 410, an upstanding post 424, and a hanger clamp 430. Rack assembly 400, when used in conjunction with additional rack assemblies 400, allows for transportation and quick removal of essential hunting gear such as a chair stand 440, archery equipment 441, and rifle 442. Other related items such as knapsacks and bedrolls may be supported by rack assembly 400, as well. Rack assembly 400 is easily disassembled from cart 1 upon reaching a chosen destination, and the components are conveniently transported within cart 1's storage backpack, such as carry bag 120 shown in FIG. 1.

Also illustrated in FIG. 26 are stabilizing assemblies 450 and 460. Assembly 450 makes use of post 420, which is friction-fit into an inverted rail clamp 410. Assembly 460 comprises an inverted tubular sleeve 462, optionally permanently welded to the handle assembly crosspiece. Sleeve 462 accepts kickstand post 424 in a similar fashion to rail clamp 410. These assemblies 450 460 serve to brace the cart 1 when it is parked.

Moreover, kickstand post 424 may be used with any embodiment having a handle, such as handle 80 of FIGS. 12 and 17–19, or handle 81 of FIGS. 32 and 33.

Figure 27:
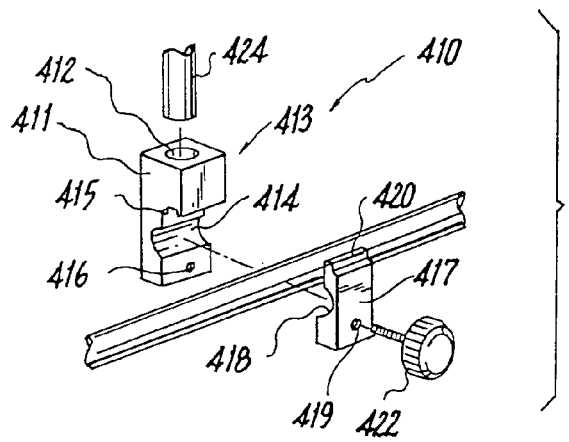
FIG. 27 is an exploded detail view of a quick release clamp for rail fastening to the cart shown in FIG. 26.

Turning to FIG. 27, which is highlighted in FIG. 26, an exploded perspective close-up detail view of rail clamp 410 is presented. Clamping block 411 is provided with a bore 412 to receive post 424, an attachment face 413 including a semi bore 414, and notch 415, and threaded bore 416. Plate 417 includes semi bore 418, through hole 419, and protruding rib 420.

Figure 28:
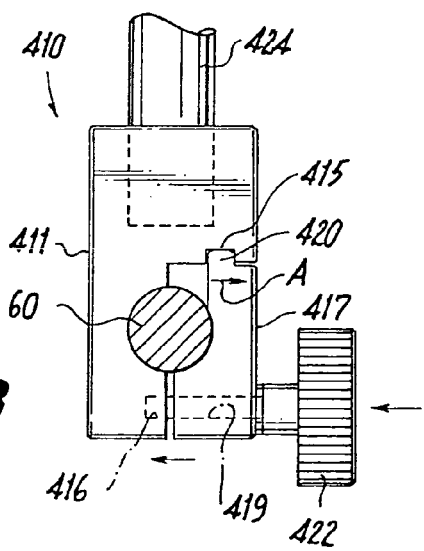
FIG. 28 is an assembled elevational view of the clamp of FIG. 27 attached to a rail.

As shown in FIG. 28, when threaded knob 422 is inserted into hole 419 of plate 417 and tightened into threaded bore 416 of block 411, clamping is achieved against frame member 60. Rib 420 is secured within notch 415 by a camming action in the direction of arrow "A".

Figure 29:
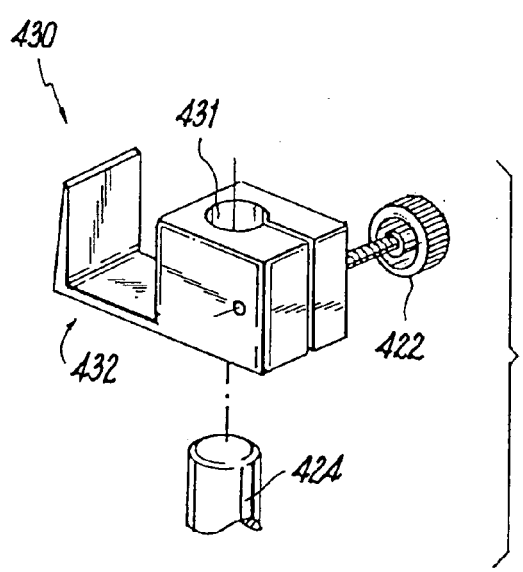
FIG. 29 is an exploded perspective view of a typical clamp for gear support for the cart as in FIG. 26.

FIG. 29 shows cantilevered hanger clamp 430, poised to slide down upstanding post 424. Hanger clamp 430 is provided with a bore 431, which is notched in a similar manner to clamping receptacles 71 of the handle assembly. The notch separates the body of hanger clamp 430 into two walls. Threaded knob 422 will compress the walls surrounding the notch, thereby tightening bore 431 around post 424. L-shaped region 432 is integrally formed with the body of the hanger clamp, and provides a strong and durable support for transporting hunting or other gear.

FIG. 30 is a perspective view of an anti-tipping linkage 500, which couples cart 1 to a bicycle. Linkage 500 counteracts cart rollover caused by centrifugal force as the bicycle negotiates turns.

FIG. 31 illustrates the components of linkage 500. Bicycle seat-stem compression clamp 510 is formed of a body portion 511, and plate 512, fastened by screws 513. Bore 514 is angled so that clamp 510 remains perpendicular when installed on a typical bicycle seat-stem. Clamp 510 is provided with a bore 515 on rear face 516, which accepts a shaft 520. Pin 517 passes through clamp and fixes shaft 520 via a through-bore. Shaft 520 includes through-bore 522 at its distal end. Another through-bore 523 is provided slightly proximal of aperture 522. When shaft 520 is inserted into coil spring 530, hooked leg 531 of the spring will fit into bore 522. A sliding collar 524 will then extend over leg 531 to prevent pull-out, and a pin 526 will be fitted into collar hole 525, and into bore 523 of the shaft 520, thereby securing the collar to the shaft and preventing removal of the coil spring.

A shaft 540 is provided for the opposite end of coil spring 530. Hooked leg 532 fits into bore 542 of the shaft, and collar 544 slides over and is fixed by pin 546, fitted into collar hole 535 and shaft bore 543.

Support rails 550 and 551 are fixed to handle clamps 71 of cart 1. The rails are bent into an inverted V configuration, and permanently affixed to block 552. Block 552 is provided with bore 553, into which the free end of shaft 540 is fitted. Pin 555 is inserted into through bore 554 of block 552, and passes through bore 547 of shaft 540, creating the continuous, secure anti-tipping linkage 500 between cart 1 and a bicycle. It is understood that during maneuvers of the bicycle, there will be no problems associated with a typical universal or pivot joint; the coil spring will absorb and disperse any rotational stresses, and will react as a 360° "living hinge".

FIGS. 32A–32G, 33 and 33A show an alternate embodiment 600 of the portable cart using four wheels 30 in an overlapped configuration. A hard molded cover 601 is illustrated although any cover or no cover can be used as well. Cover 601 covers bin 602 with lower overlapping edge cap 601a fitting over peripheral shoulder 602a of bin 602. Bin 602 also has longitudinally extending concave channels 603, which rest upon rails 604 of cart 600 of FIG. 32. Downward pressure of the weight of bin 602 and its contents helps stabilize bin 602 upon rails 604, which may be optionally covered with rubber or other resilient linearly extending cushions.

Although FIG. 32 illustrates portable cart 600 with covered bin 602, portable cart 600 can be used with other embodiments, such as, for example, boat cushions 13 shown in FIG. 4, framed rail stretchers 100 as in FIG. 12, the game cart of FIG. 17, the cargo cart of FIG. 18, the conventional rescue carriers of FIGS. 23 and 24 or the gear rack of FIG. 26, among others.

FIG. 32H shows an exploded inverted view of an alternate embodiment for a ruggedized handle assembly, including handle 630 and handle shaft 626 with spring pin 628 lined up to enter the end of stanchion truss weldment 620. Stanchion truss weldment 620 has two downward extending struts 632, which accommodate axles 624 therethrough, which axles 624, in-turn, attach to wheels 622. Central bushing receptacle 634 accepts the end of handle shaft 626. Receptacle 634 also has a lower pushpin aperture and a pair of opposite holes for a through pin to hold handle shaft in place. FIG. 32H also shows kickstand 640 stowable within handle shaft 626.

FIG. 32I shows a close-up inverted view of receptacle 634, showing handle shaft 626 located within truss weldment 620, and held in place by spring pin 628 of handle shaft 626 and/or through pin 629.

Figure 32E:
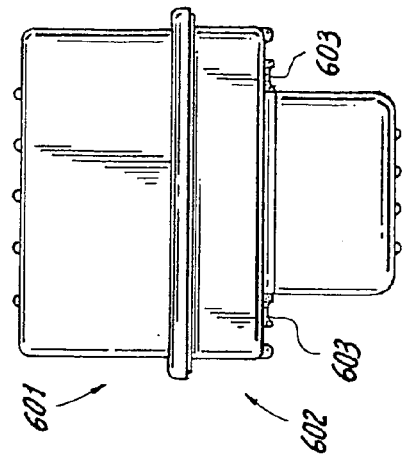
FIG. 32E is a front elevational view of the cover and bin as in FIG. 32.
Figure 32F:
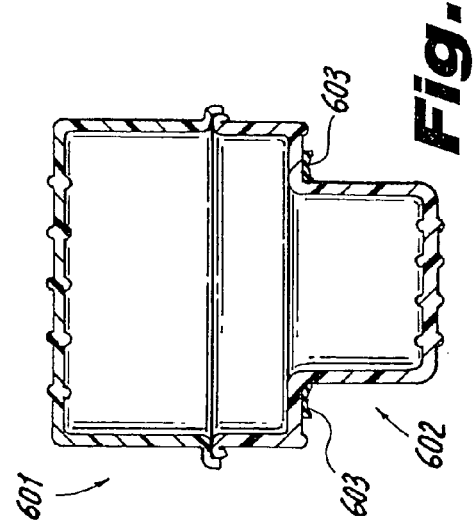
FIG. 32F is a front cross-sectional view thereof, taken along lines "32F—32F" of FIG. 32D.
Figure 32D:
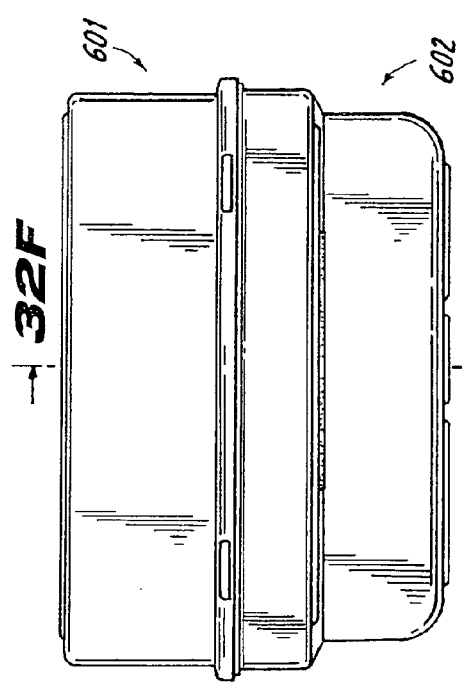
FIG. 32D is a side elevational view of the cover and bin as in FIG. 32.
Figure 32G:
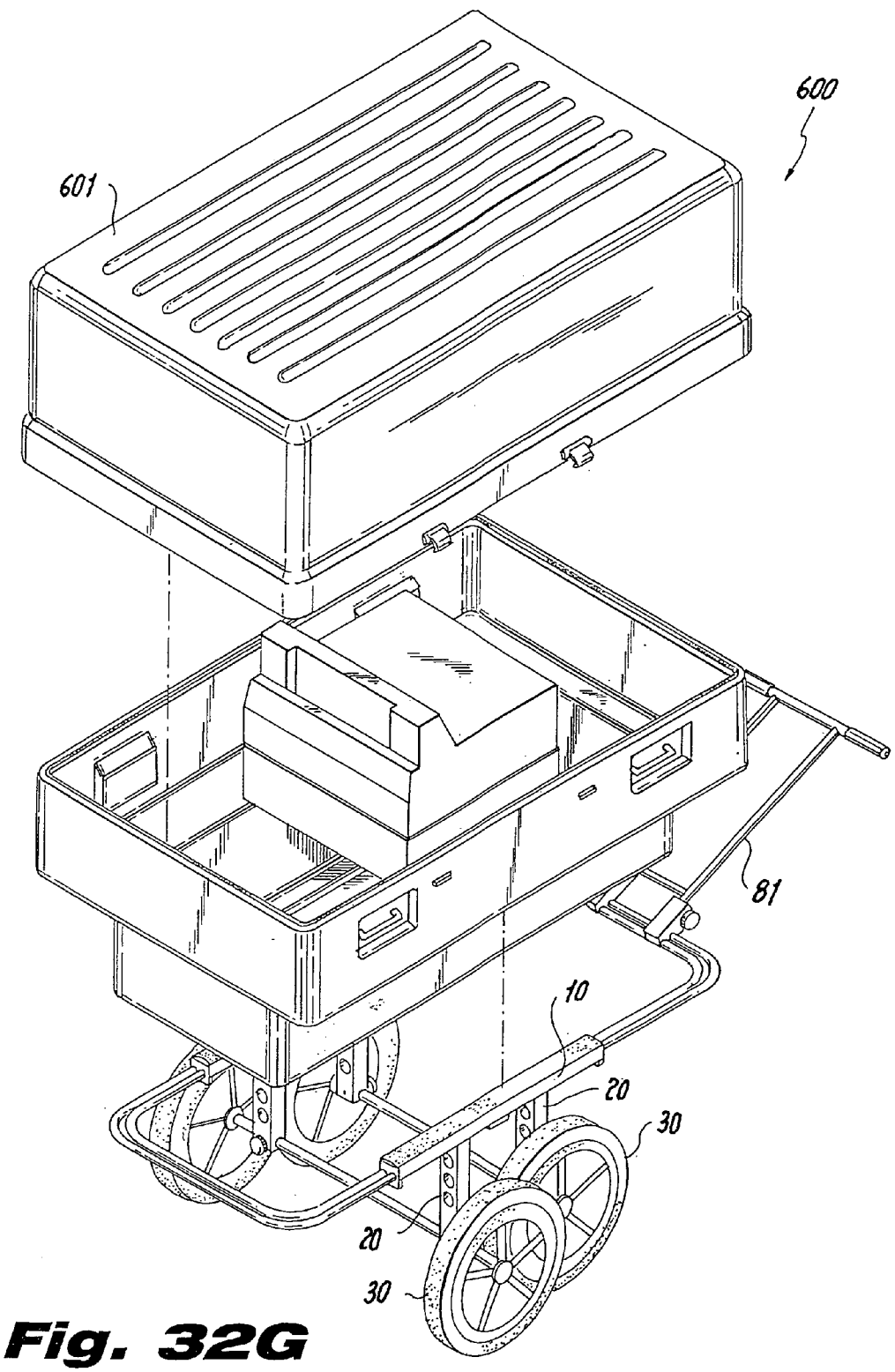
FIG. 32G is an exploded perspective view thereof.
Figure 32J:
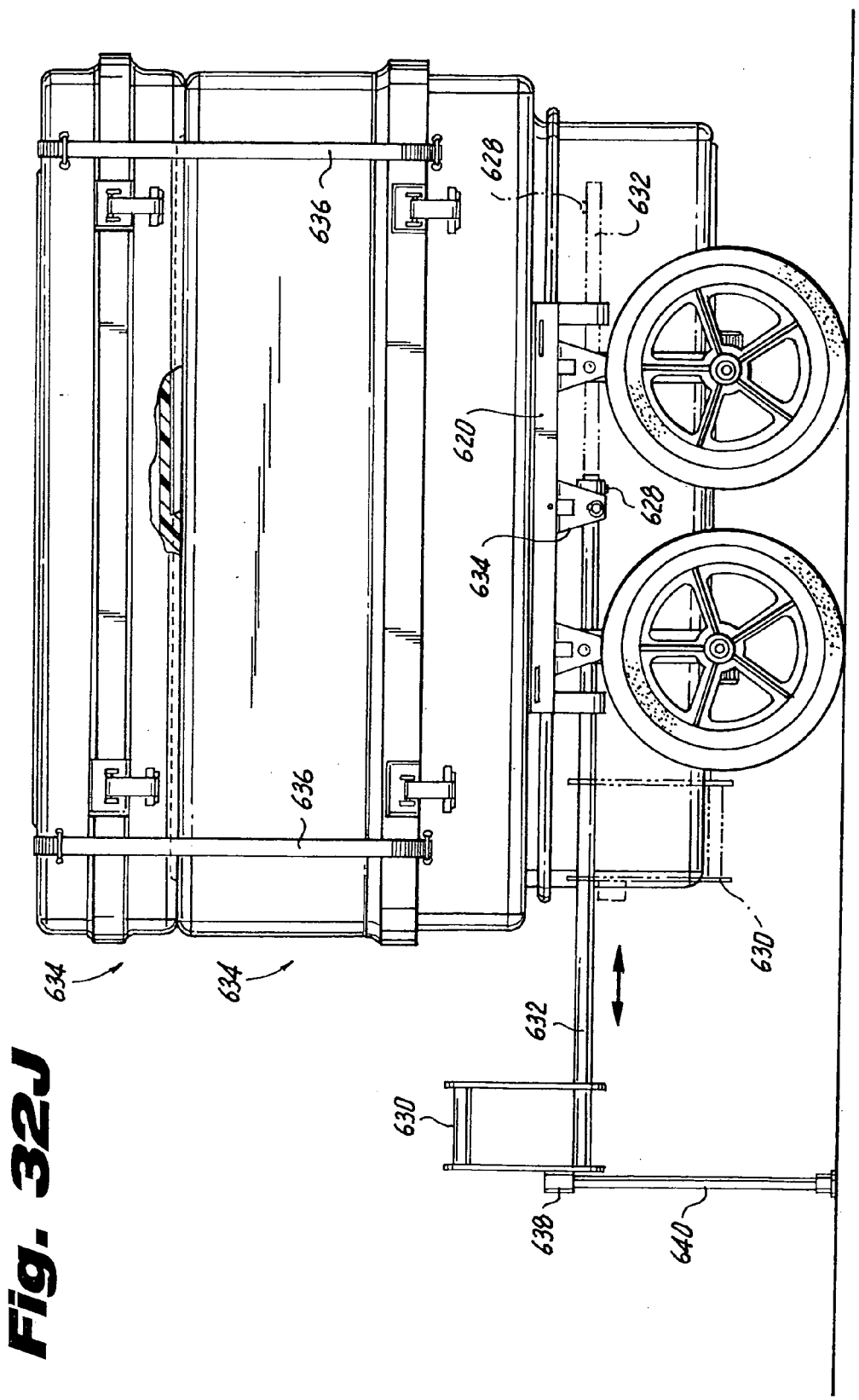
FIG. 32J is a side elevational view of an alternate embodiment of a four-wheel cargo bin hauling cart showing stacked cargo hauling bins held in place in a boss and recess engagement; further showing a kickstand engaged to the handle.

FIG. 32J shows a four wheel cargo hauling cart with kickstand 640 attached to kickstand attachment bracket 638, which is part of handle 630. Also shown are stacked cargo bin shell containers 634 held securely by straps 636.

Figure 32K:
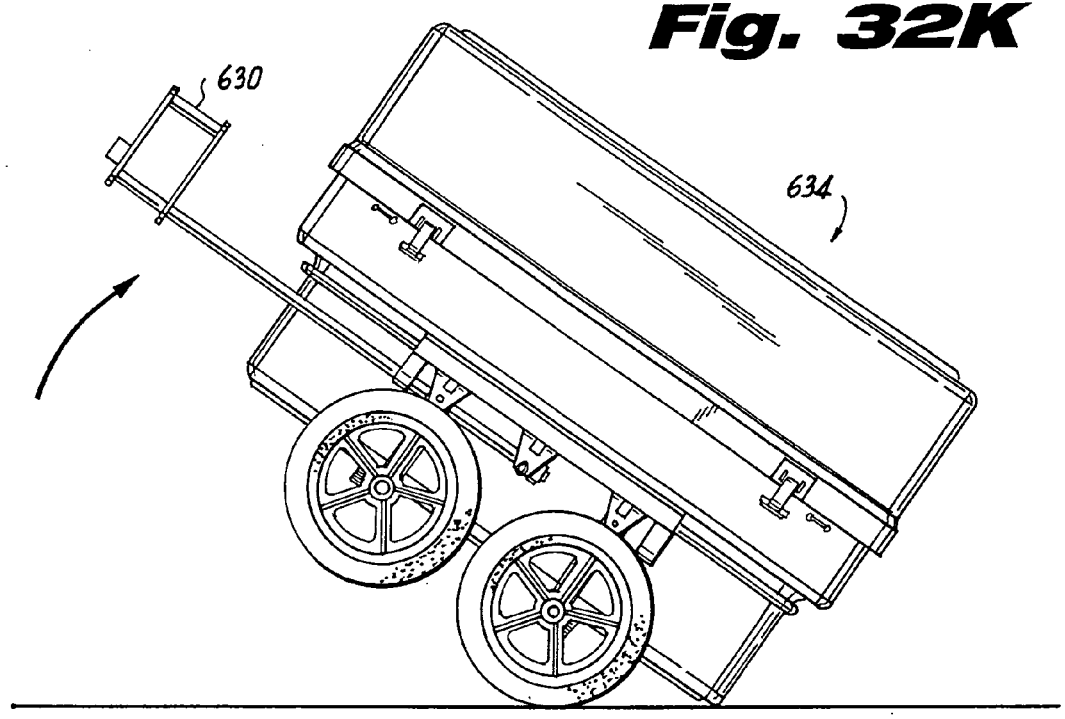
Figure 32L:
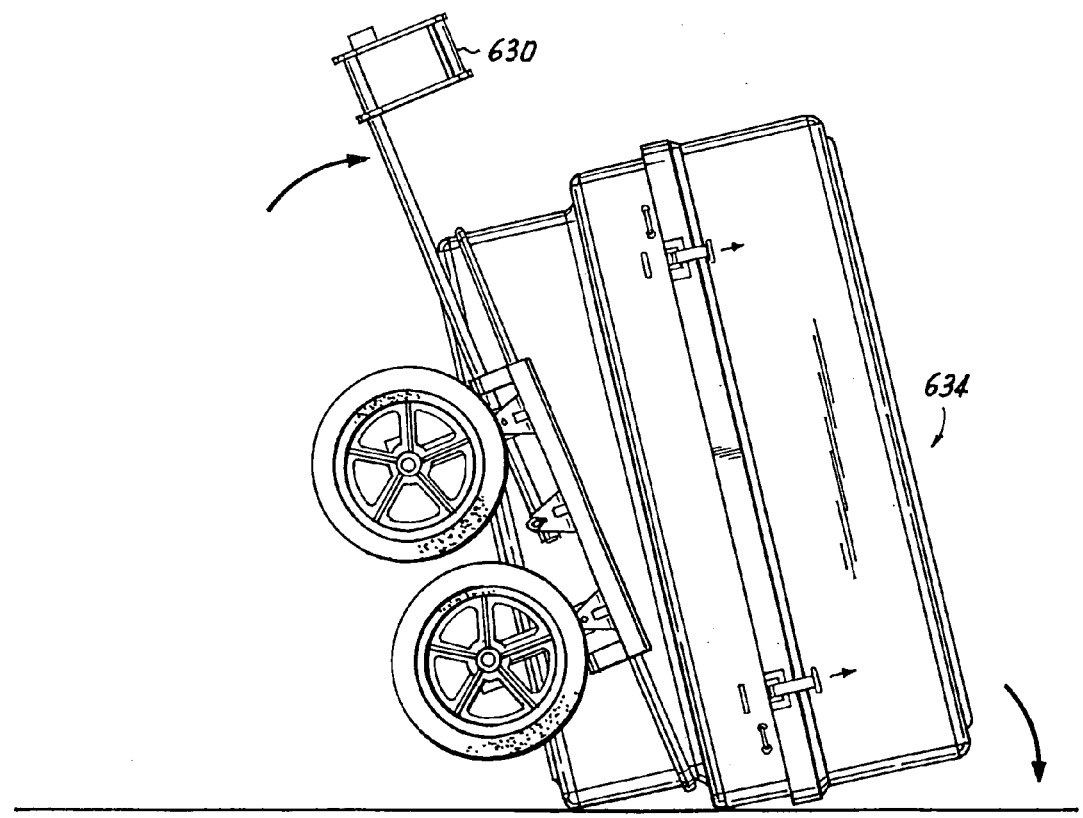
Figure 32N:
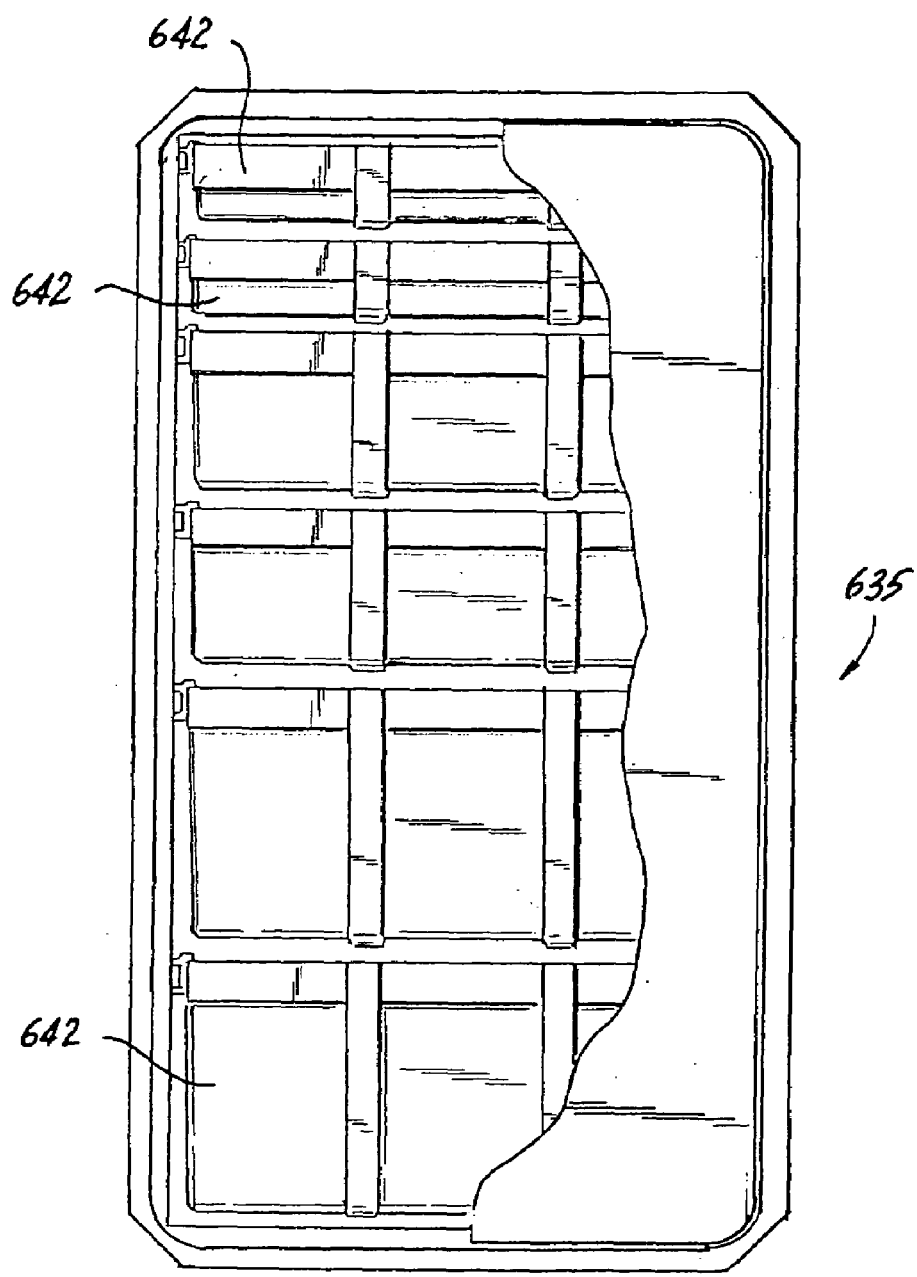
FIG. 32N is a front elevational view of the standing bin as in FIG. 32M.

In the sequence of FIGS. 32K, 32M, and 32N, straps 636 have been detached from bin shell containers 634, and the sequence of removal of top bin 634 is shown ending with a vertically oriented bin drawer cabinet 635 with a cover panel 639 removed, thereby exposing slidably openable drawers 642 on its front surface. FIG. 32N shows drawers 642 behind drawer retaining panel 639 in a cutaway view.

Lower bin 634 optionally contains related medical supplies for a field hospital, such as power packs, oxygen tanks, and other necessary medical supplies.

FIG. 32O is an optional hitch assembly 644, which replaces the handle assembly. Hitch legs 646 are received into handle 630.

Spring pins 651 also participate in this coupling. Connector 646, with hitch tongue 652, form a structure engagable with receiver clevis 653 attached to all terrain vehicle 656. FIG. 32P shows hitch 644 being used to pull cart 632 by all-terrain vehicle 656.

FIG. 33 shows a perspective view of the frame of cart 600. Long axle 606 attaches front wheels 30 while short axle 605 attaches rear wheels 30 through respective vertical support pairs 20. The use of four wheels doubles the carrying capacity of the cart of this invention while the overlapped positioning of the wheels maintains a short wheelbase for compactness and for maneuverability such as turning with fixed axles and the ability to easily climb ledges. For durability, the rails 604 may be a double pair of parallel rails.

Double axled cart 600 has increased maneuverability, since user pushing upon an optional handle 81 enables user to lift the farther away, distal pair of wheels 30 off the ground, and the user pulling upward of handle 81 raises the nearer proximal wheels 30 off the ground.

FIGS. 34 through 39 are concerned with an alternate embodiment of the horizontal load support member 10. The alternate embodiment 610 has an integral T-slot channel 611 in its top surface to facilitate easy installation and removal of a variety of attachments, such as cushions 615 shown in FIG. 35–36, clamps 620, 630, 640, shown in FIGS. 37–39, or platform 1450 shown in FIG. 57. Load member 610 can be conveniently extruded of aluminum or magnesium; it can be used either with the two-wheel cart 1 or the four-wheeled embodiment 600.

Figure 35:
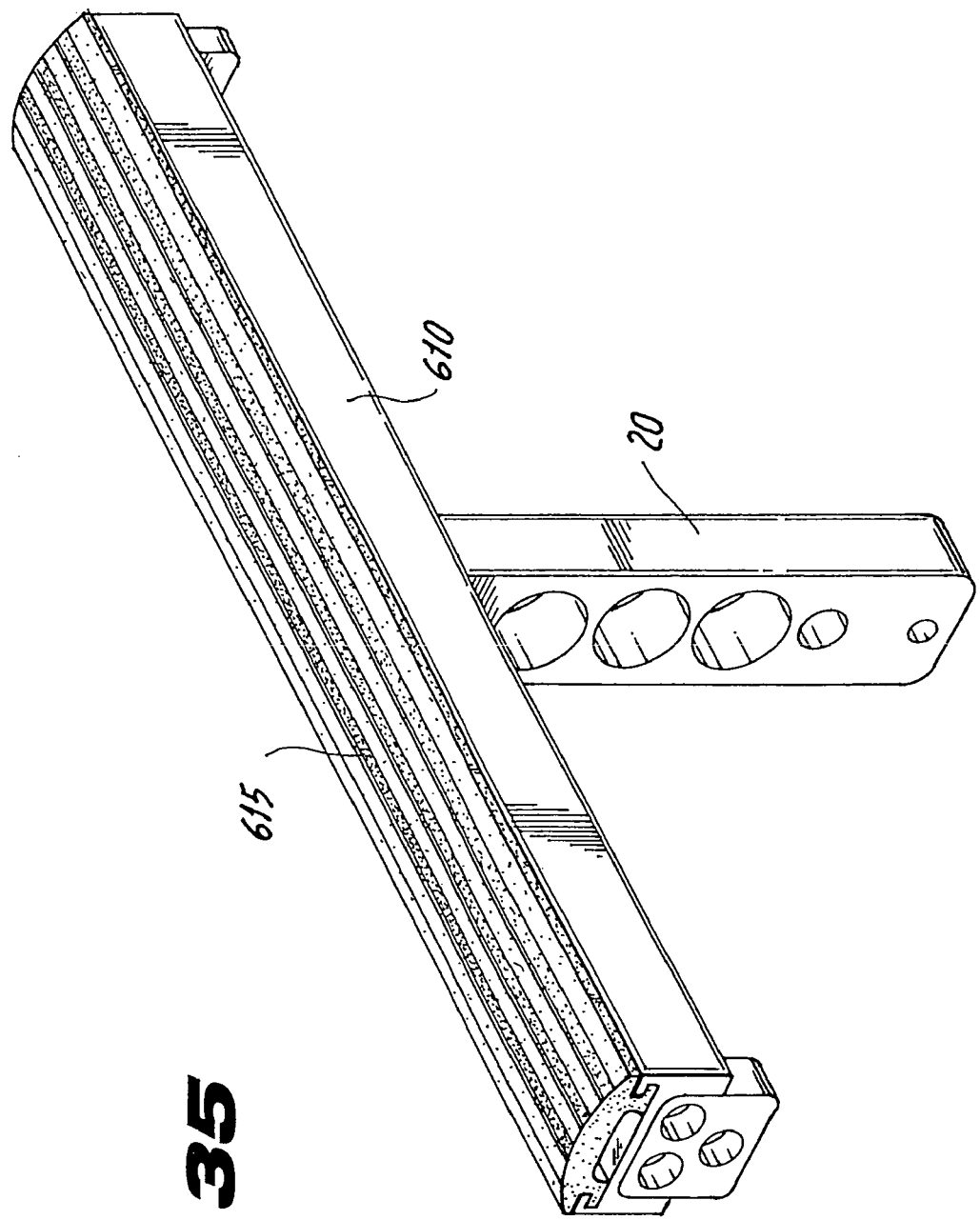
FIG. 35 is a perspective view of the channeled horizontal load support member as in FIG. 34, shown with an extruded support cushion installed in a T-slot.
Figure 36:
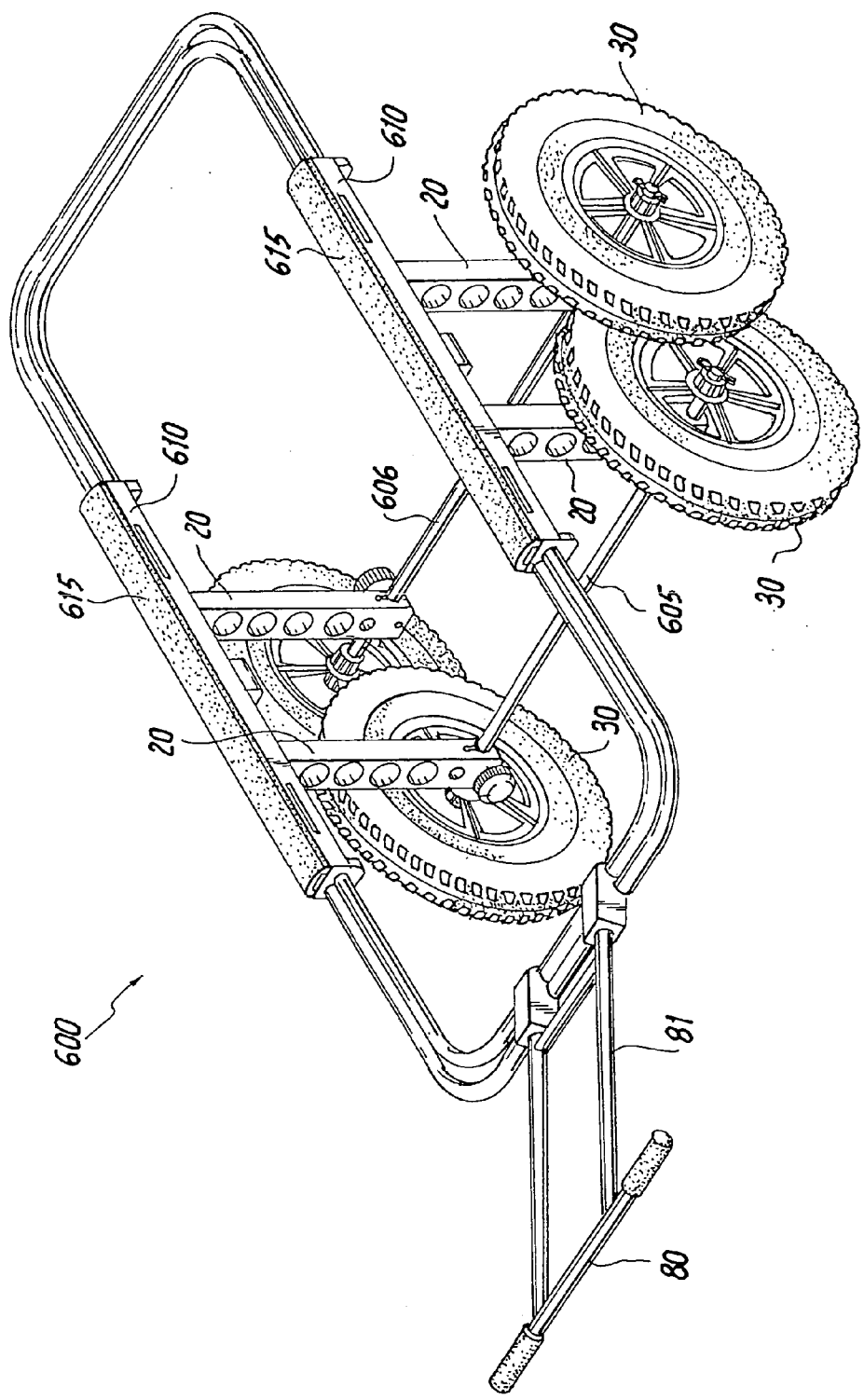
FIG. 36 is a perspective view of the embodiment for an assembled cart with four wheels further incorporating horizontal support members with a T-slot.

FIG. 35 shows a resilient cushion 615 installed in the T-slot 611 of support member 610. This cushion 615 can be extruded of a variety of rubber or thermoplastic elastomers and serves the same purpose as cushion member 13 described above. A perspective view of FIG. 36 shows cushions 615 installed on a four-wheel cart 600.

As described above, clamp assembly 200 is used to convert portable cart 1 to a disabled person-bearing transportable carrier cart. Three separate alternate embodiments of clamp assembly 200 are presented; all are compatible with the use of horizontal support member 610.

Figure 37:
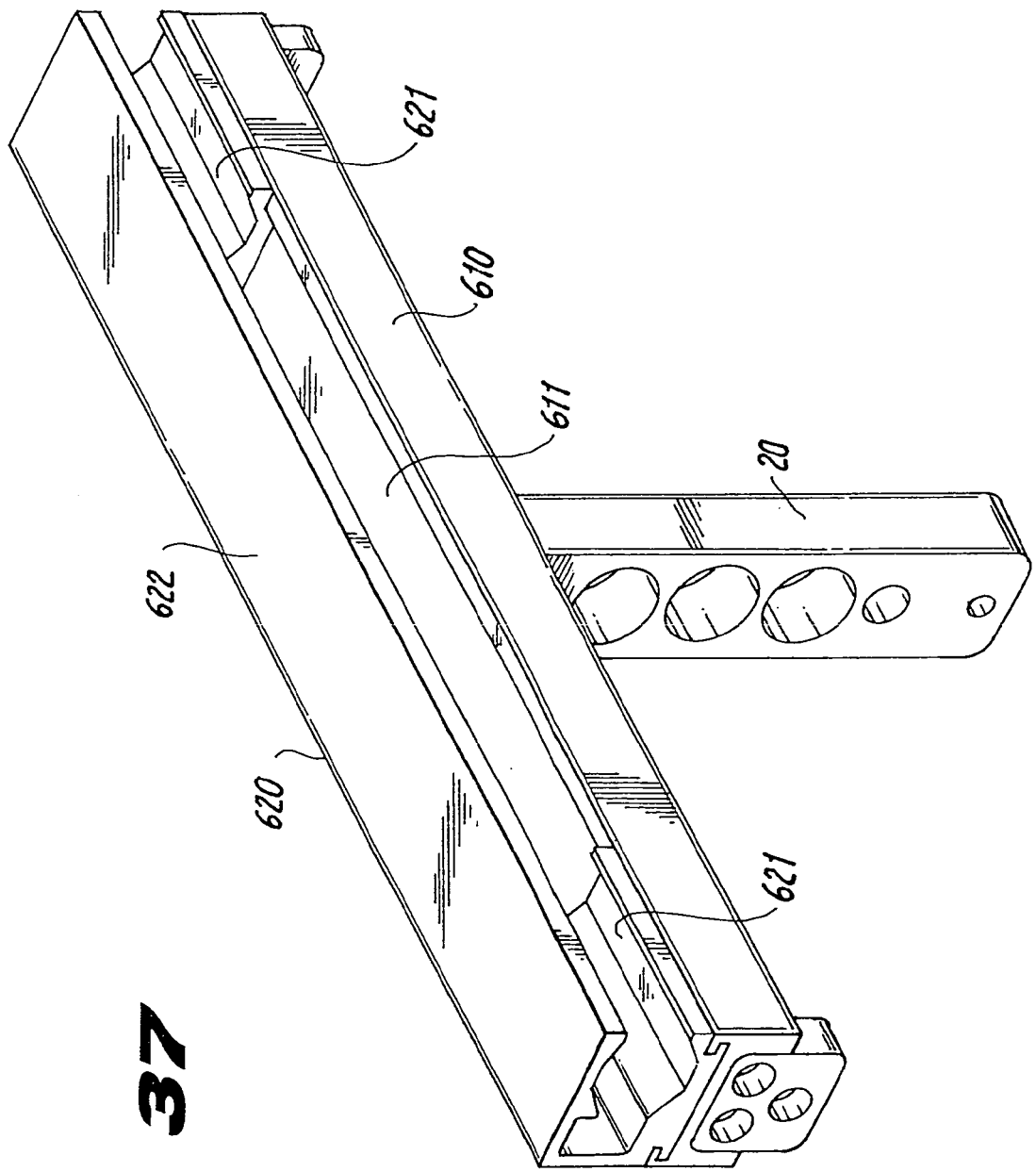
FIG. 37 is a perspective view of a horizontal support member with a clamp member having two short T-slot engaging members and a full-length top section.

FIG. 37 shows a one-piece clamp 620 with full width top section 622 and short end pieces 621, which mate with, and slip into the T-slot 611 of horizontal support member 610.

Figure 38:
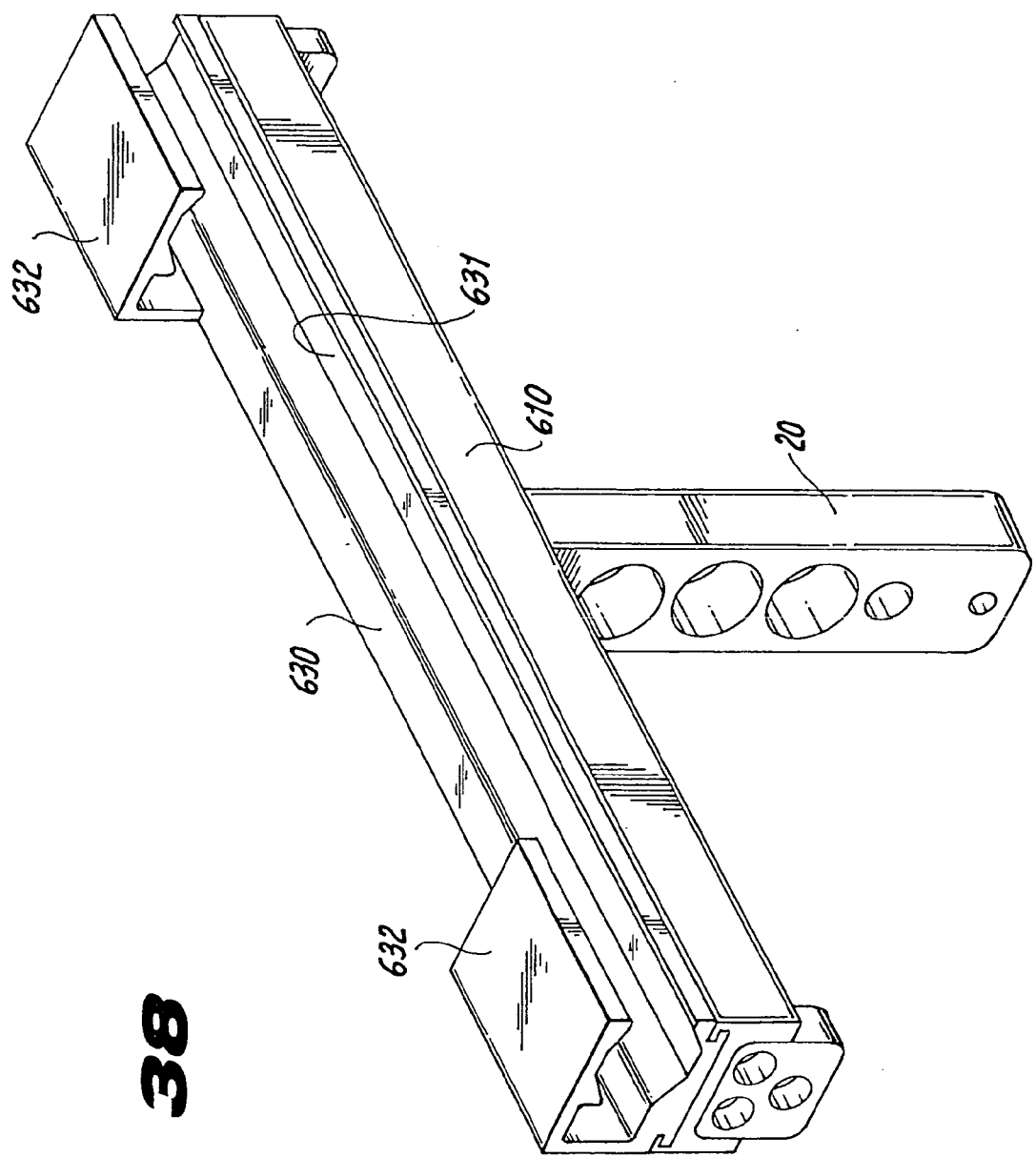
FIG. 38 is a perspective view of a horizontal support member with a clamp member having a full-length T-slot engaging bottom member and two short clamping top members.

FIG. 38 shows clamp 630 with a full width bottom member 631 which mates with and slides into T-slot 611 of horizontal support 610.

FIG. 39 shows another alternate embodiment consisting of two short identical clamp members 640, which are inserted into the T-slots 611 of member 610 at the two extreme ends.

In all cases, the short clamping sections can be sized to offer spring-like gripping action on the tubular members, or fasteners, such as thumbscrews or ball plungers (not shown) can be used for retention.

FIGS. 40–50 show alternate embodiments for converting a conventional hand carried, railed medical rescue stretcher to a lightweight wheeled version.

For example, FIGS. 40–42 show shortened horizontal support members 710 with tightening members 711. Rails 713 are held either by clamps, such as shown in FIGS. 37–39, or alternatively through apertures in horizontal support members 710, as shown in FIG. 14. Horizontal support members 710 are demountably attached to vertical struts 720 having extending therethrough transverse axles 732 supporting wheels 730. Optional pivotable kickstand 740 is attached to rails 713 by clamp 800.

Figure 47:
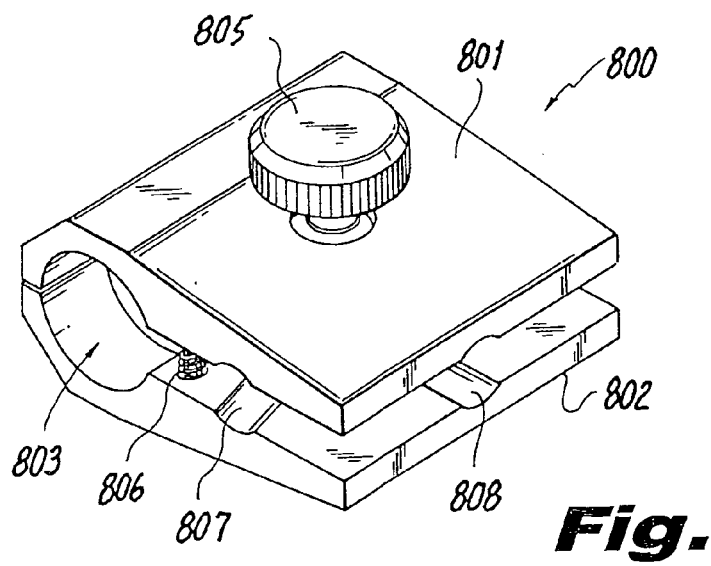
FIGS. 47, 47A, 47B, 48 and 49 show respective isometric, left side, top, front and right side views of the clamp used in the embodiments shown in FIGS. 40–46.
Figure 47A:
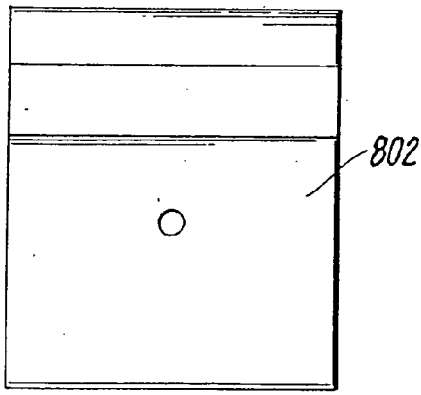
Figure 47B:
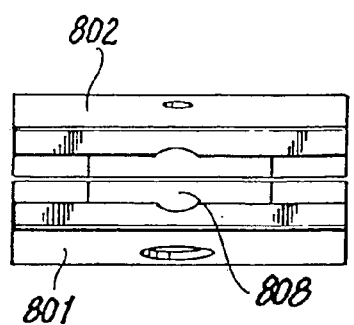
Figure 48:
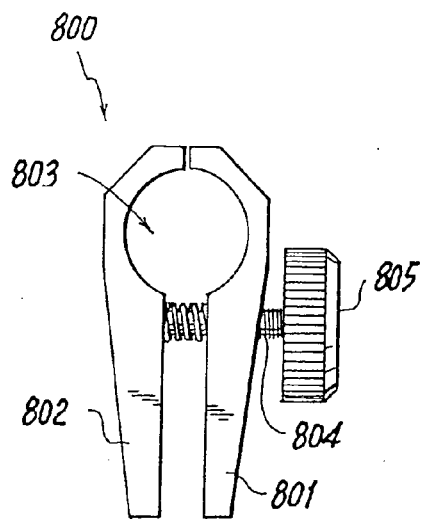
Figure 49:
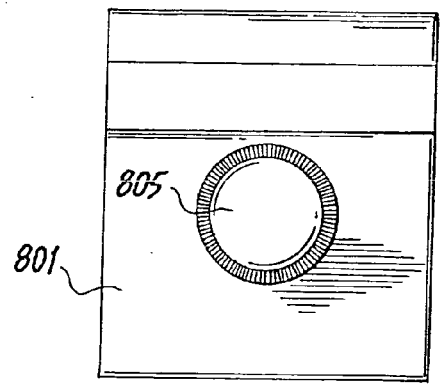
Figure 50:
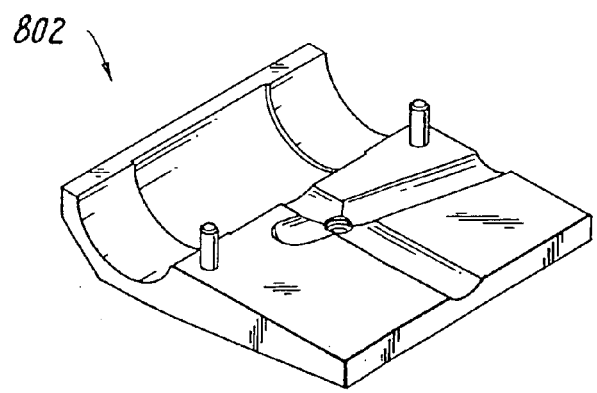
FIG. 50 is an isometric view of a half piece thereof, shown with spring pins.

As also shown in FIGS. 47–50, clamp 800 includes two jaws 801, 802 having aperture recess 803 for insertion of rails 713 therethrough. Clamp 800 is closed and tightened by fastener 804 operated by rotatable knob 805. Internal spring pins 806, as shown in FIG. 47, cooperate with fastener 804 and knob 805 to tighten clamp 800 about rail 713. Internal grooves 807, 808 accommodate kickstand 740 in the respective positions of support and rest, as shown in FIG. 40 and FIG. 42 respectively.

Figures 43, 44:
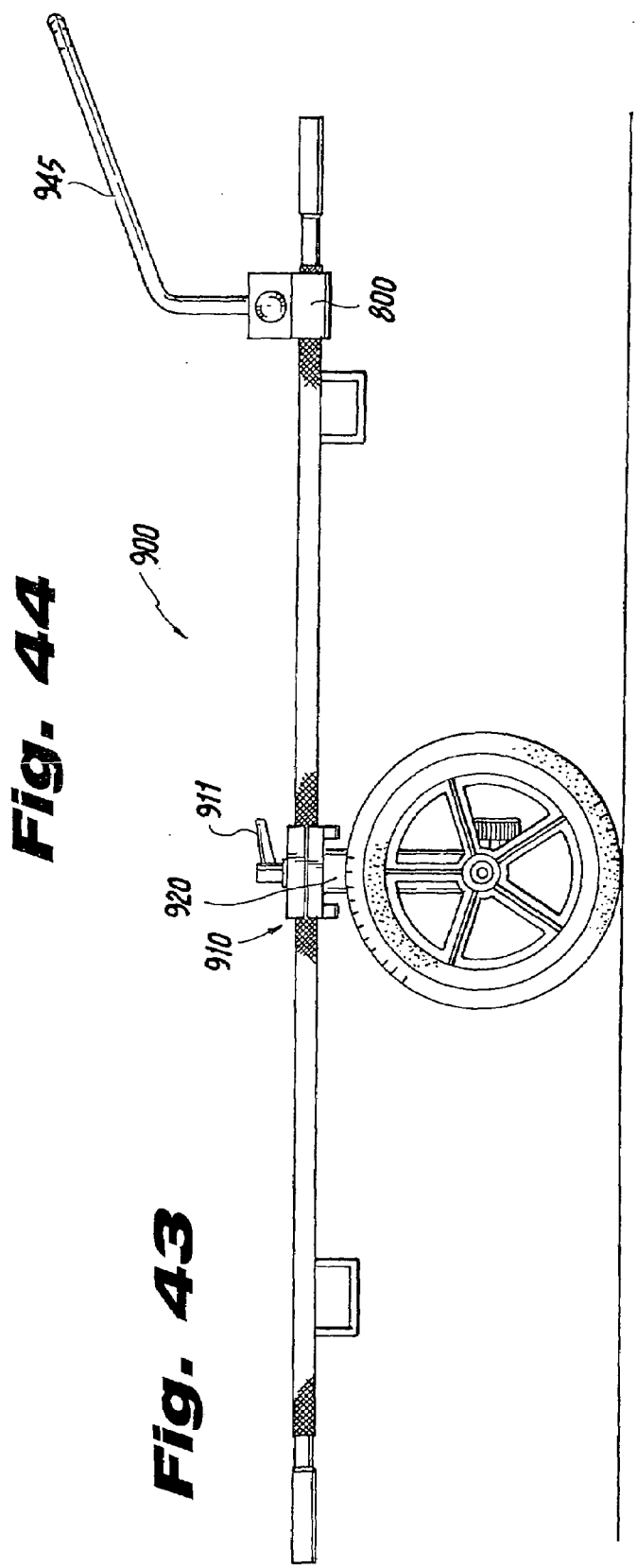
FIG. 43 is a side elevational view of a low profile military rescue carrier cart, shown with a handle.
FIG. 44 is a front elevational view of the handle as in FIG. 43.

FIG. 43 shows an alternate embodiment for a military or emergency rescue carrier cart 900 with a profile set low to the ground, including shortened horizontal members 910 with tightening fasteners 911. Rails 913 are also held by clamps as in FIGS. 37–39, or alternately through apertures in horizontal support members 910, as in FIG. 14. Horizontal support members 910 are demountably attached to shortened vertical struts 920 to keep stretcher rails 913 close to the ground. Optional bent handle 945 is connected by clamps 800 disclosed in FIGS. 47–50, as discussed above.

Figure 45:
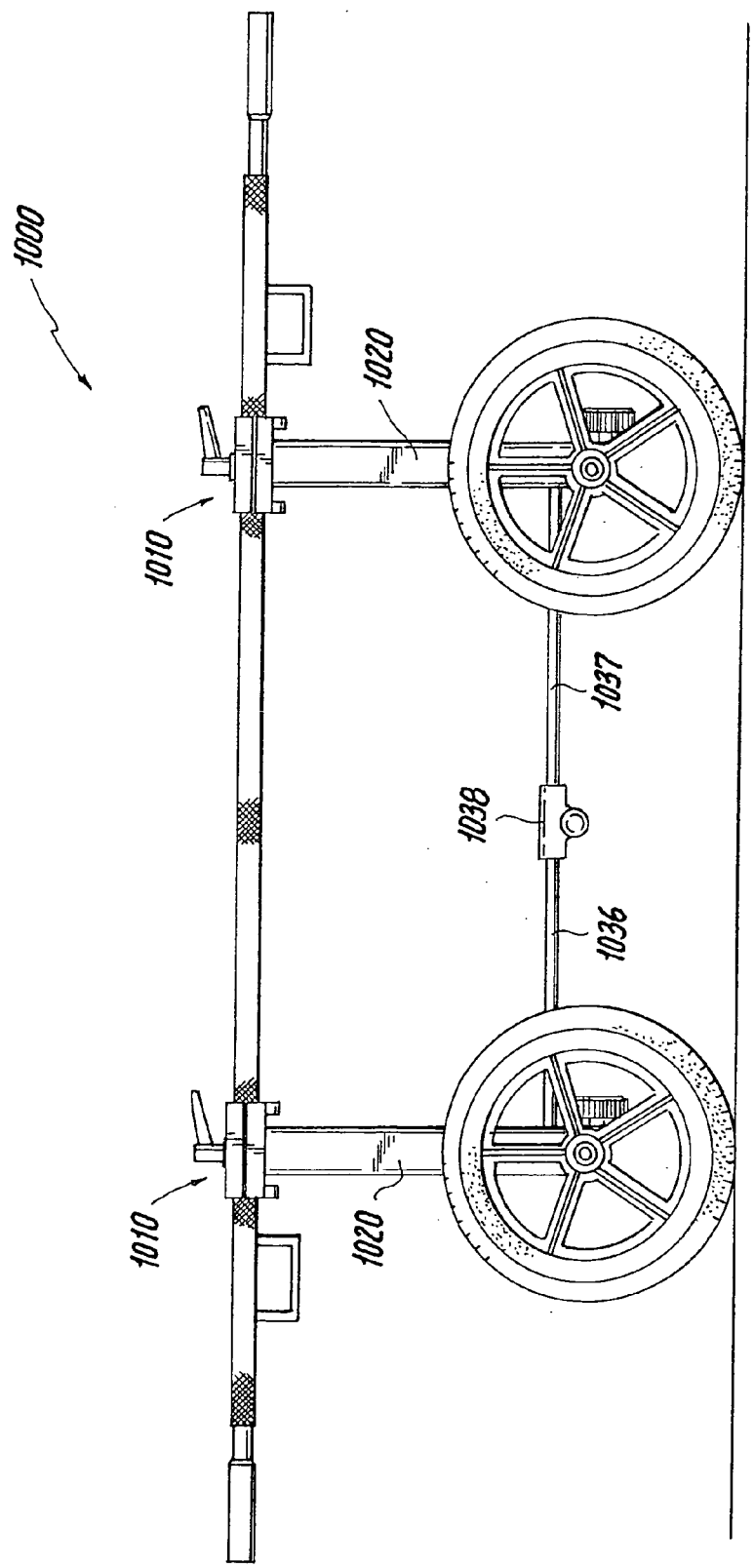
FIG. 45 is a side elevational view of an alternate embodiment for a four wheeled rescue carrier cart, shown with stretcher rails and with stabilizing tie rods, for use as a temporary stationary medical gurney.
Figure 46:
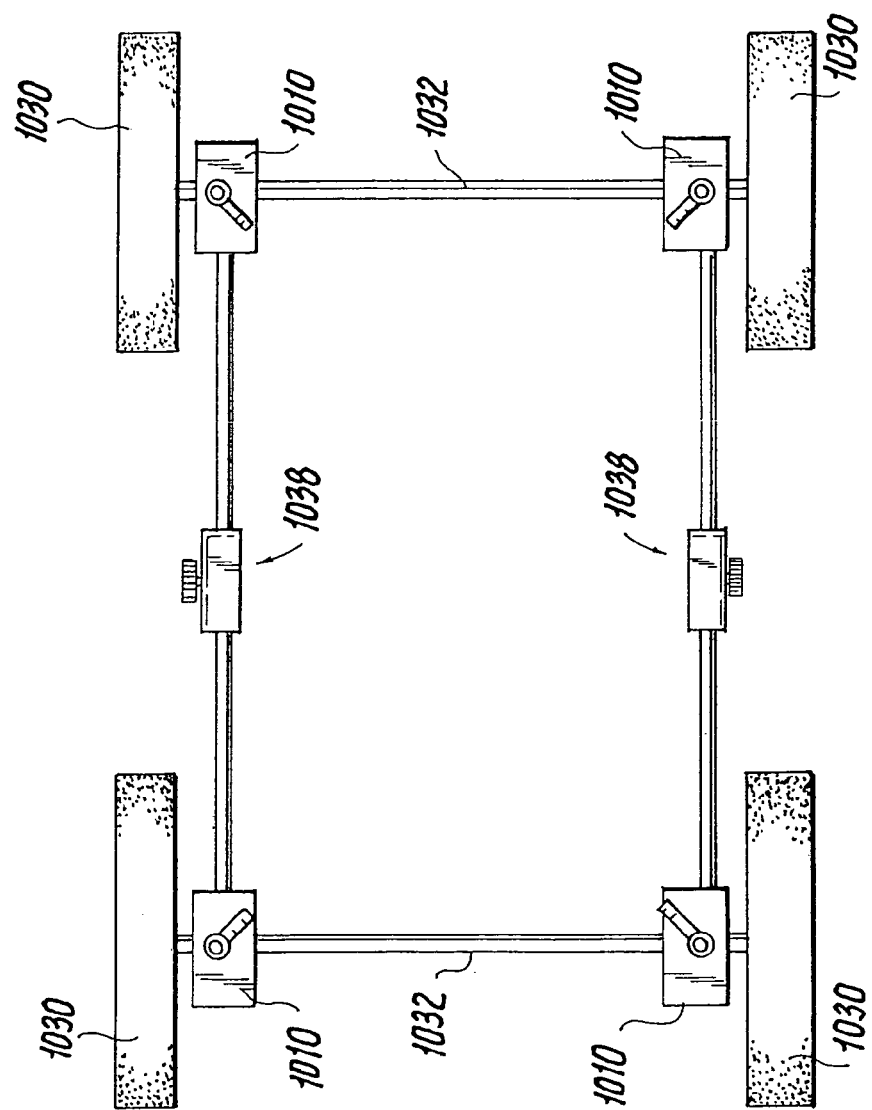
FIG. 46 is a top plan view thereof; shown without the stretcher rails.

FIGS. 45–46 show how the stretcher version shown in FIGS. 40–42 can be converted to a stationary medical gurney 1000. Rails 1013 are supported by horizontal support members 1010, which hare demountably attached to vertical struts 1020, having axles 1032 supporting wheels 1030. To stabilize gurney 1000, horizontally extending tie rods 1036, 1037 are joined by threaded clamp 1038 or other fastening means.

The major structural components of an alternate embodiment low profile rescue carrier are shown in FIG. 43A. Latch clamps 1800 of stretcher bearing tube assemblies 950 support stretcher 1730 and also engage handles 630 at each end. Handles 630 may be rotated into an upward locking position or downward. Tube assemblies 950 include lateral spring pins 962 and upper spring pins 963 for proper placement of wheel assemblies comprising struts 920 having rail bearing clamps 910 operable by latch handles 911.

FIG. 43B shows an exploded view of handles 630 engagable with stretcher bearing tube assemblies 950 of FIG. 43A. Handles 630 are attached to short handle shafts 956 with spring pins 958 (as in detail callout FIG. 43C) within. Similarly, a coupling section detailed in FIG. 43C has spring pins 958 installed as shown. Spring pins 958 include bent leaf spring section 960 which tail end impinges on the inside of tube 956 or tube 952 while the other end is attached to spring pin button 962 which protrudes through a hole in the side of tube 956 or 952. Buttons 962 couple with a tube mid sections 954 via holes near the ends of these tubes. Buttons 963 function as wheel set locators and fit into wheel set clamps for proper fixturing, as shown in FIG. 43A.

Figure 43D:
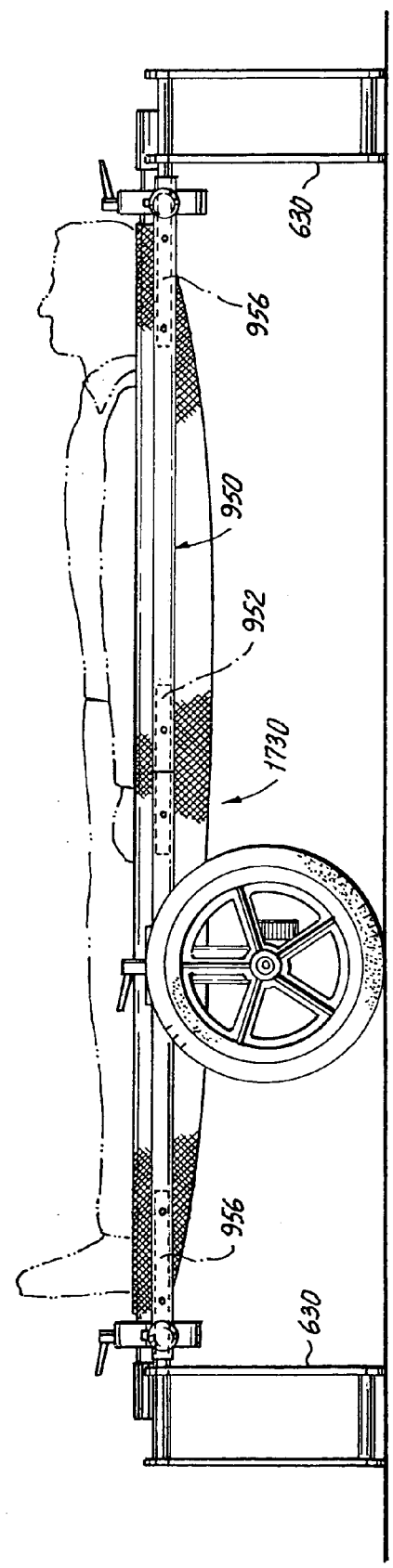
FIG. 43D is a side elevational view of the assembled components of a low profile rescue carrier cart as in FIGS. 43A, 43B and 43C.

The low profile rescue carrier is also shown in the side elevational view of FIG. 43D, which illustrates the feature of the handles 630 rotated to the downward position and functioning as kickstands.

As shown in FIG. 43E, the low profile rescue carrier is easily converted into a low profile transport rotating handles 630 from the kickstand support position to an upright handle position which is easily grasped by medical personnel. Short handle shafts 956 are shown in the optionally extended position in FIG. 43E, to allow for clearance between the medic and the stretcher. The medic may drag the stretcher 1730 upon stretcher bearing assembly 950 as shown, or alternatively, push or pull the stretcher or other carrier bearing assembly 950 forward by reversing his orientation.

Figure 51:
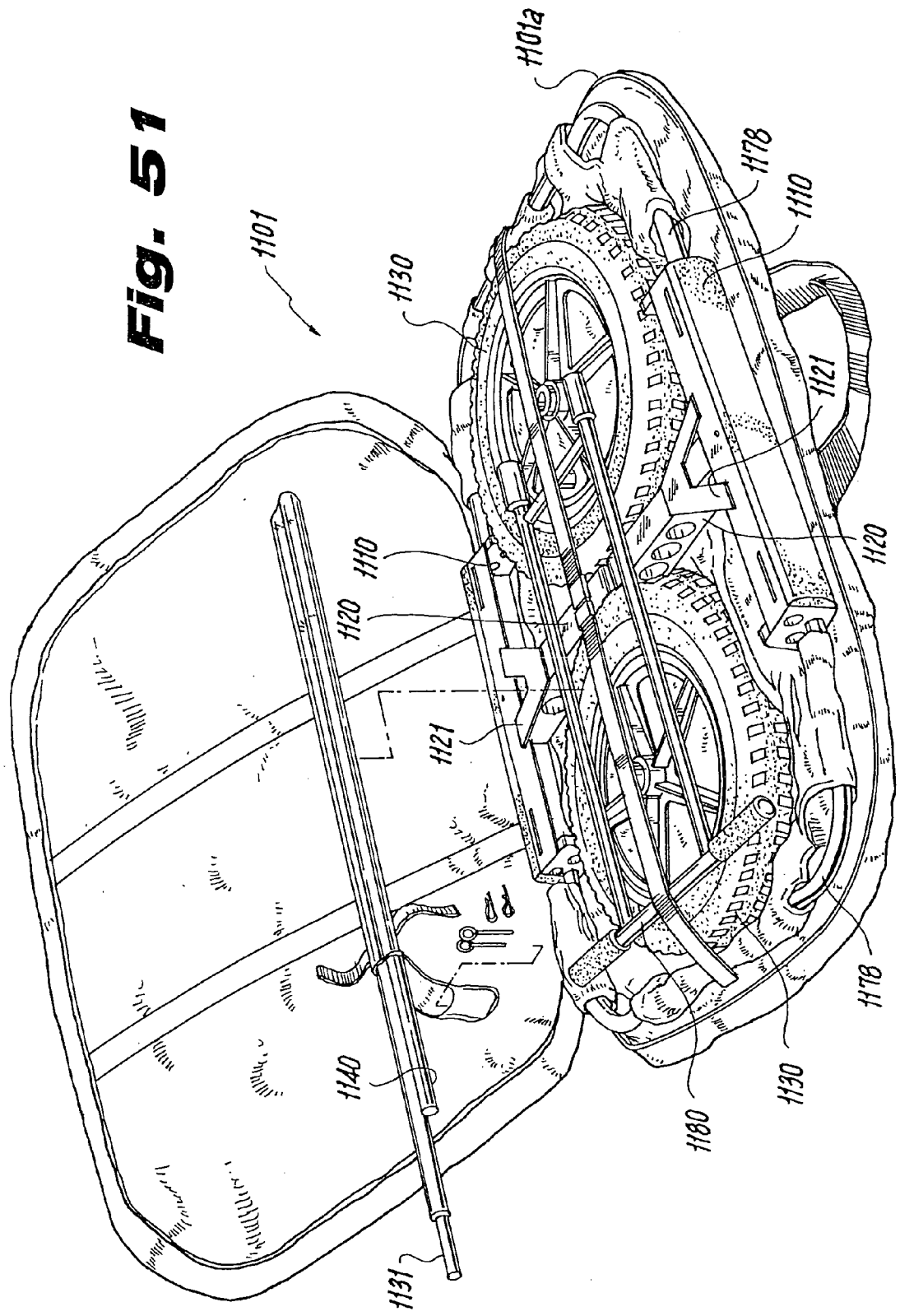
FIG. 51 is an isometric perspective view of a further embodiment for a disassembled, single axle cart, stored in a carry bag.
Figure 51A:
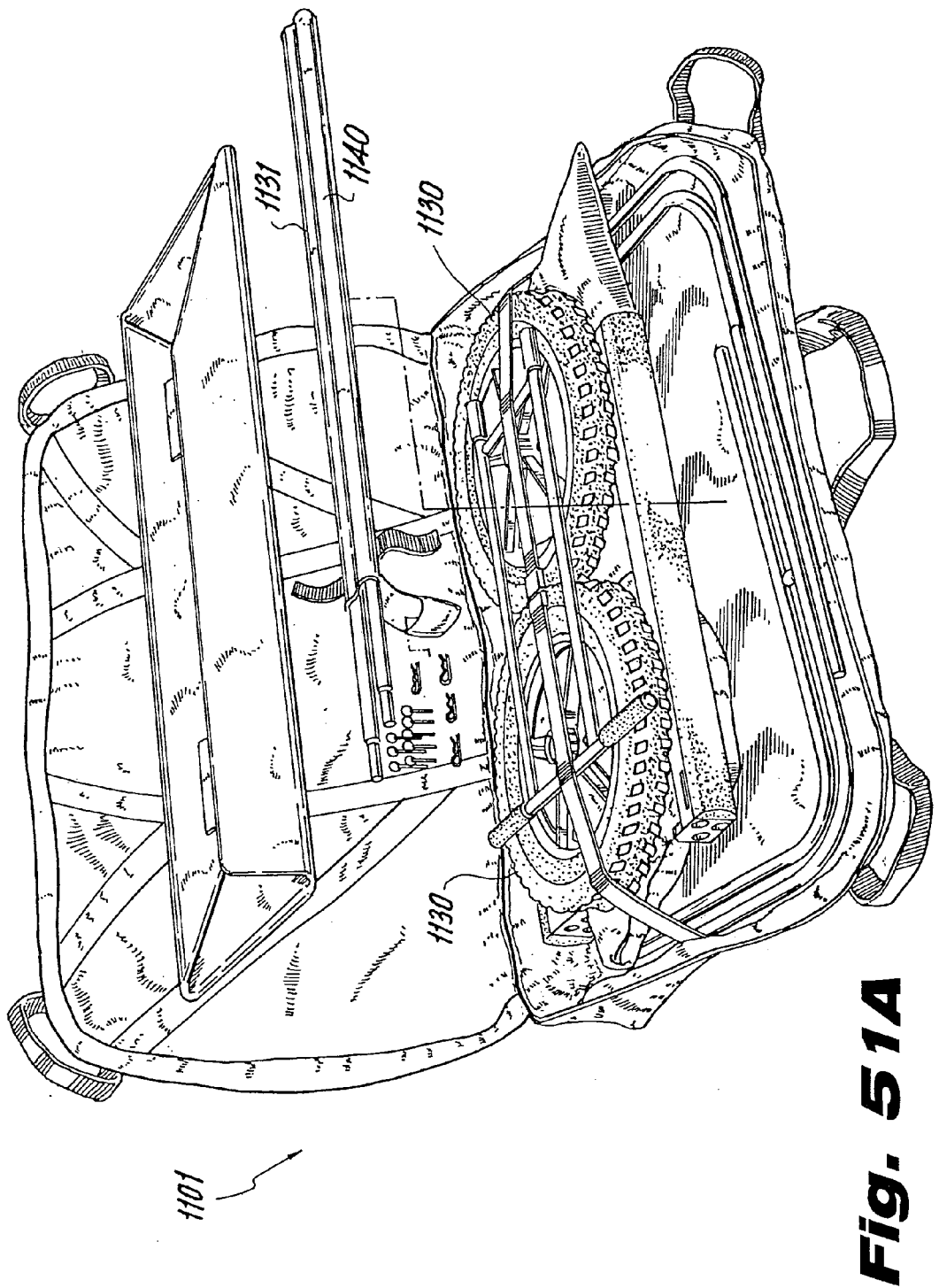
FIG. 51A is a further perspective view thereof.

FIGS. 51–53 show a further embodiment for portable cart 1101 which folds down to a disassembled storage position as in FIG. 51 and which unfolds to an assembled position of use as in FIG. 52. Cart 1101 includes a pair of horizontal load support members 1110 laid parallel to each other, which rotate axially to move perpendicularly extending vertical struts 1120 outward from a position within a storage bag 1101a, where vertical struts 1120 face each other's distal ends, to a position of use 90 degrees perpendicular to the storage position, where vertical struts 1120 extend in the same plane but outward from horizontal load support members 1110.

In this embodiment shown in FIGS. 51–53, the resilient rails 1178 are engaged to horizontal supports 1110 such that when in a position of storage the rails 1178 are biased to return to their normal position of use, when released from the storage position, thus causing vertical struts 1120 attached to horizontal supports 1110 to pivot upward and bow, thus increasing the strength of the cart.

The same is true with other embodiments of the present invention. For example, placing a boat 2 upon cart 1 causes horizontal support members 10 and wheel axles 31 to bow, giving it the strength of an uncollapsible Roman arch. The same is true with respect to stretcher or cargo hauling embodiments shown in FIGS. 12, 17–19, 40–45 and 58–66, for example, wherein putting weight makes the carrier portion taut and bows the frame members into a position of strength. Also the multiple floating overlapping rails as in FIG. 14, for example, bow the rails and strengthen the cart with a load supported thereon.

Moreover, vertical struts 1120 can be further strengthened in place to horizontal supports 1110 by connecting braces, such as V-shaped braces 1121.

Wheels 1130 are held by axle 1131, which in a storage position is placed within the storage bag 1101a. To lengthen cart 1101, rails 1178 move away from each other within holes 1112 within horizontal supports 1110, and are stopped from further movement by spring stop buttons 1171.

Figure 54:
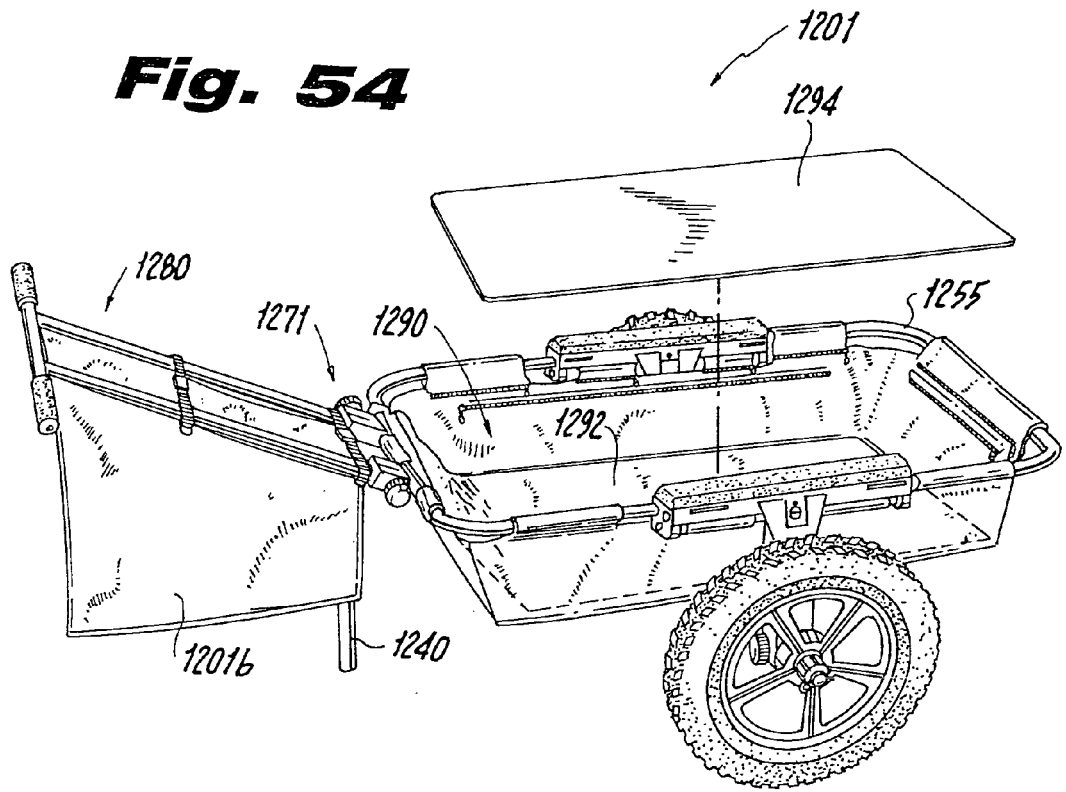
FIG. 54 is an overall perspective view in partial cutaway of the cart showing the wagon portion in its cargo-carrying configuration.
Figure 55:
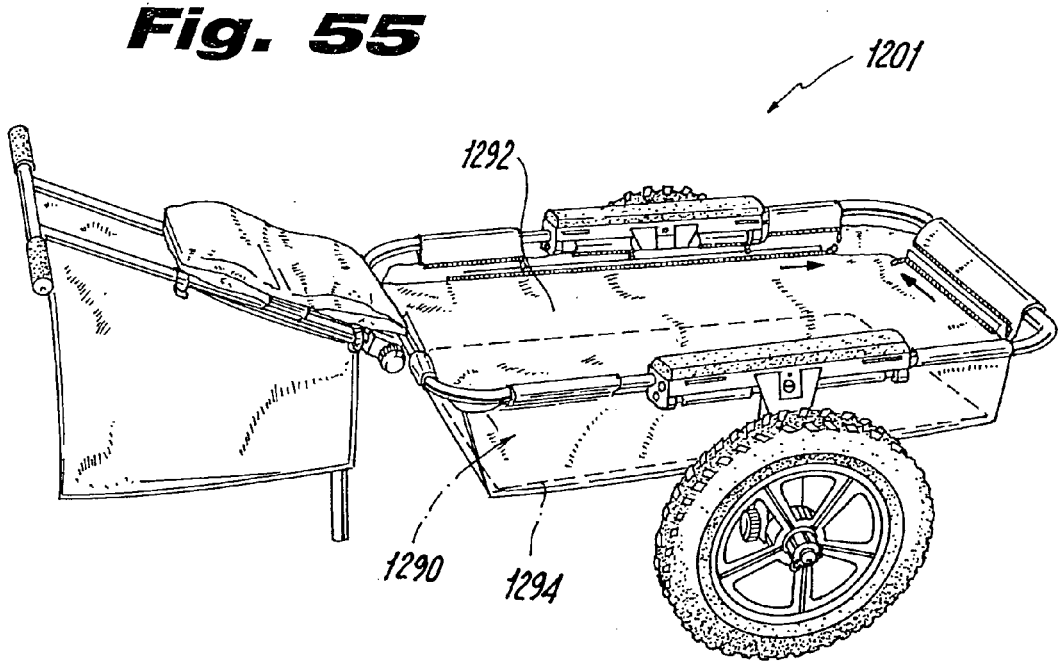
FIG. 55 is an overall perspective view of the cart of FIG. 54, shown in its rescue stretcher configuration.

FIGS. 54–55 show portable cart 1201 which can be converted from a cargo hauling wagon configuration with cargo well 1290 attached to frame 1255, to a rescue stretcher with taut rescue canvas or other stretcher 1292 when stretcher 1292, which sits loosely above hollow well 1290 during the cargo hauling configuration, but which becomes taut when peripheral fasteners, such as zippers 1296, snaps or the like tighten stretcher 1292 in place about frame 1255.

Optional kickstand 1240 or handle 1280 may be attached to cart 1201 by joints 1271. A further accessory arm bag 1201b may be draped down from handle 1280 for further storage. An optional hard floor member 1294 may be provided below stretcher layer 1292 within cargo well 1290 for cargo hauling strength.

Figure 56:
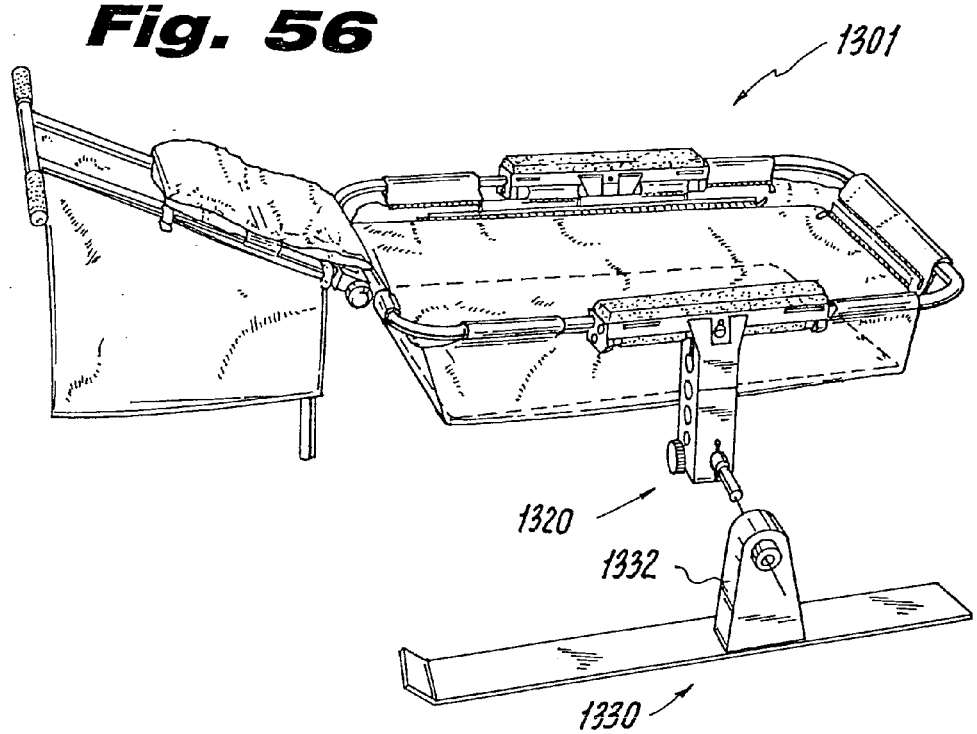
FIG. 56 shows a detail view of an optional ski attachment instead of wheels, for use in snow and winter environments.

FIG. 56 shows optional ski attachments 1330 for cart 1301, wherein ski portions 1331 are attached by braces 1332 to vertical struts 1320. The length of braces 1332 is equal to the radius of wheels 30 in previous embodiments.

Figure 57:
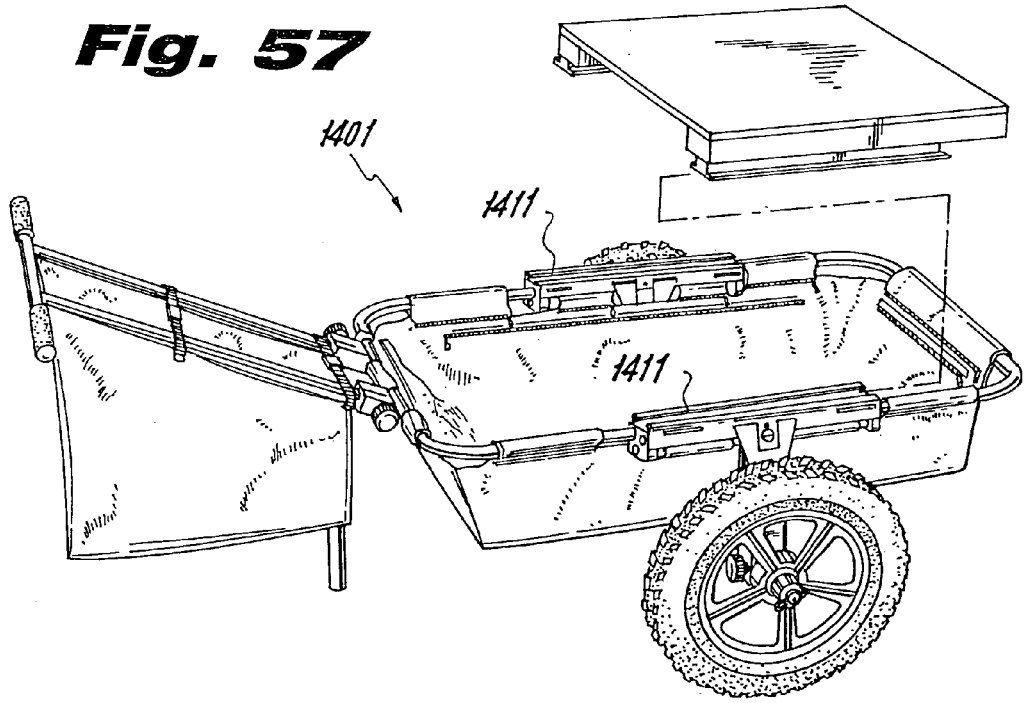
FIG. 57 shows a detail view of an optional platform base for supporting objects thereon.

FIG. 57 shows optional platform base 1450 for supporting object such as camera tripods, cooking devices, ordnance, etc. upon cart 1401. Platform base 1450 slides within channels 1411 and is secured in place by fasteners such as recessed hex nuts.

Figure 58:
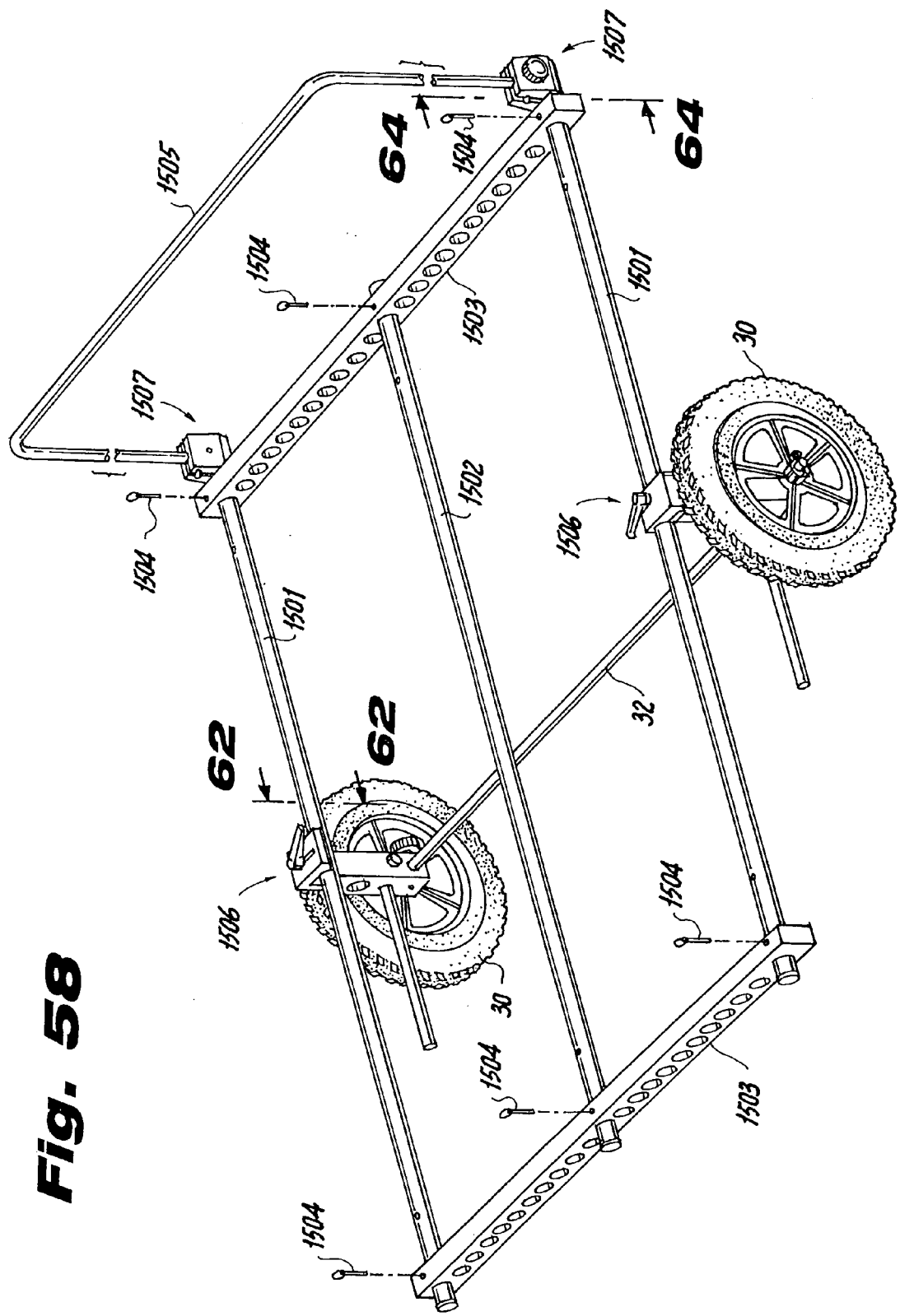
FIG. 58 is a perspective view of portable cart frame configured as a multi-victim stretcher.

FIG. 58 shows a portable cart frame of this invention configured as a cargo hauler or as a multi-victim stretcher. The cart includes two outer longitudinal horizontal parallel rigid load support frame members 1501, which are preferably tubular. The cart also may include an optional center frame member 1502, also preferably tubular, as well as optional transverse frame members 1503, overhead tube frame 1505, two vehicle actuators, such as wheels 30 and axle 32. It is contemplated that in snow conditions the vehicle actuators can alternatively be skis, such as shown in FIG. 56 herein.

Also as shown in FIG. 58, fasteners, such as cotter pins 1504 are used to attach horizontal support members 1501 and 1502 within holes, such as circular holes for tubular shaped horizontal support members in transverse members 1503.

Also as in FIG. 58, vertical struts having the wheel subassembly with wheel 30 are attached to outer horizontal support members 1501, such as tubes, with mechanisms 1506 which permit quick attachment and detachment. Attachment clamps 1507 secure overhead handle 1505 to outer ends of horizontal support members 1501.

Although not shown in the drawings, any of the embodiments herein shown in all the drawing FIGS. 1–70 may have vertical length adjustment means (not shown), such as a sleeve containing a telescoping shaft, the sleeve having a spring means for urging the shaft in a selectably extendable manner out of the sleeve and a lock for locking the telescoping shaft into a selected extended position.

Figure 59:
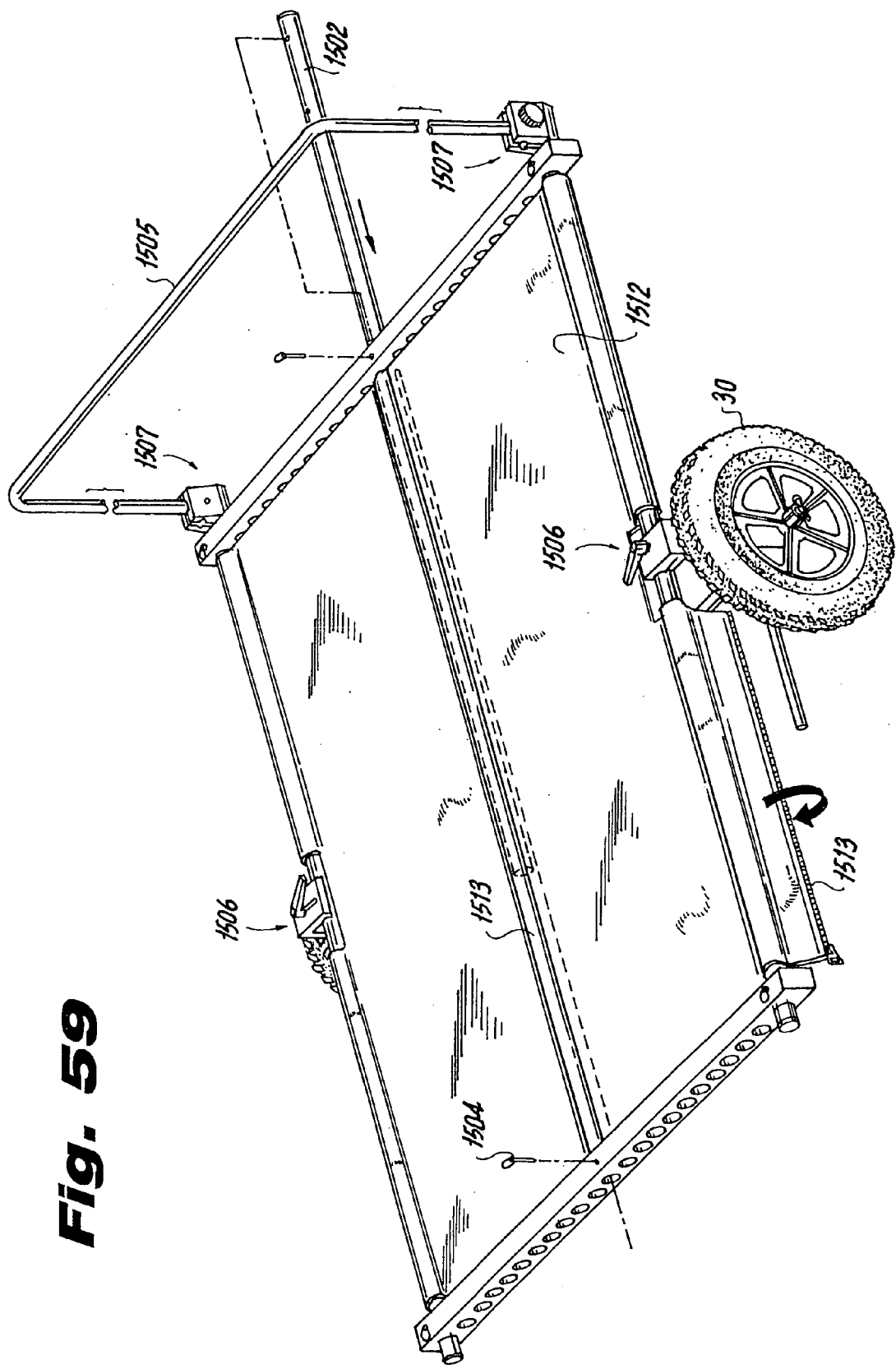
FIG. 59 is a perspective view of multi-victim stretcher using single fabric top surface cover.

FIG. 59 shows a single cargo or person hauling fabric top surface sheet 1512, which can be made of canvas or similar material. Sheet 1512 preferably has sewn longitudinal pockets at the outer edges to accept horizontal support members 1501 and a central pocket 1513 to accommodate optional central frame member 1502 when inserted in direction 1514 as shown. Optional apron sections 1513 can be flipped over the side edges.

Figure 60:
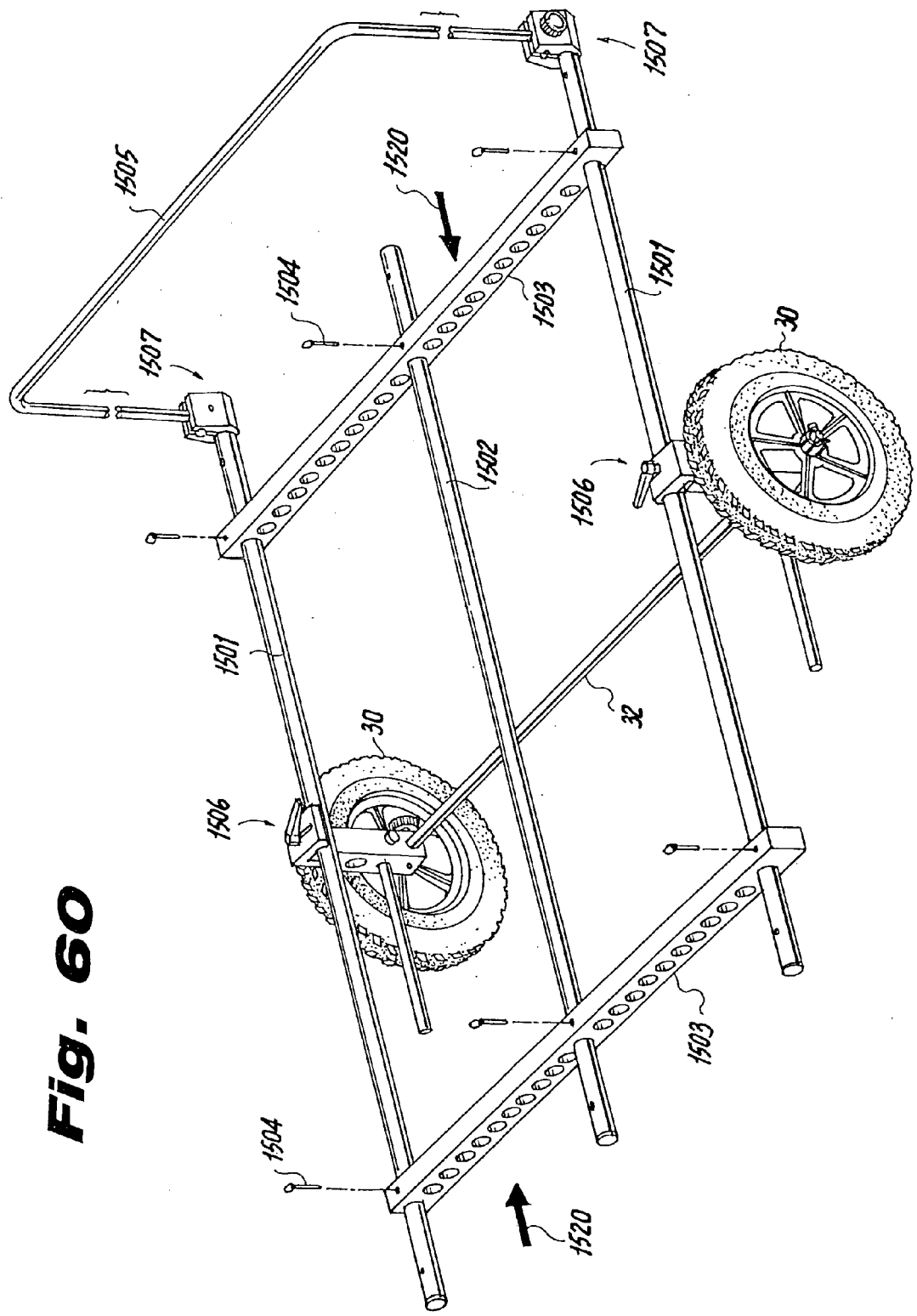
FIG. 60 is a perspective view of multi-victim cart frame reconfigured to accept separate stretchers.

FIG. 60 shows the frame of this cargo hauling or multi-victim cart readjusted to foreshorten the distance between transverse members 1503 by securing cotter pins 1504 in holes in horizontal support members 1501 and 1502 which are located farther in from the ends.

Figure 61:
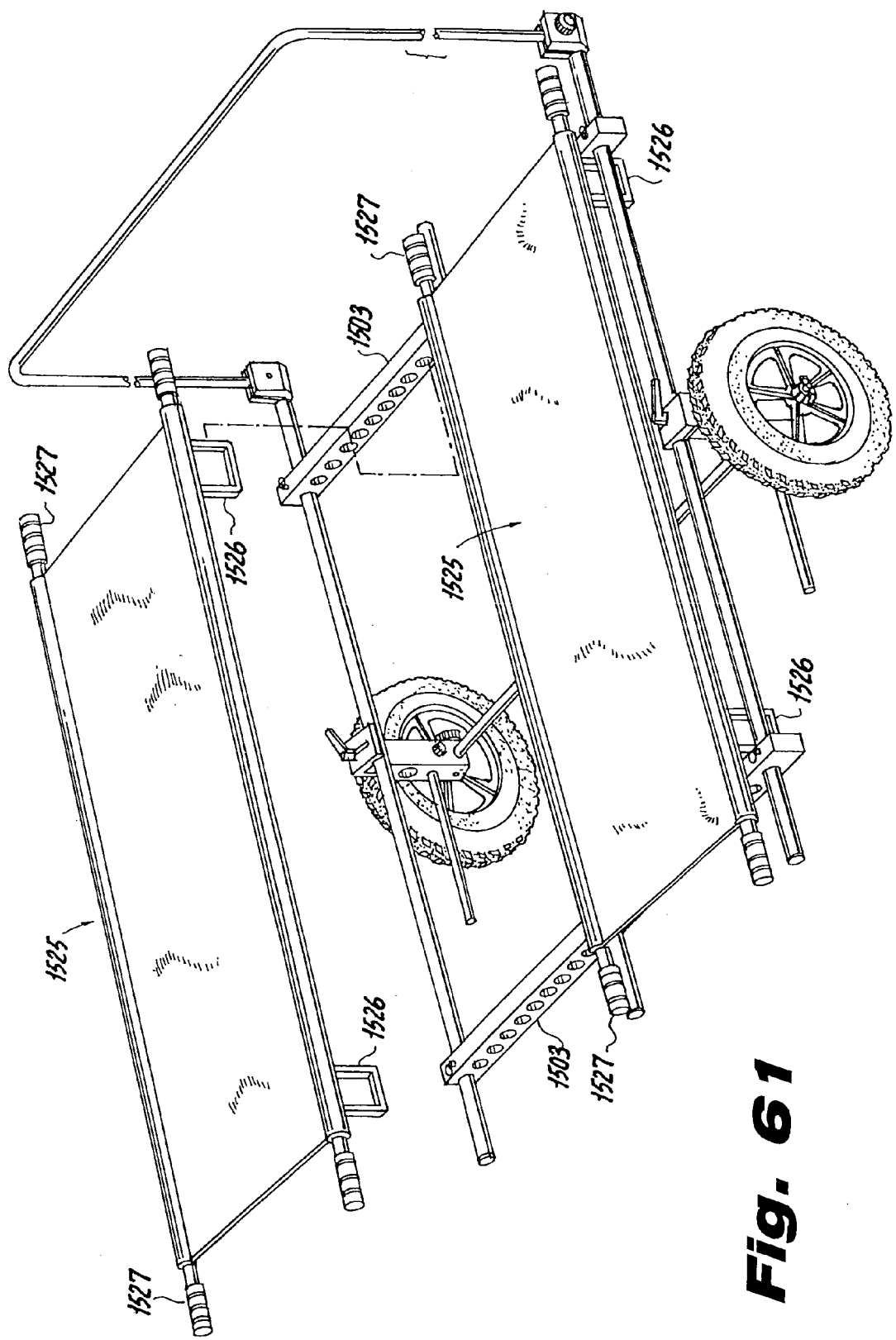
FIG. 61 is a perspective view of multi-victim stretcher using separate stretchers.

As shown in FIG. 61, this adjustment can be used to accommodate separate stretchers 1525 with locating extensions 1526 and handles 1527.

FIGS. 62 and 63 show end views of the quick disconnect/connect mechanisms 1506 (in viewing direction "62—62" in FIG. 58) with horizontal support member 1501 shown optional as tubular in cross section. Top clamping member 1532 has slot 1531 which permits it to slide from the locking position shown in FIG. 62 to the unlocked position of FIG. 63 thereby releasing side horizontal support member 1501 from the wheel 32 subassembly which continues below lower clamp jaw 1533.

In FIG. 62, spring 1534 is compressed since the locking shaft concentric with it has been threaded downward by turning handle 1530 in a clockwise direction.

In FIG. 63, handle 1530 has been turned about 180 degrees counter-clockwise thereby permitting spring 1534 to push up on top member 1532 releasing horizontal support member 1501.

FIG. 64 is a partial end cross section (in plane "64—64" of FIG. 58) of clamp 1507. The split 1544 in clamp body 1540 permits selective grasping of horizontal support member 1501 as per the clamping force from screw 1542 as applied through knob 1541. Stainless steel insert 1543 prevents collapse of the end of tube 1505 of the overhead assembly.

Figure 65:
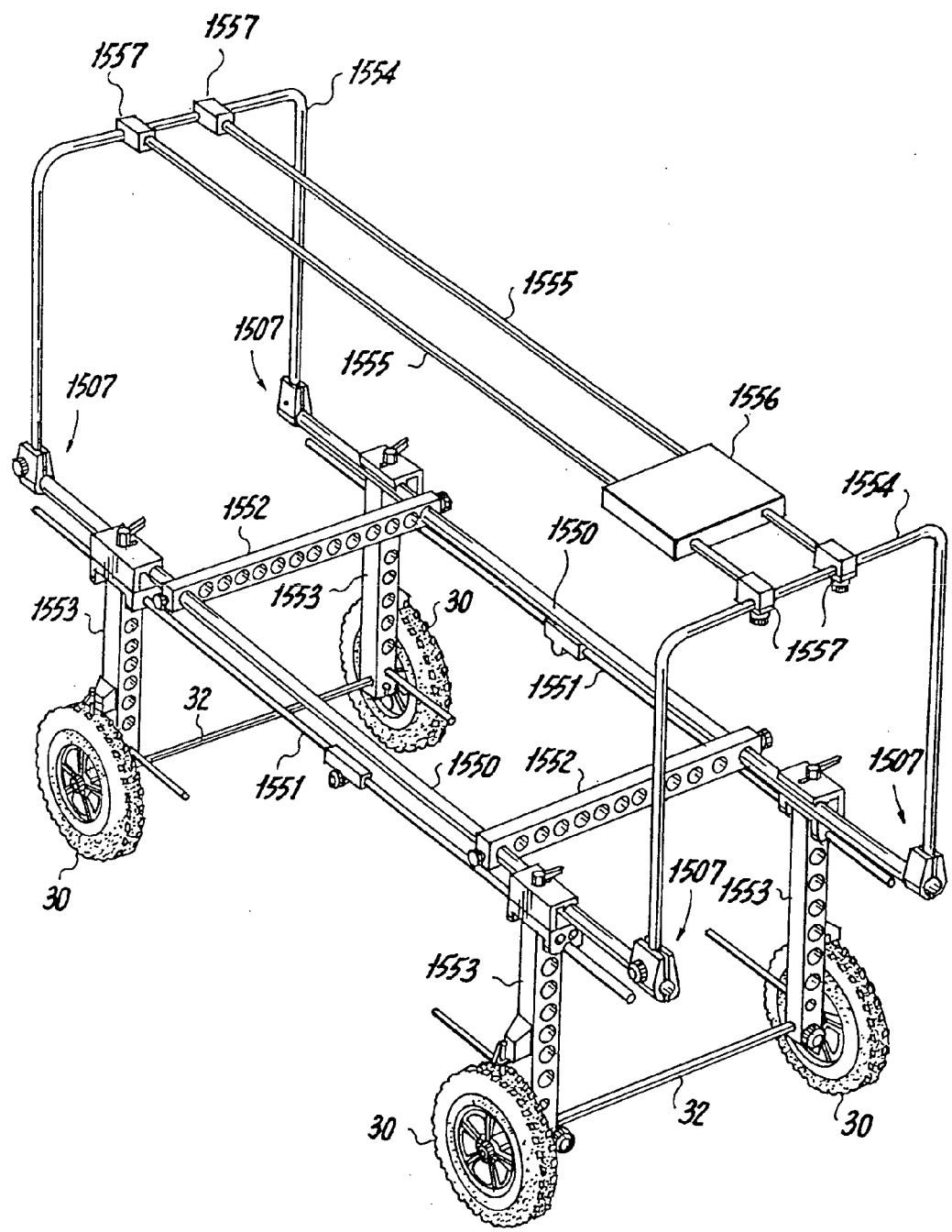
FIG. 65 is a perspective view of portable cart frame configured as an operating room table/gurney.

FIG. 65 shows yet another embodiment of the cart of this invention as a frame for a portable operating room table or a gurney. This portable operating room table/gurney includes side horizontal support members 1550, such as, for example, frame tubes, auxiliary side bars 1551, transverse frame members 1552, vertical struts 1553, overhead support frames 1554, overhead rails 1555, trolley 1556, and attachment clamps 1557. The portable operating room table/gurney rides on four wheels 30 with axles 32.

Figure 66:
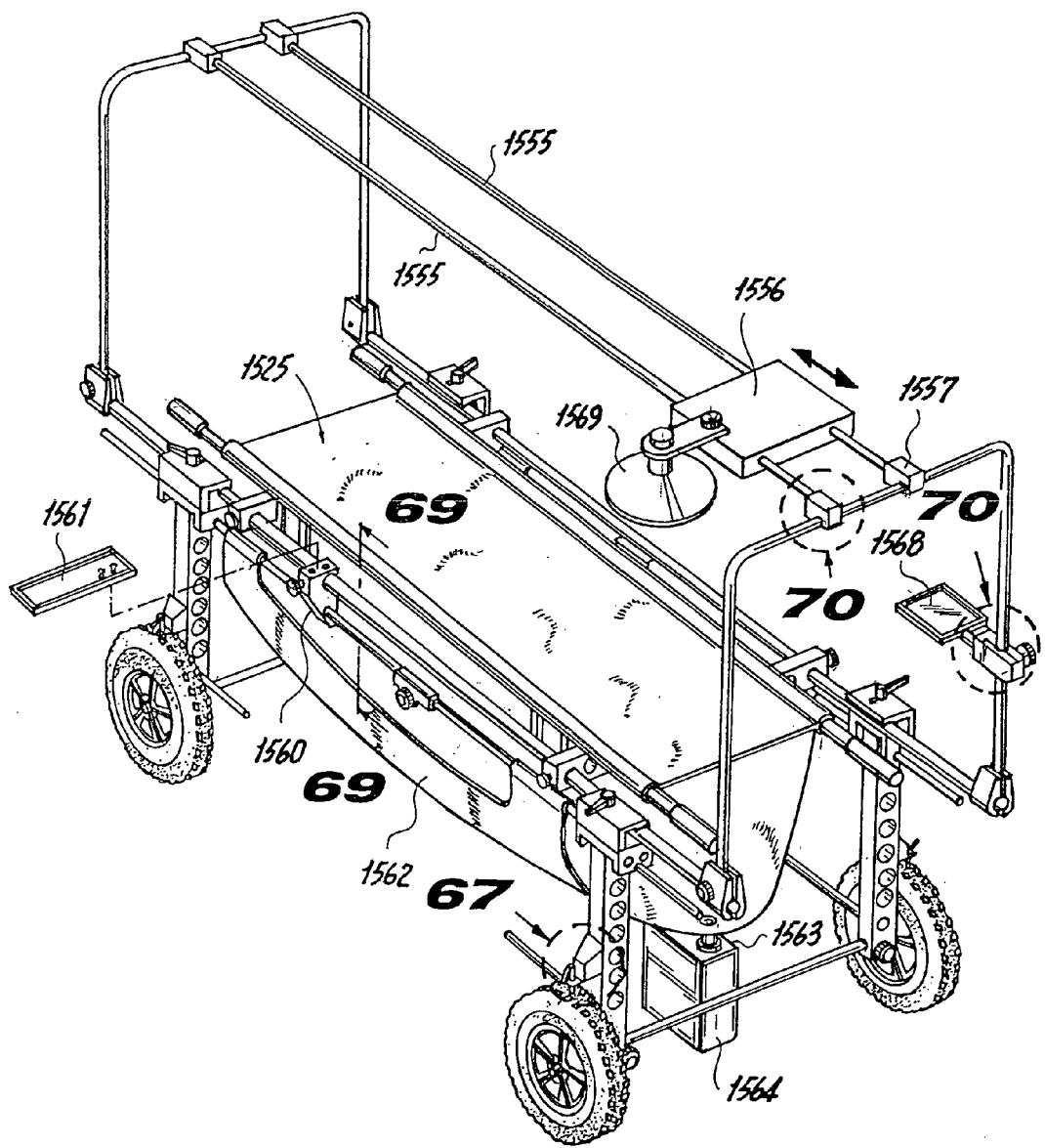
FIG. 66 is a perspective view of operating room table/gurney.

The fully configured gurney is shown in FIG. 66. Additional features shown include flexible fluid capture collection sling 1562, fluid collection tube 1563, fluid collection tank 1564, adjustable side clamp 1560, side rest or surgical instrument table 1561, wheel brakes 1558, and overhead accessory 1569 for attaching lights or other surgical accessories.

FIGS. 67 and 68 show the construction and operation of wheel brake assembly 1558. Brake frame 1570 is rigidly attached to vertical strut 1553. Upper pivot frame 1572 works in conjunction with handle/link 1574, curved spring link 1573, and plunger shaft 1575 to form an "over-center" mechanism with two stable states, clamped or unclamped.

In FIG. 67, handle 1574 is pushed down into a snap-locked position pushing tip 1576 into contact with wheel 32 tire 1571 thereby contacting the top surface and deforming it to prevent wheel 32 from rotating.

FIG. 68 shows the "brake-off" position which is obtained by lifting handle 1574 past the center position thereby lifting tip 1576 out of contact with tire 1571.

FIG. 69 is an end view of adjustable side clamp 1560 with side tube 1550 and auxiliary rod 1551 in cross section (see plane "69—69" in FIG. 66). Instrument table 1561 attached to clamp body 1580 can be moved longitudinally along tube

1561 and locked in place as desired by turning knob 1581 which impinges the end of screw 1582 against horizontal support member 1550.

FIG. 70 shows an exploded view of attachment clamp 1557 used in a variety of locations on overhead frames 1554. It includes main body 1590 with groove 1591, outer clamp member 1593 with lip 1593 and screw 1596 with knob 1595. In operation, lip 1593 pivots within groove 1591; tube 1554 is grasped by the concave surfaces of body 1590 and outer member 1593 as tightened by screw 1596. A tube end 1594 which can represent a tube 1555 or an accessory 1568 is inserted in the hole in the end of body 1590 and locked.

Figure 71:
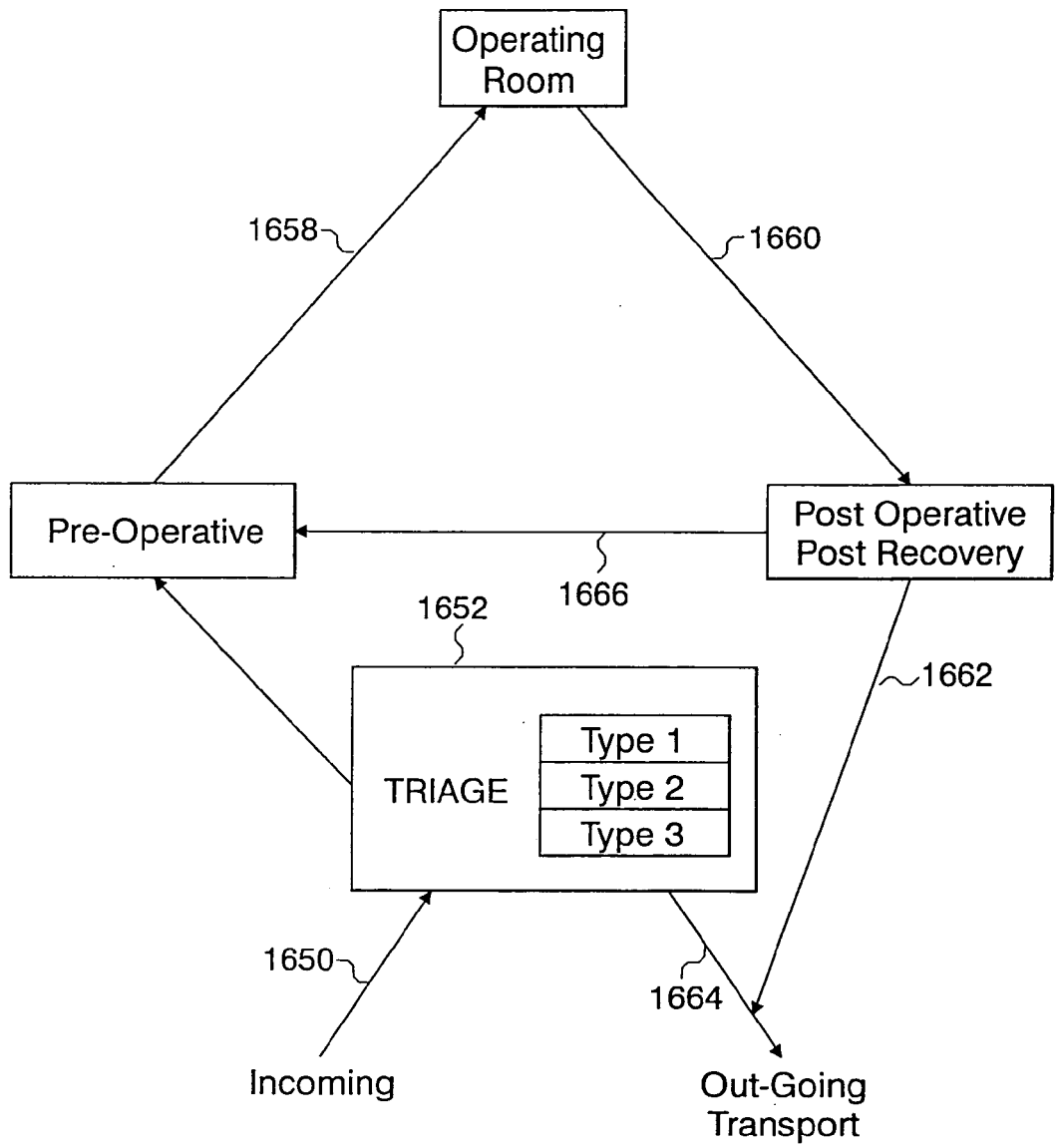
FIG. 71 is a diagrammatic flow chart of use of the convertible cart/utility table of the present invention in a medical emergency response triage environment.

FIG. 71 is a flow chart showing the use of the convertible cart/utility table of the present invention in a medical emergency response triage environment.

For example, in disaster medical care, triage is the medical screening of patients to determine their relative priority for treatment. Three groups are defined, the first is those casualties not expected to survive even with treatment, second is the group who will recover without treatment, and third the highest priority group who need treatment in order to survive. FIG. 71 illustrates how the convertible cart/utility table (CCUT) of this invention can be utilized in this environment.

For example, as in FIG. 71, incoming casualties 1650 arrive at triage center 1652 by ambulance, helicopter or otherwise. Here they are screened into the three categories, labeled "Type 1", "Type 2" and "Type 3" and those who can be treated are then transported via exit path 1654 to field hospital unit 1656 by using a wheeled version of the Convertible cart/utility table (CCUT). After prep at a Pre-Operative Station, the patient is wheeled via path 1658 to the Operating Room (OR) where a table version of the Convertible cart/utility table (CCUT) is used in a utility table mode as an operating platform. Patient is then wheeled upon Convertible cart/utility table (CCUT) via path 1660 to the Post-Operative/Post Recovery station for monitoring, which may be done, on either a wheeled or table version of Convertible cart/utility table (CCUT). The patient may need further surgery, which would require transporting wheeled on Convertible cart/utility table (CCUT) back via path 1666 to the Pre-Operative Station. If Patient is sufficiently recovered, he or she is transported via path 1662 upon wheeled Convertible cart/utility table (CCUT) back to triage center 1652 vicinity for further transportation merging with others from triage in the outgoing exit queue path 1664.

Figure 72:
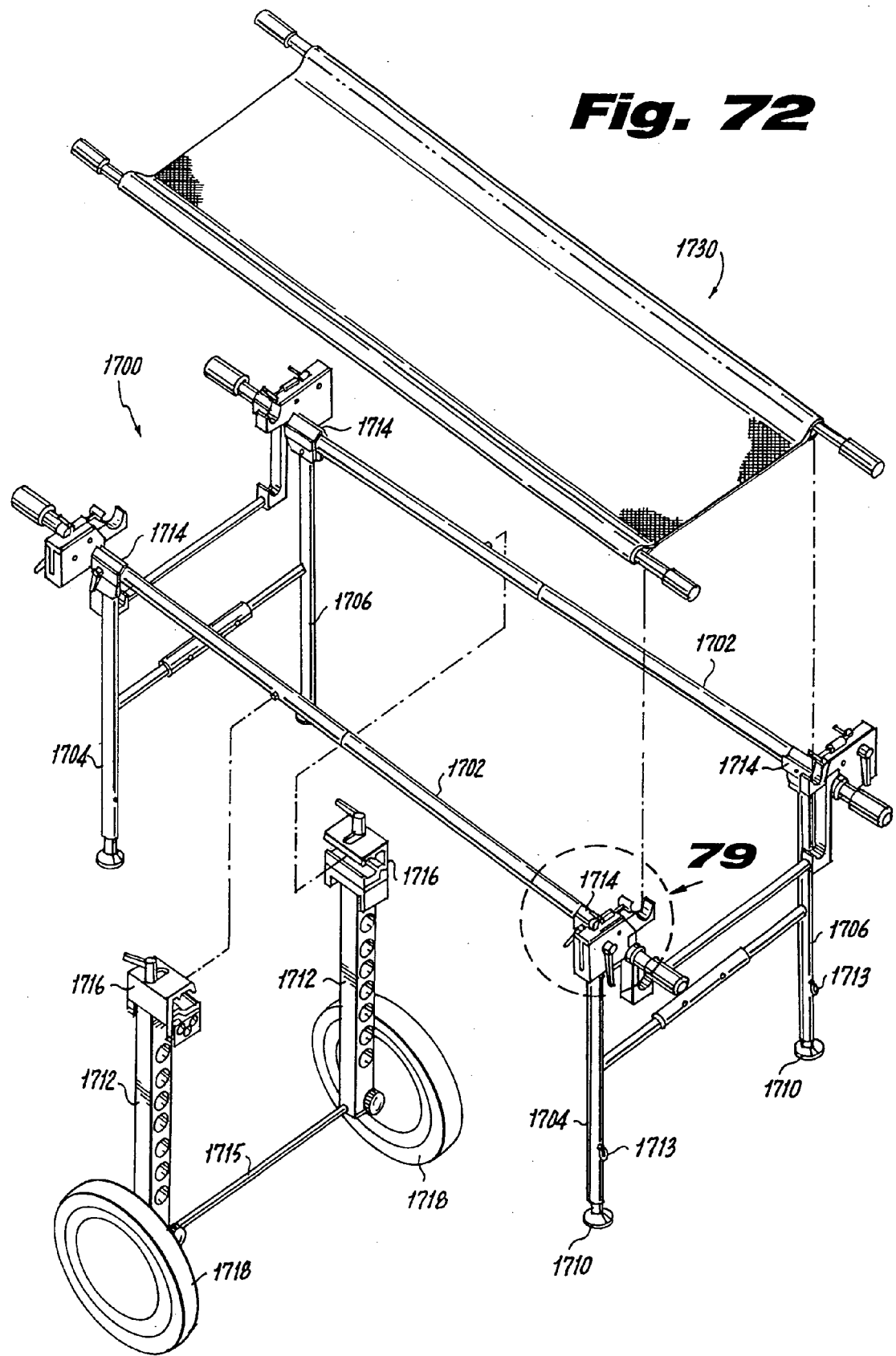
FIG. 72 is an exploded perspective view of the basic components of the convertible cart/utility table of the present invention, showing removable kickstand and wheel support components.

FIG. 72 shows an exploded view of the major components of convertible cart/utility table (CCUT) 1700 for supporting stretcher 1730 thereon. These include axle support struts 1712 with rail clamps 1716 at the top ends and wheels 1718 located by axle 1715. Kick stands 1704, used with heavy duty rail clamps 1714, convert convertible cart/utility table (CCUT) to the stationary utility table configuration. Adjustable feet 1710 provide a high friction surface and terrain adjustability. Macro adjustment of leveling or height is via multiple holes 1706, in kickstand like 1704, which accept spring pin 1713 attached near the end of foot extension 1708. Side rails 1702 complete the basic structure.

Figure 73:
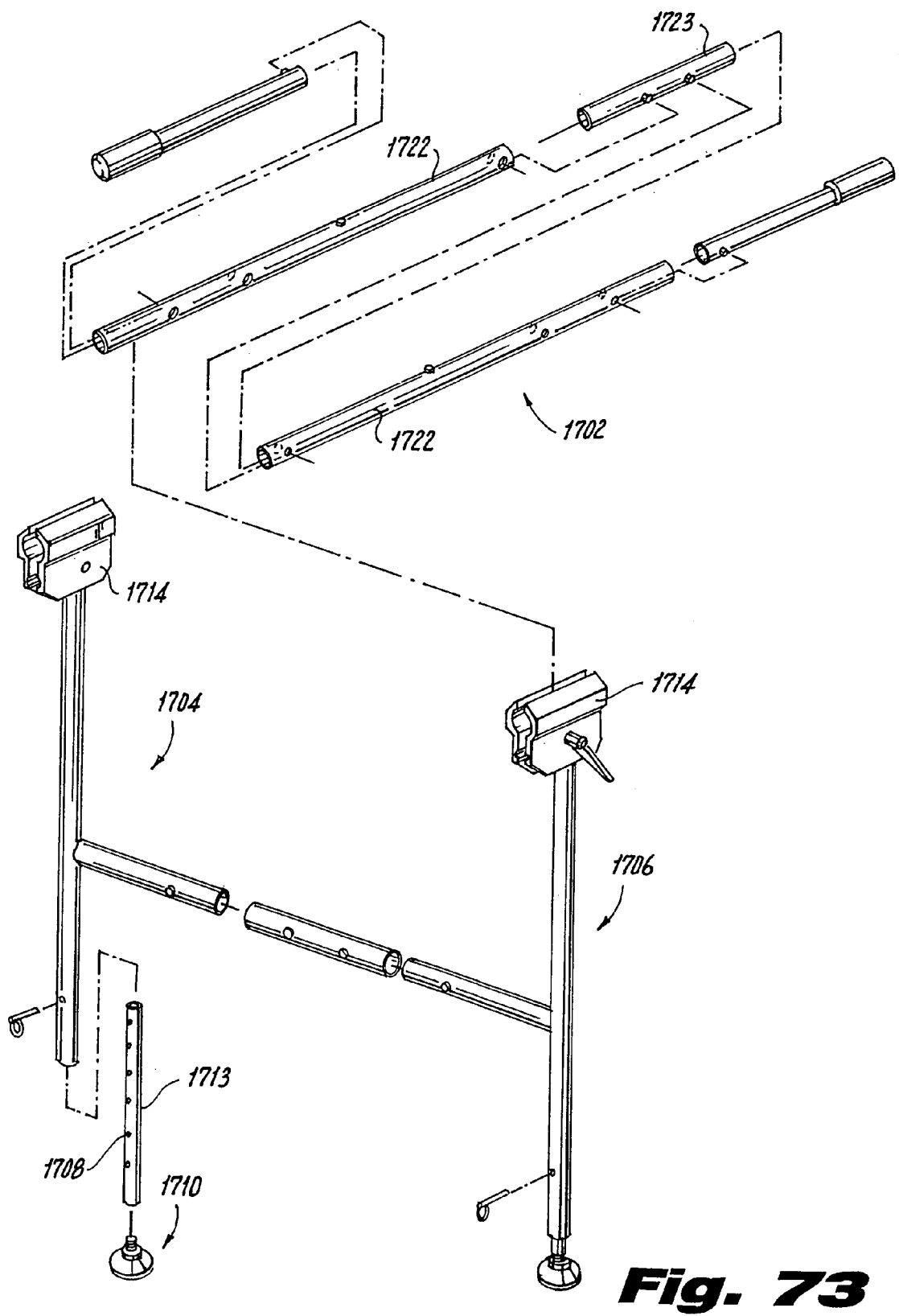
FIG. 73 is an exploded view of the tubular frame component of the convertible cart/utility table of the present invention, with an alternate embodiment for a kickstand holding sleeve.

FIG. 73 shows side rails 1702, which are mounted to kickstands 1704 by clamps 1714, which engage tubing rails 1702. Tubing rails 1702 have middle connecting tube 1723 and side tubes 1722, connected by connectors, such as, for example, spring pins and holes.

FIG. 74 shows convertible cart/utility table (CCUT) 1700 configured as a utility table with auxiliary power pack 1732 and stretcher 1730.

FIG. 75 shows the feature, which tilts the table top by adjusting the height of kickstands 1704 on different ends at different heights. FIG. 75 also shows an optional body fluid capture collector 1760 such as a concave sling connected to a medical waste collector 1762.

Figure 76:
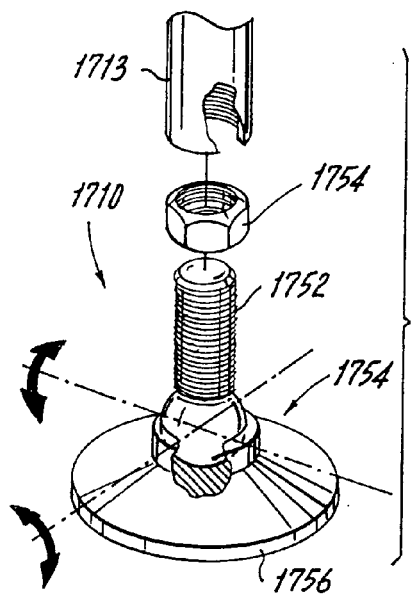
FIG. 76 is a detailed view of the height adjustable foot portion of the convertible cart/utility table as in FIGS. 74 and 75, as shown in the ellipse "76" in FIG. 74.

FIG. 76 shows details of kickstand foot 1710. Threshold shaft 1752 is screwed into nut 1754 and into foot extension 1713 thereby providing a micro adjustment of height up to about one inch. High friction pad 1756 and tilt adjustment ball and socket joint 1754 complete foot 1710.

Figure 77:
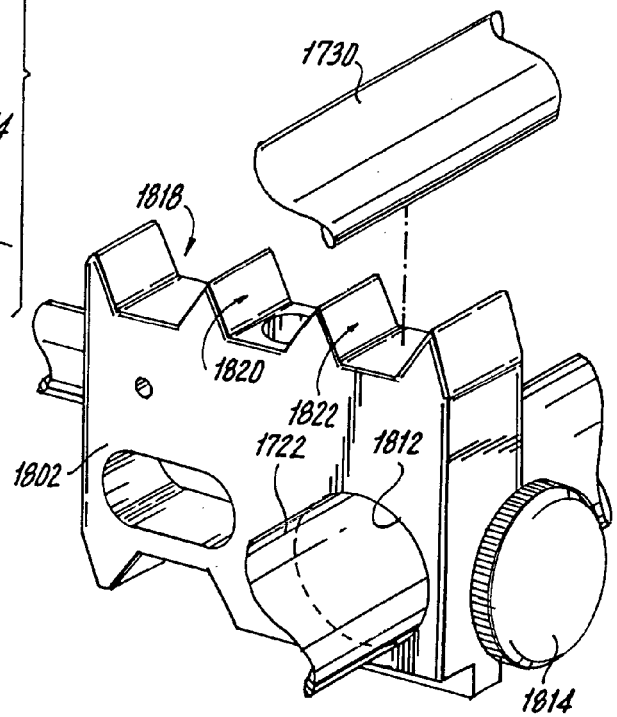
FIG. 77 is a detailed perspective view of a reversible clamp of the convertible cart/utility table as in FIG. 43A; shown in the detail callout "78" of FIG. 43A.

FIG. 77 shows reversible clamp 1800, as in FIG. 43A, which is used with convertible cart/utility table (CCUT) 1700. It includes housing block 1802, with rail aperture 1812, which clamps onto tubing 1722 via lever screw 1814. Groove 1816 receives tubing rail 1730, such as that from a stretcher, which rail 1730 is locked in place via over-center clamp 1804 with jaw 1808, operable by actuator lever 1810. The opposite grooves 1818, 1820 and 1822 are spaced laterally to accommodate stretchers of different widths. These can be optionally locked via a clamp 1806 having a jaw similar to jaw 1808, which is moved to the desired groove 1818, 1820 or 1822.

Figure 78:
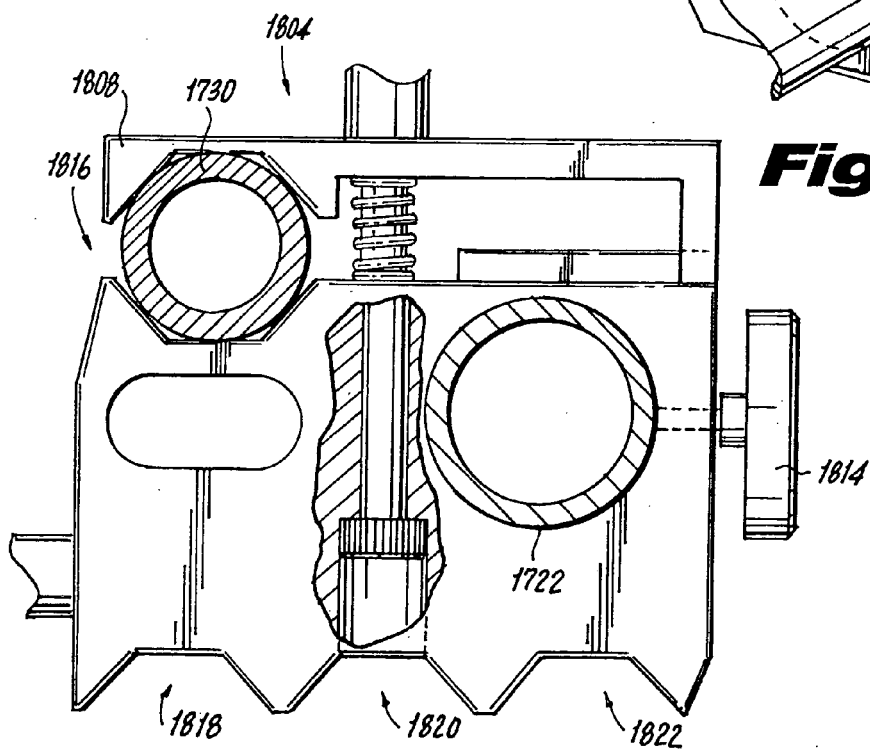
FIG. 78 is a close-up rear elevational detail view of the clamp as in FIG. 77, shown in a reversed position, as shown in the detail callout "78" in FIG. 43A.

FIG. 78 shows reversible clamp 1800 inverted to use the multiple width grooves 1818, 1820 or 1822.

Figure 80:
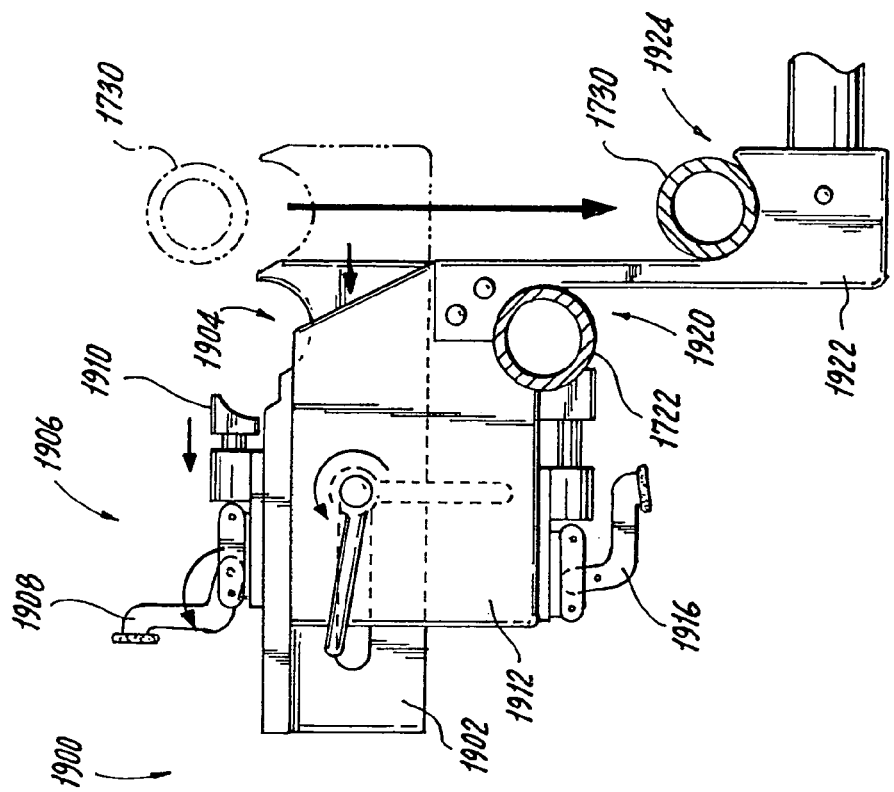
FIG. 80 is a detailed front elevational view showing a hook of the heavy-duty clamp as in FIG. 79 showing the retraction of a stretcher rail support, allowing the stretcher rail to drop thereby selectively tilting the head or foot of the stretcher.
Figure 79:
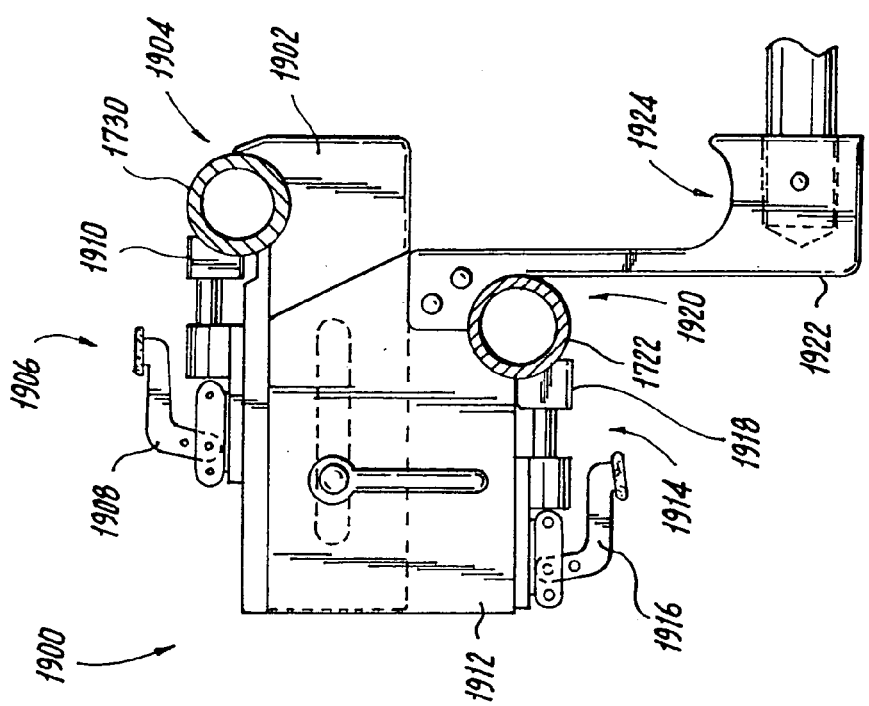
FIG. 79 is a front elevational view of an optional heavy-duty clamp for the convertible cart/utility table as in FIG. 72, as shown in detail callout "79" in FIG. 72.

FIGS. 79 and 80 show details of heavy duty clamp 1900, which has upper block 1902 with groove 1904 to receive a stretcher side tube 1730. Over-center latch 1906 locks stretcher tube via jaw 1910 and actuator lever 1908. Lower block 1912 has side rail groove 1920, holding rail 1722, which groove 1920 is lockable via latch 1914 with jaw 1918 and lever 1916. Lower extension 1922 accommodates either stretcher tube or fluid drape in groove 1924.

Figure 81:
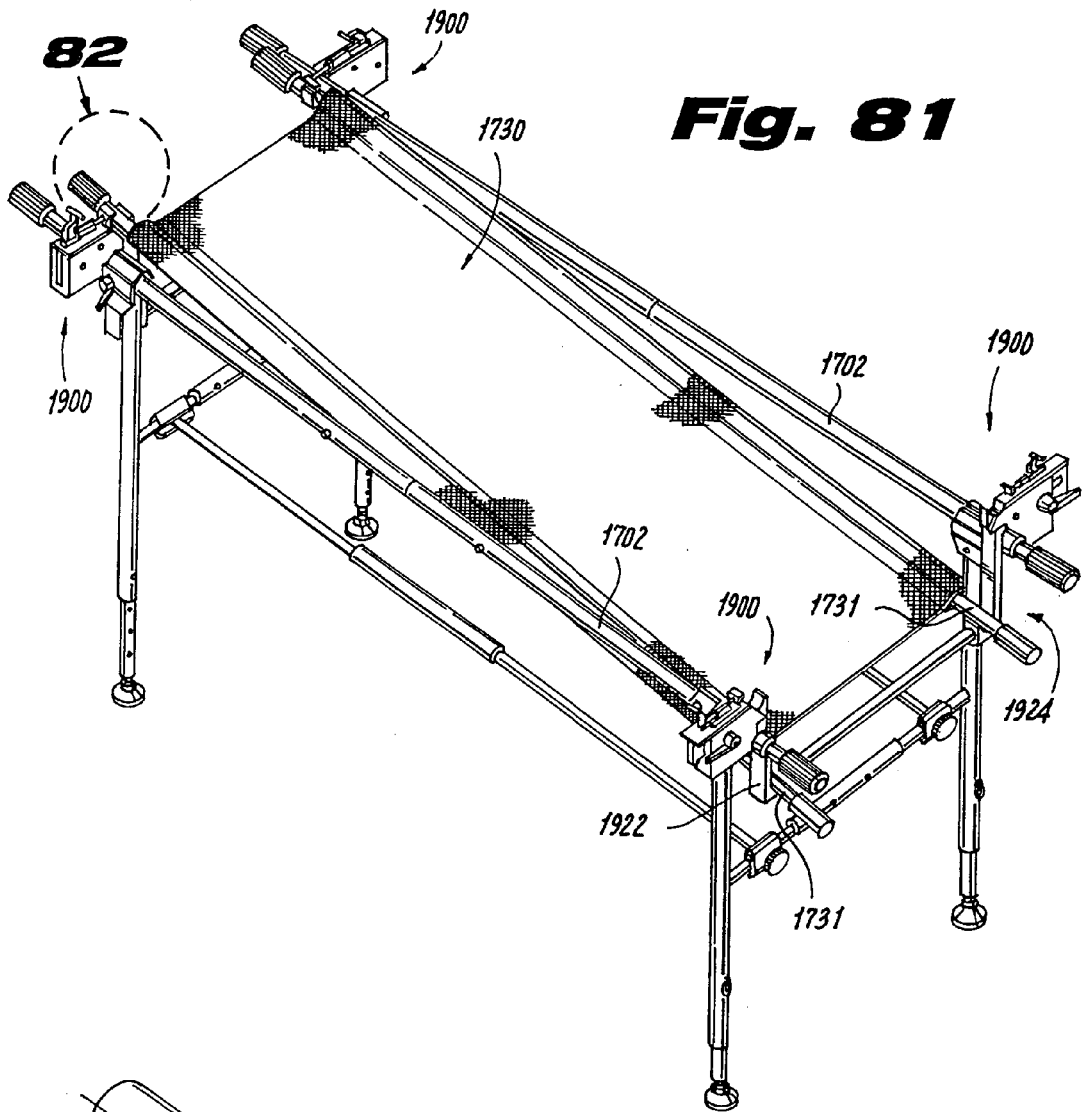
FIG. 81 is a perspective view of the stretcher clamp for the tilted stretcher effected by the clamp retractor as in FIG. 80, which stretcher clamp allows for the tilting rotation of the stretcher rod.

The end view of clamp 1900 in FIG. 81 shows that upper retaining latch block 1932 can pivot to permit stretcher tube 1930 to tilt relative to side rail 1722.

Figure 82:
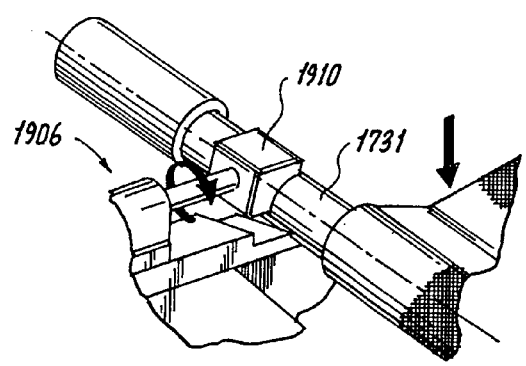
FIG. 82 is a perspective view taken at detail callout "82" in FIG. 81, showing the rotation thereof effectuating tilting of the latch.

In the more complete perspective view of FIG. 82, it can be seen that the lower (foot) end of stretcher rail 1731 of stretcher 1730 is then supported by recess or groove 1924 in the lower extension 1922 of the second clamp 1900.

Figure 83:
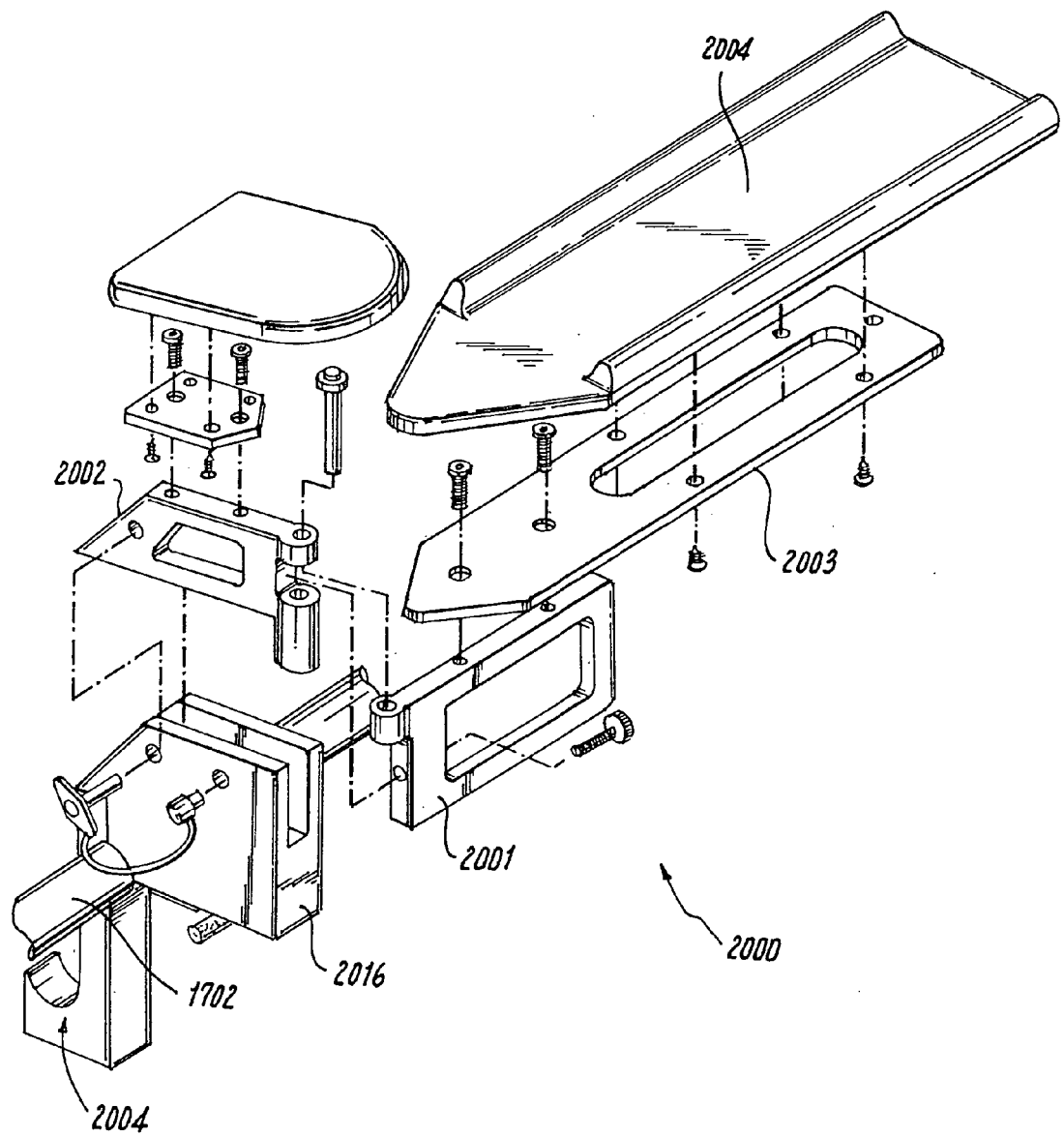
FIG. 83 is an exploded perspective view of a claim for an auxiliary limb appendage support used in connection with the convertible cart/utility table as in FIG. 72 or FIG. 74.

FIG. 83 depicts auxiliary pivotable medical support platform assembly 2000 including base 2001, clamp insert 2002 and platform 2003. This versatile mechanism clamps onto a side rail of the convertible cart/utility table (CCUT). Body limb member support 2004 holds a limb. Assembly 2000 has movable hinge section can swivel relative to clamp base 2016.

Figure 84:
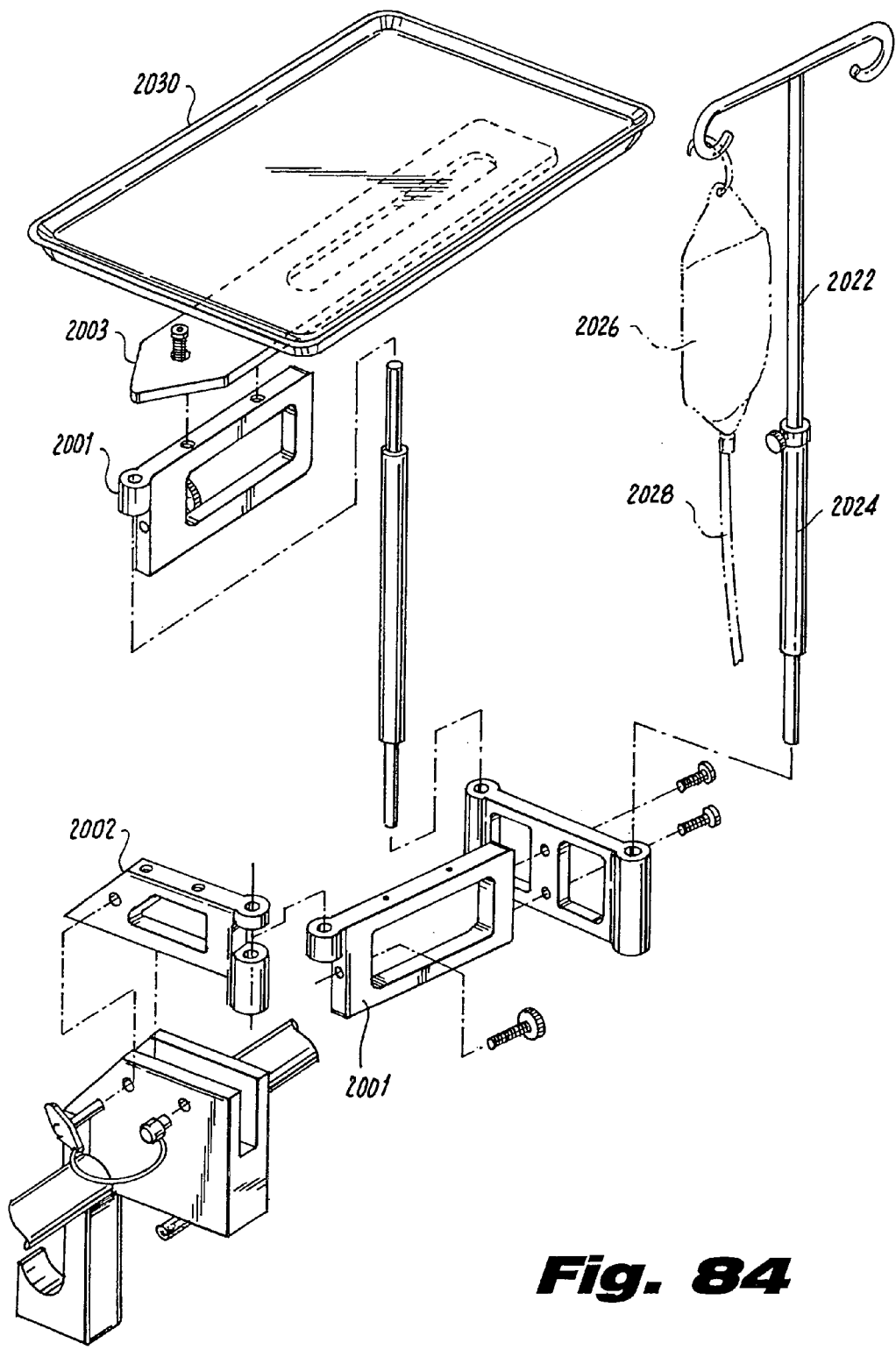
FIG. 84 is an exploded perspective view of the clamp as in FIG. 83 showing intravenous support stanchion and a medical instrument tray.

FIG. 84 shows medical support platform assembly 2000 with pole 2022 used to support intravenous (IV) bag 2026 with infusion line 2028. Extension rod 2024 provides more height for proper infusion gravity head. Tray 2030 is similarly supported.

Figure 85:
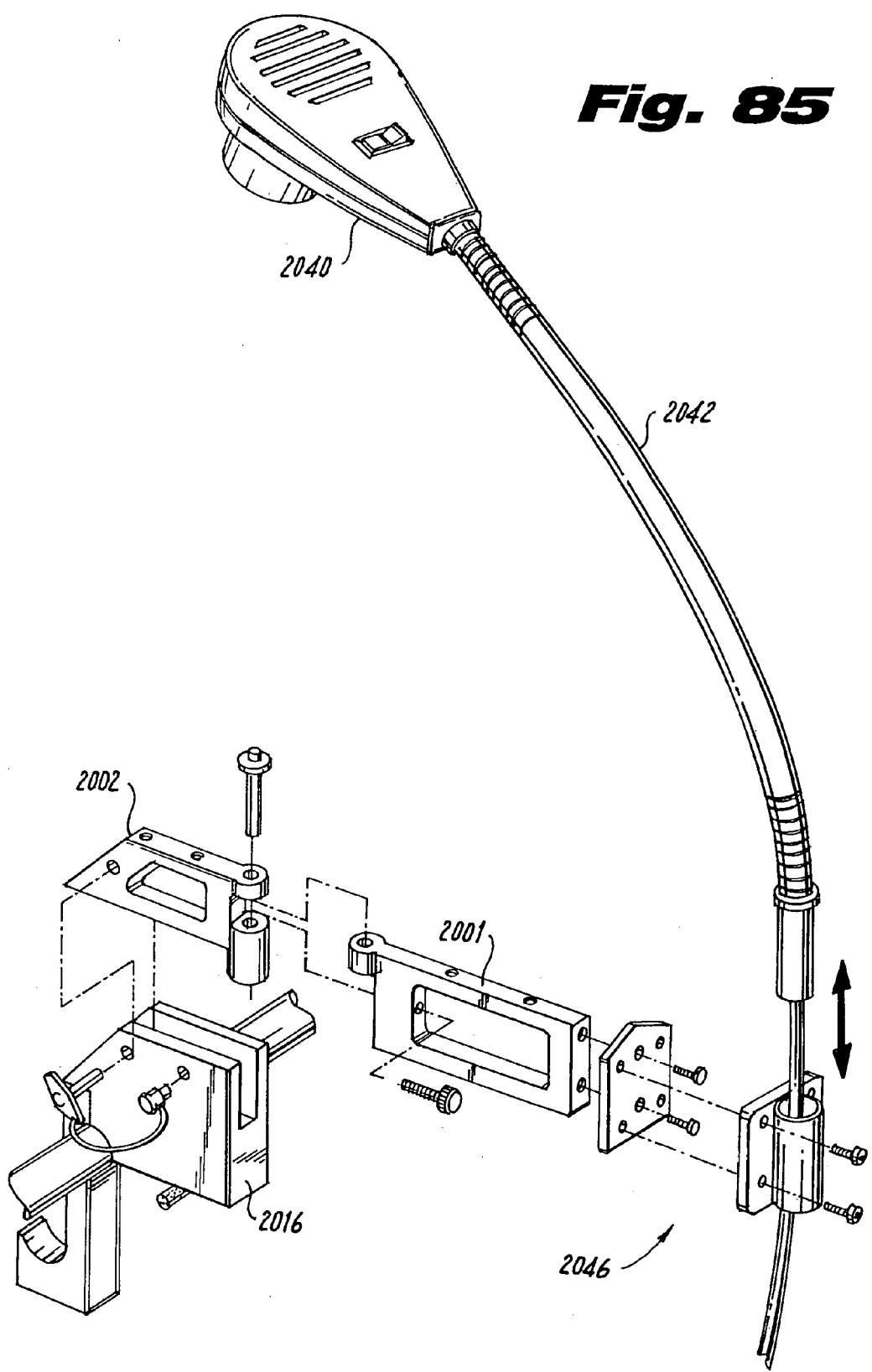
FIG. 85 is an exploded perspective view of the clamp of FIG. 83 sharing a means for mounting a medical clamp and, FIG. 86 is a perspective view illustrating an instrument tray set-up used in connection with the clamp as in FIG. 83.

FIG. 85 shows medical support assembly 2000 used to support gooseneck examination/surgical lamp 2040 attached to flexible neck conduit 2042 held in and movable arm support 2046.

Figure 86:
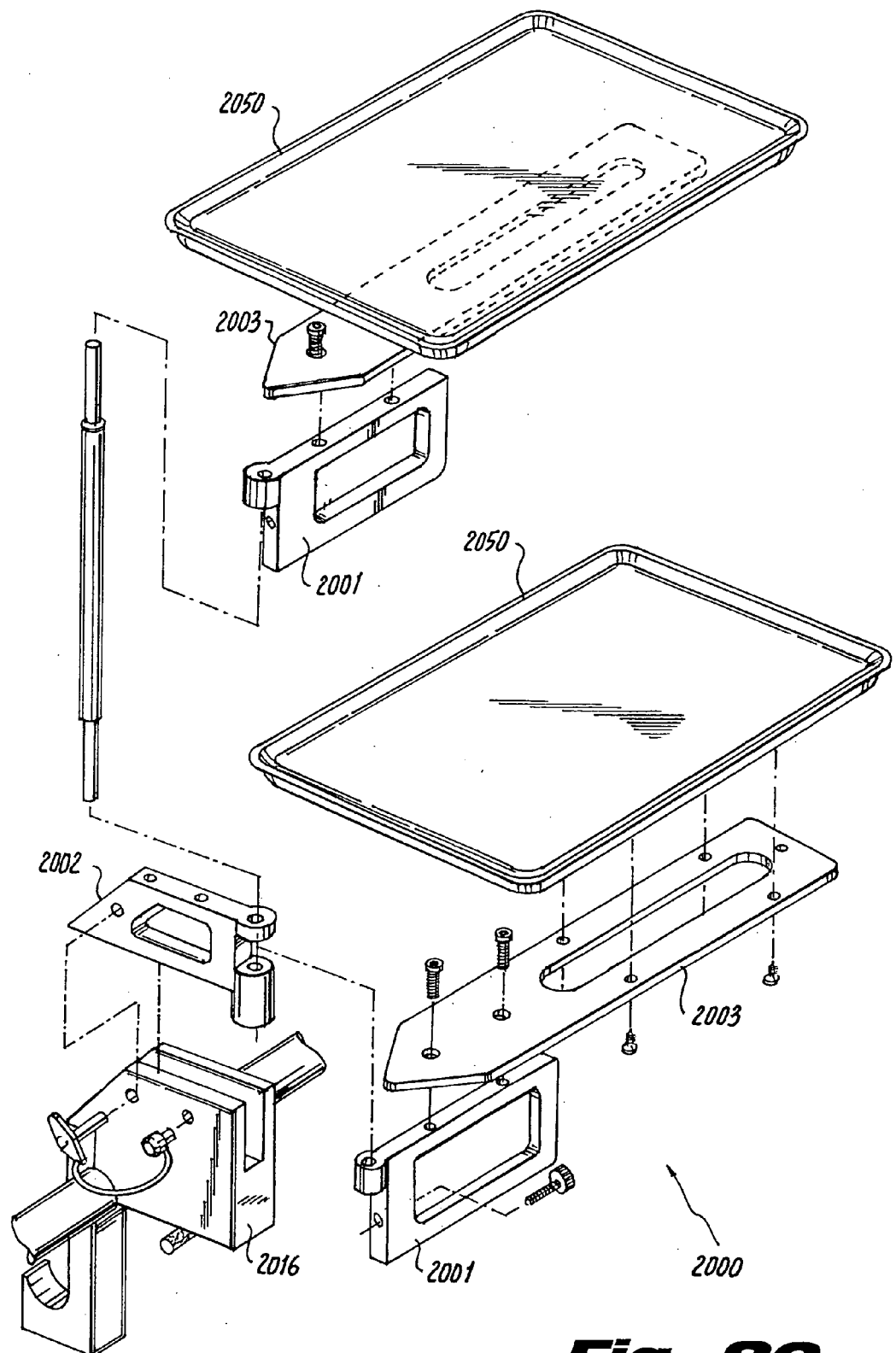

FIG. 86 shows another use of medical support assembled 2000 to support multiple instrument trays 2050.

It is further noted that other modifications may be made to the present invention, without departing from the scope of the invention.

I claim:

1. A low profile rescue carrier comprising:
   a modular load support frame that can be alternately assembled and dis-assembled, said modular frame being comprised of a pair of spaced and parallel horizontally disposed elongated rigid load support members;

a vertically extending straight and rigid strut extending down from a midsection of each of said horizontal load support members;

each said vertical strut having a lower end with an axle mounting means at said lower end;

an axle extending through and joining both said axle mounting means said axle having at least one vehicle movement actuator of a pair of vehicle movement actuators attached at opposite sides of said cart; said axle in joining and contacting both said movement actuators of said cart; said axle traversing through said respective struts;

a stretcher removably attached to said modular load support frame; and, said cart further comprising rotatable handles at each end of each horizontal load support member, each said handle rotating in a plane at right angles to and about a longitudinal axis of each said horizontal load support member.

2. The movable support as in claim 1, wherein said handles lock in an upper position for hauling said cart, and reverse to a lower position contacting the ground surface for operating as a kickstand.

3. A movable support collapsible for storage and transport and expandable for use in carrying a load, comprising:

a modular load support frame comprising a pair of spaced, horizontal support members with at least one axle carrying strut extending downward from said load support frame, a clamping means for releasably engaging said strut to said support frame, and a receiving member for receiving an adjustably removable handle member adjacent each end of each horizontal support member;

said axle carrying strut having a lower end with an axle mounting means at said lower end, at least one axle extending through each said strut, said axle having at least one vehicle movement actuator;

a carrier releasable attached to said load support frame; and each said handle member being independently rotatable about each respective load support member in a plane at right angles to a longitudinal axis of each support member.

4. The movable support as in claim 3, each said handle member locking into an upright position for hauling said cart.

5. The movable support as in claim 4, wherein each said handle member further comprising a kickstand when in a downwardly extending substantially vertical orientation.

6. The movable support as in claim 5, each said handle member further comprising a first grip oriented along the longitudinal axis of each support member and second outer grip spaced from and parallel to said first grip.

7. The movable support as in claim 6, wherein each said handle member is lockable in at least two positions, said positions comprising the upright position for hauling said cart and the downwardly extending orientation a for use as a kickstand.

8. The movable support as in any of claims 4, 6, or 7, wherein said handle member is locked in place with a spring pin.

9. A movable support collapsible for storage and transport and expandable for use in carrying a load, comprising:

a modular load support member comprising at least one axle carrying struts extending downward therefrom, a receiving member for receiving an adjustably removable handle tube and optionally a clamping means;

said axle carrying strut having a lower end with an axle mounting means at said lower end, at feast one axle extending through each said vertical strut, each said axle having at least one vehicle movement actuator of a pair of vehicle movement actuators attached at opposite sides of said cart;

a carrier attachable to said load support member, wherein when said carrier supports a load thereupon at least one handle member for hauling said movable support, said handle member comprising: a handle having a handle outer surface, a handle tube and removably adjustably connecting to said axle carrying strut;

said handle member being rotatable along the longitudinal axis of said load support member;

said handle comprising a grip located coaxially to said handle tube and an outer grip parallel to said handle tube in rigid connection with said coaxial grip, said outer surface of said handle extends to the ground, said handle member locking in at least two positions, said positions comprising an upward position for hauling said cart and a downward position for use as a kickstand;

said handle member locking in place with a spring pin.

10. A movable support as in claim 9, said positions further comprising a locking position wherein said handle member is substantially horizontal for stowing cart.

* * * * *